(12) United States Patent
Awad et al.

(10) Patent No.: US 12,543,972 B2
(45) Date of Patent: Feb. 10, 2026

(54) BIOMECHANICAL MEASUREMENT DEVICES AND USES THEREOF FOR PHENOTYPE-GUIDED MOVEMENT ASSESSMENT, INTERVENTION, AND ACTIVE ASSISTANCE DEVICE CONTROL

(71) Applicants: Trustees of Boston University, Boston, MA (US); President and Fellows of Harvard College, Cambridge, MA (US)

(72) Inventors: Louis Awad, Milford, MA (US); Dheepak Arumukhom Revi, Boston, MA (US); Conor Walsh, Cambridge, MA (US); Stefano Marco Maria De Rossi, Leeds (GB)

(73) Assignees: Trustees of Boston University, Boston, MA (US); President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 18/589,226

(22) Filed: Feb. 27, 2024

(65) Prior Publication Data
US 2024/0315597 A1   Sep. 26, 2024

Related U.S. Application Data

(60) Provisional application No. 63/487,111, filed on Feb. 27, 2023.

(51) Int. Cl.
*A61B 5/11*   (2006.01)
*A61B 5/00*   (2006.01)

(52) U.S. Cl.
CPC ............ *A61B 5/11* (2013.01); *A61B 5/6828* (2013.01); *A61B 2562/0219* (2013.01)

(58) Field of Classification Search
CPC .. A61B 5/11; A61B 5/6828; A61B 2562/0219
See application file for complete search history.

(56) References Cited

U.S. PATENT DOCUMENTS

| 10,182,746 B1 * | 1/2019 | Demiralp .............. A61B 5/1118 |
| 2015/0045703 A1 * | 2/2015 | Strausser ................ A61H 3/00 601/35 |

(Continued)

FOREIGN PATENT DOCUMENTS

WO   2024/182439 A1   9/2024

OTHER PUBLICATIONS

"Revi D.A., et al. Estimation of Walking Speed and Its Spatiotemporal Determinants Using a Single Inertial Sensor Worn on the Thigh: From Healthy to Hemiparetic Walking. Oct. 21, 2021. Sensors 2021. vol. 21. pp. 1-17" (Year: 2021).*

(Continued)

*Primary Examiner* — Charles A Marmor, II
*Assistant Examiner* — Severo Antonio P Lopez
(74) *Attorney, Agent, or Firm* — Hamilton, Brook, Smith & Reynolds, P.C.

(57) ABSTRACT

Systems, devices, and methods described herein may involve receiving movement data associated with a subject, the movement data collected during repetitive movement of the subject; generating a phase portrait based on the movement data; calculating a phase portrait metric of a characteristic of the phase portrait; and assigning the subject to a movement phenotype based on the phase portrait metric.

21 Claims, 25 Drawing Sheets

(56) References Cited

U.S. PATENT DOCUMENTS

2017/0202724 A1\* 7/2017 De Rossi ............... A61H 3/00
2021/0110734 A1 4/2021 May
2022/0362094 A1 11/2022 De Rossi et al.

OTHER PUBLICATIONS

"Chen S., et al. Toward Pervasive Gait Analysis With Wearable Sensors: A Systematic Review. Nov. 2016. IEEE Journal of Biomedical and Health Informatics. vol. 20. pp. 1521-1537" (Year: 2016).\*
Quintero et al., "Real-Time Continuous Gait Phase and Speed Estimation from a Single Sensor", Control Technol. Appl., Aug. 2017, pp. 847-852.
Reisman et al., "Influence of Speed on Walking Economy Poststroke", Neurorehabilitation and Neural Repair, vol. 23, No. 6, Jul./Aug. 2009, pp. 529-534.
Revi et al., "Estimation of Walking Speed and Its Spatiotemporal Determinants Using a Single Inertial Sensor Worn on the Thigh: From Healthy to Hemiparetic Walking", Sensors, vol. 21, No. 21:6976, Oct. 21, 2021, pp. 1-17.
Revi et al., "Indirect measurement of anterior-posterior ground reaction forces using a minimal set of wearable inertial sensors: from healthy to hemiparetic walking", Journal of Neuro Engineering and Rehabilitation, Jun. 29, 2020, vol. 17, No. 1:82, pp. 1-13.
Riley et al., "Propulsive adaptation to changing gait speed", Journal of Biomechanics, vol. 34, No. 2, Feb. 2001, pp. 197-202.
Romijnders et al., "Validation of imu-based Gait Event Detection During Curved Walking and Turning in Older Adults and Parkinson's Disease Patients", Journal of Neuro Engineering and Rehabilitation, 2021, 10 pages.
Rosen et al., "Design of a controlled-energy-dissipation orthosis (CEDO) for functional suppression of intention tremors", Journal of Rehabilitation Research and Development, vol. 32 No. 1, Feb. 1995, pp. 1-16.
Saleh et al., "In defence of gait analysis. Observation and measurement in gait assessment", J. Bone Joint Surg. Br., vol. 67, No. 2, Mar. 1985, pp. 237-241.
Sawicki et al., "It pays to have a spring in your step", Exerc Sport Sci Rev., vol. 37, No. 3, Jul. 2009, pp. 130-108.
Scalzo et al., "Impact of changes in balance and walking capacity on the quality of life in patients with Parkinson's disease", Arq. Neuropsiquiatr., vol. 70, No. 2, Feb. 2012, pp. 119-124.
Schenkman et al., "Reliability of Impairment and Physical Performance Measures for Persons With Parkinson's Disease", Physical Therapy, vol. 77, No. 1, Jan. 1997, pp. 19-27.
Schinkel-Ivy et al., "Balance confidence is related to features of balance and gait in individuals with chronic stroke", J. Stroke Cerebrovasc Dis., vol. 26, No. 2, Feb. 2017, pp. 237-245.
Schinkel-Ivy et al., "Relationships between fear of falling, balance confidence, and control of balance, gait, and reactive stepping in individuals with sub-acute stroke", Gait Posture, vol. 43, Jan. 2016, pp. 154-159.
Seel et al., "IMU-Based Joint Angle Measurement for Gait Analysis", Sensors, vol. 14, No. 4, Apr. 16, 2014, pp. 6891-6909.
Shahabpoor et al., "Estimation of vertical walking ground reaction force in real-life environments using single IMU sensor", Journal of Biomechanics, vol. 79, Oct. 5, 2018, pp. 181-190.
Shrout et al., "Mediation in Experimental and Nonexperimental Studies: New Procedures and Recommendations", Psychological Methods, vol. 7, No. 4, Dec. 2002, pp. 422-445.
Sibley et al., "Changes in Spatiotemporal Gait Variables Over Time During a Test of Functional Capacity After Stroke", Journal of NeuroEngineering and Rehabilitation 2009, Jul. 14, 2009, 7 pages.
Skillbäck et al., "Slowing gait speed precedes cognitive decline by several years", Alzheimer's Dement, vol. 18, No. 19, Sep. 2022, pp. 1667-1676.
Soltani et al., "Real-World Gait Speed Estimation Using Wrist Sensor: A Personalized Approach", IEEE J. Biomed Health Inform., vol. 24, No. 3, Mar. 2020, pp. 658-668.
Soumaré et al., "A Cross-Sectional and Longitudinal Study of the Relationship Between Walking Speed and Cognitive Function in Community-Dwelling Elderly People", J Gerontol A Biol Sci Med Sci., vol. 64, No. 10, Oct. 2009, pp. 1058-1065.
Steinhubl et al., "The emerging field of mobile health", Sci. Transl. Med., vol. 7, No. 283:283rv3. Apr. 15, 2015, pp. 1-12.
Suh et al., "Effect of rhythmic auditory stimulation on gait and balance in hemiplegic stroke patients", NeuroRehabilitation, vol. 34, 2014, pp. 193-199.
Takahashi et al., "A Neuromechanics-Based Powered Ankle Exoskeleton to Assist Walking Post-stroke: A Feasibility Study", Journal of NeuroEngineering and Rehabilitation (2015), 13 pages.
Tang et al., "Relationship between perceived and measured changes in walking after stroke", J. Neurol. Phys Ther., vol. 36, No. 3, Sep. 2012, pp. 115-121.
Thaut et al., "Neurobiological foundations of neurologic music therapy: rhythmic entrainment and the motor system", Frontiers in Psychology, vol. 5, Article 1185, Feb. 2015, pp. 1-6.
Ting et al, "Neuromechanical Principles Underlying Movement Modularity and Their Implications for Rehabilitation", Neuron, vol. 86, No. 1, Apr. 8, 2015, pp. 38-54.
Tsao et al., "Heart Disease and Stroke Statistics—2022 Update: A Report From the American Heart Association", Circulation, vol. 145, No. 8, Feb. 22, 2022, pp. e153-e639.
Turns et al., "Relationships Between Muscle Activity and Anteroposterior Ground Reaction Forces in Hemiparetic Walking", Arch Phys Med Rehabil., vol. 88, No. 9, Sep. 2007, pp. 1127-1135.
Villarreal et al., "A Robust Parameterization of Human Gait Patterns Across Phase-Shifting Perturbations", IEEE Trans Neural Syst Rehabil Eng., vol. 25, No. 3, Mar. 2017, pp. 265-278.
Vistamehr et al., "Correlations between Measures of Dynamic Balance in Individuals with Post-stroke Hemiparesis", J Biomech. Feb. 8, 2016, vol. 49(3), pp. 396-400.
White et al., "Physical Activity and Quality of Life in Community Dwelling Older Adults", Health and Quality of Life Outcomes 2009, Feb. 6, 2009, 7 Pages.
Williams et al., "Gait Coordination in Parkinson Disease: Effects of Step Length and Cadence Manipulations", Gait Posture, Jun. 2013, vol. 38 Issue 2 pp. 340-344.
Yang et al., "Inertial Sensor-Based Methods in Walking Speed Estimation: A Systematic Review", Department of Mechanical and Materials Engineering, Queen's University, Kingston, ON K7L 3N6, 2012, pp. 6102-6116.
Zajaca et al., "Feasibility and Proof-of-Concept of Delivering an Autonomous Music-Based DigitalWalking Intervention to Persons with Parkinson's Disease in a Naturalistic Setting", Journal of Parkinson's Disease, Nov. 3, 2023, pp. 1253-1265.
Zelik et al., "A Unified Perspective on Ankle Push-off in Human Walking", Journal of Experimental Biology, May 2, 2024, 22 pages.
Zhang et al., "Human-in-the-loop Optimization of Exoskeleton Assistance During Walking", Department of Mechanical Engineering, Carnegie Mellon University, Pittsburgh, PA, 2017, pp. 1280-1284.
Zukowski et al., "Relationships between Gait Variability and Ambulatory Activity Post Stroke", Top Stroke Rehabil, May 2019, vol. 26 Iss 4, pp. 255-260.
Godi et al., "Comparison of Reliability, Validity, and Responsiveness of the Mini-BESTest and Berg Balance Scale in Patients With Balance Disorders", Physical Therapy, vol. 93, No. 2, Feb. 2013, pp. 158-167.
Goetz et al., "MDS-UPDRS the MDS-sponsored Revision of the Unified Parkinson's Disease Rating Scale", International Parkinson and Movement Disorder Society, 2008, 33 pages.
Goetz et al., "Movement Disorder Society Task Force Report on the Hoehn and Yahr Staging Scale: Status and Recommendations", Movement Disorders, vol. 19, No. 9, Sep. 2004, pp. 1020-1028.
Goldman et al., "Evaluation of the six-minute walk in multiple sclerosis subjects and healthy controls", Multiple Sclerosis, vol. 14, No. 3, Apr. 2008, pp. 383-390.

(56) References Cited

OTHER PUBLICATIONS

Guadagnoli et al., "Challenge Point: A Framework for Conceptualizing the Effects of Various Practice Conditions in Motor Learning", Journal of Motor Behavior, vol. 36, No. 2, Jun. 2004, pp. 212-224.

Hausdorff et al., "Effects of Cognitive Challenge on Gait Variability in Patients with Parkinson's Disease", Journal of Geriatric Psychiatry and Neurology, vol. 16, No. 1, Mar. 2003, pp. 53-58.

Hutchinson et al., "A Music-Based Digital Therapeutic: Proof-of-Concept Automation of a Progressive and Individualized Rhythm-Based Walking Training Program After Stroke", Neurorehabilitation and Neural Repair, vol. 34, No. 11, Nov. 2020, pp. 986-996.

International Search Report and Written Opinion received for PCT Patent Application No. PCT/US2024/017546, mailed on Feb. 27, 2024, 12 pages.

Ivanenko et al., "Plasticity and modular control of locomotor patterns in neurological disorders with motor deficits", Frontiers in Computational Neuroscience, vol. 7, Article 123, Sep. 2013, pp. 1-11.

Jonkers et al., "Capacity to Increase Walking Speed is Limited by impaired hip and ankle power generation in lower functioning persons post-stroke", Gait Posture, vol. 29, No. 1, Jan. 2009, pp. 129-137.

Jonsdottir et al., "Improved Gait of Persons With Multiple Sclerosis After Rehabilitation: Effects on Lower Limb Muscle Synergies, Push-Off, and Toe-Clearance", Front. Neurol., vol. 11, Article 668, Jul. 2020, pp. 1-13.

Karatsidis et al., "Musculoskeletal model-based inverse dynamic analysis under ambulatory conditions using inertial motion capture", Med. Eng. Phys., vol. 65, Mar. 2019, pp. 68-77.

Kaushal et al., "Exercise habit formation in new gym members: a longitudinal study", J. Behav. Med., vol. 38, No. 4, Aug. 2015, pp. 652-663.

Kesar et al., "Functional electrical stimulation of ankle plantarflexor and dorsiflexor muscles: effects on poststroke gait", Stroke, vol. 40, No. 12, Dec. 2009, pp. 3821-3827.

Kim et al., "Correlation between the Activities of Daily Living of Stroke Patients in a Community Setting and Their Quality of Life", J. Phys. Ther. Sci., vol. 26, No. 3, Mar. 2014, pp. 417-419.

Kim et al., "Differential effects of rhythmic auditory stimulation and neurodevelopmental treatment/Bobath on gait patterns in adults with cerebral palsy: a randomized controlled trial", Clinical Rehabilitation, vol. 26, No. 10, Dec. 3, 2012, pp. 904-914.

Kim et al., "Reducing the metabolic rate of walking and running with a versatile, portable exosuit", Science, vol. 365, No. 6454, Aug. 16, 2019, pp. 668-672.

Kirk et al., "Mobilise-D insights to estimate real-world walking speed in multiple conditions with a wearable device", Scientific Reports, vol. 14, No. 1754, Jan. 19, 2024, 23 pages.

Koo et al., "A Guideline of Selecting and Reporting Intraclass Correlation Coefficients for Reliability Research", J. Chiropr. Med., vol. 15, No. 12, Jun. 2016, pp. 155-163.

Kosorok et al., "Precision Medicine", Annual Review of Statistics and Its Application, Annual Review of Statistics and Its Application, vol. 6, 2019, pp. 263-286.

Kuo et al., "Dynamic Principles of Gait and Their Clinical Implications", Physical Therapy, vol. 90, No. 2, Feb. 2010, pp. 157-174.

Laufer, "Effect of Age on Characteristics of Forward and Backward Gait at Preferred and Accelerated Walking Speed", J. Gerontol. A Biol. Sci. Med. Sci., vol. 60A, No. 5, May 2005, pp. 627-632.

Leddy et al., "Functional gait assessment and balance evaluation system test: reliability, validity, sensitivity, and specificity for identifying individuals with Parkinson disease who fall", Physical Therapy, vol. 91, No. 1, Jan. 2011, pp. 102-113.

Leone et al., "Prevalence of Walking-Related Motor Fatigue in Persons With Multiple Sclerosis: Decline in Walking Distance Induced by the 6-Minute Walk Test", Neurorehabilitation and Neural Repair, vol. 30, No. 4, May 2016, pp. 373-383.

Lim et al., "Prediction of Lower Limb Kinetics and Kinematics during Walking by a Single IMU on the Lower Back Using Machine Learning", Sensors, vol. 20, No. 1:130 Dec. 24, 2019, pp. 1-29.

Lublin et al., "Defining the clinical course of multiple sclerosis", Neurology, vol. 83, No. 3, Jul. 15, 2014, pp. 278-286.

Mansfield et al., "Do measures of reactive balance control predict falls in people with stroke returning to the community?", Physiotherapy, vol. 101, No. 4, Dec. 2015, pp. 373-380.

Martin et al., "Gait Initiation in Community-Dwelling Adults With Parkinson Disease: Comparison With Older and Younger Adults Without the Disease", Physical Therapy, vol. 82, No. 6, Jun. 2002, pp. 566-577.

McCain et al., "Mechanics and energetics of post-stroke walking aided by a powered ankle exoskeleton with speed-adaptive myoelectric control", Journal of Neuro Engineering and Rehabilitation, vol. 16, No. 1:57, May 15, 2019, pp. 1-12.

McDonald et al., "Recommended Diagnostic Criteria for Multiple Sclerosis: Guidelines from the International Panel on the Diagnosis of Multiple Sclerosis", Ann. Neurol., Annals of Neurology, vol. 50, No. 1, Jul. 2001, pp. 121-127.

MejiaCruz et al., "Walking speed measurement technology: A review", Curr. Geriatr Rep., Mar. 2021, vol. 10, No. 1, pp. 32-41.

Middleton et al., "Balance impairment limits ability to increase walking speed in individuals with chronic stroke", Disabil. Rehabil., vol. 39, No. 5, Mar. 2017, pp. 497-502.

Middleton et al., "Walking Speed: The Functional Vital Sign", J. Aging Phys. Act., vol. 23, No. 2, Apr. 2015, pp. 314-322.

Miyazaki et al., "Validity of Measurement for Trailing Limb Angle and Propulsion Force during Gait Using a Magnetic Inertial Measurement Unit", BioMed Research International, vol. 2019, Article ID 8123467, 2019, 8 pages.

Moore et al., "A Core Set of Outcome Measures for Adults With Neurologic Conditions Undergoing Rehabilitation", J. Neurol. Phys. Ther., vol. 42, No. 3, Jul. 2018, pp. 174-200.

Moore et al., "Comprehensive measurement of stroke gait characteristics with a single accelerometer in the laboratory and community: a feasibility, validity and reliability study", Journal of Neuro Engineering and Rehabilitation, vol. 14, No. 1:130, Dec. 29, 2017, pp. 1-10.

Morone et al., "Robot-assisted gait training for stroke patients: current state of the art and perspectives of robotics", Neuropsychiatric Disease and Treatment, vol. 13, May 15, 2017, pp. 1303-1311.

Nanhoe-Mahabier et al., "Walking patterns in Parkinson's disease with and without freezing of gait", Neuroscience, Vo. 182, May 19, 2011, pp. 217-224.

Neptune et al., "Contributions of the individual ankle plantar flexors to support, forward progression and swing initiation during walking", Journal of Biomechanics, vol. 34, No. 11, Nov. 2001, pp. 1387-1398.

Nocera et al., "Using the Timed Up & Go Test in a Clinical Setting to Predict Falling in Parkinson's Disease", Arch. Phys. Med. Rehabil., vol. 94, No. 7, Jul. 2013, pp. 1300-1305.

Penke et al., "Propulsive Forces Applied to the Body's Center of Mass Affect Metabolic Energetics Post-Stroke", Arch Phys Med. Rehabil., vol. 100, No. 6, Jun. 2019, pp. 1068-1075.

Peruzzi et al., "Estimation of stride length in level walking using an inertial measurement unit attached to the foot: A validation of the zero velocity assumption during stance", Journal of Biomechanics, vol. 44, No. 10, Jul. 7, 2011, pp. 1991-1994.

Peters et al., "Constraints on Stance-Phase Force Production during Overground Walking in Persons with Chronic Incomplete Spinal Cord Injury", Journal of Neurotrauma, vol. 35, No. 3, Feb. 1, 2018, pp. 467-477.

Pohl et al., "Influence of Stroke-Related Impairments on Performance in 6-minute Walk Test", Journal of Rehabilitation Research and Development, vol. 39 No. 4, Jul./Aug. 2002, pp. 1-6.

Porciuncula et al., "Effects Of High-Intensity Gait Training With and Without Soft Robotic Exosuits in People Post-Stroke: A Development-of-Concept Pilot Crossover Trial", Porciuncula et al. Journal of NeuroEngineering and Rehabilitation, 2023, 10 pages.

(56) References Cited

OTHER PUBLICATIONS

Porciuncula et al., "Targeting Paretic Propulsion and Walking Speed With a Soft Robotic Exosuit: A Consideration-of-Concept Trial", Frontiers in Neurorobotics, vol. 15, Article 689577, Jul. 2021, pp. 1-13.

Porciuncula et al., "Wearable Movement Sensors for Rehabilitation: A Focused Review of Technological and Clinical Advances", PM R. Sep. 2018, pp. S220-S232.

Quervain et al., "Gait Pattern in the Early Recovery Period after Stroke", J. Bone Joint. Surg. Am., vol. 78, No. 10, Oct. 1996 , pp. 1506-1514.

Quinlivan et al., "Assistance magnitude versus metabolic cost reductions for a tethered multiarticular soft exosuit", Sci. Robot, vol. 2, No. 2, Jan. 18, 2017, pp. 1-10.

Quintero et al., "Continuous-Phase Control of a Powered Knee-Ankle Prosthesis: Amputee Experiments Across Speeds and Inclines", IEEE Trans Robot., vol. 34, No. 3, Jun. 2018, pp. 686-701.

Amstutz, H. C., et al., Range of Motion Studies for Total Hip Replacements, Sep. 1975, Clinical Orthopedics and Related Research, 124-130, No. III.

Ashley, E. A., Towards Precision Medicine, Sep. 2016, Nature Reviews | Genetics, 507-522, vol. 17.

Bohannon, R. W.n et al., "Rehabilitation goals of patients with hemiplegia," 1988, International Journal of Rehabilitation Research, 181-183, vol. 11, No. 2.

Chen, S., et al., "Aiding diagnosis of normal pressure hydrocephalus with enhanced gait feature separability," 2012, in Proceedings of the conference on Wireless Health, DOI: 10.1145/2448096.2448099 (ACM, New York, NY, USA), 1-8.

Chiu, S.-L. and Chou, L.-S., "Variability in inter-joint coordination during walking of elderly adults and its association with clinical balance measures, Clinical Biomechanics," 2013, Clinical Biomechanics, 454-458, vol. 28, No. 4.

Combs, S. A., et al., "Is walking faster or walking farther more important to persons with chronic stroke?," May 2013, Disability and Rehabilitation, 860-867, vol. 35.

Escudero-Uribe, S., et al., "Gait pattern changes after six-minute walk test in persons with multiple sclerosis," 2019, hysiother. Res. Int., 24, DOI: 10. 1002, 1-10, vol. 24:e1741.

Falvo, M. J. and Earhart, G. M., "Six-minute walk distance in persons with parkinson disease: A hierarchical regression model," 2009, Archives of Physical Medicine and Rehabilitation, 1004-1008, vol. 90, No. 6.

Francois Bethoux, et al., "Safety and acceptability of closed-loop rhythmic cueing for gait training in persons with multiple sclerosis: a pilot single-blind randomized controlled trial," 2023, Multiple Sclerosis Journal, Sage Publications Ltd, 645, vol. 29, Issue 12.

Franz, J. R., et al., "Real-time feedback enhances forward propulsion during walking in old adults," Jan. 2014, Clinical Biomechanics, 68-74, vol. 29.

Grau-Pellicer, M., et al., "Walking speed as a predictor of community mobility and quality of life after stroke," 2019, Top. Stroke Rehabil., DOI: 10.1080/10749357.2019. 1605751, 349-358, 26.

Harris, B. and Awad, L., "Automating a Progressive and Individualized Rhythm-based Walking Training Program After Stroke: Feasibility of a Music-based Digital Therapeutic,", Archives of Physical Medicine and Rehabilitation, Nov. 2020, e30, vol. 101.

Kleim, J. A. and Jones, T. A., Principles of Experience-Dependent Neural Plasticity: Implications for Rehabilitation After Brain Damage, Journal of Speech, Language, and Hearing Research, Feb. 2008, S225-S239, vol. 51.

Kuhman, D. and Hurt, C. P., The timing of locomotor propulsion in healthy adults walking at multiple speeds, Dec. 2019, Human Movement Science, 1-13, vol. 68, 102524.

Laudanski, A., et al., A concurrent comparison of inertia sensor-based walking speed estimation methods, Proceedings of the Annual International Conference of the IEEE Engineering in Medicine and Biology Society, EMBS, 2011, 3484-3487.

Lewek, M. D., The influence of body weight support on ankle mechanics during treadmill walking, Journal of Biomechanics, 2011, 128-133, vol. 44, No. 1.

Li, Q., et al., "Walking speed estimation using a shank-mounted inertial measurement unit," 2010, Journal of Biomechanics, 1640-1643, vol. 43, No. 8.

Lin, S.-J., et al., "Physical activity, functional capacity, and step variability during walking in people with lower-limb amputation," May 2014, Gait & Posture, 140-144, vol. 40.

Mahon, C. E., et al., "Individual limb mechanical analysis of gait following stroke," Apr. 2015, Journal of Biomechanics, 984-989, vol. 48.

McGraw, K. O. and Wong, S. P., "Forming inferences about some intraclass correlations coefficients," 1996, Psychol. Methods, 390-390, DOI: 10.1037/1082-989X. 1.4.390, 30-46, vol. 1, No. 1.

Miyazaki, S., "Long-term unrestrained measurement of stride length and walking velocity utilizing a piezoelectric gyroscope," Aug. 1997, IEEE Transactions on Biomed. Eng., DOI: 10.1109/10. 605434, 753-759, vol. 44, No. 8.

Morris, M. E., et al., "The biomechanics and motor control of gait in Parkinson disease," Jul. 2001, Clinical Biomechanics, 459-470, vol. 16.

Morris, M., et al., "Abnormalities in the stride length-cadence relation in parkinsonian gait," 1998, Mov. Disord., DOI: 10.1002/mds.870130115, 61-69, vol. 13, No. 1.

Papagelopoulos, P. J. and Sim, F. H., "Limited Range of Motion After Total Knee Arthroplasty: Etiology, Treatment, and Prognosis," Nov. 1997, Orthopedics, 1061-1065, vol. 20.

Phadke, C. P., "Immediate Effects of a Single Inclined Treadmill Walking Session on Level Ground Walking in Individuals After Stroke," Apr. 2012, American Journal of Physical Medicine & Rehabilitation, 337-345, vol. 91.

Rossignol, S. and Jones, G., "Audio-spinal influence in man studied by the H-reflex and its possible role on rhythmic movements synchronized to sound," Jul. 1976, Electroencephalography and Clinical Neurophysiology, 83-92, vol. 41.

Ryu, H. X. and Park, S., "Estimation of unmeasured ground reaction force data based on the oscillatory characteristics of the center of mass during human walking," Apr. 2018, Journal of Biomechanics, 135-143, vol. 71.

Simon, S. R., "Quantification of human motion: gait analysis—benefits and limitations to its application to clinical problems," 2004, J. Biomech., DOI: 10.1016/j.jbiomech.2004.02.047, 1869-1880, 37.

Thieme, H., et al., "Reliability and Validity of the Functional Gait Assessment (German Version) in Subacute Stroke Patients," Sep. 2009, Archives of Physical Medicine and Rehabilitation, 1565-1570, vol. 90.

Tolosa, E., et al., "The diagnosis of Parkinson's disease," Jan. 2006, The Lancet Neurology, 75-86, vol. 5.

Toro, B., et al., "The status of gait assessment among physiotherapists in the United Kingdom," Dec. 2003, Arch. Phys. Medicine Rehabil., DOI: 10.1016/S0003-9993(03)00482-9, 1878-1884, 84.

Vilas-Boas, M. d. C. and Cunha, J. P. S., "Movement Quantification in Neurological Diseases: Methods and Applications," 2016, IEEE Rev. Biomed. Eng., DOI: 10.1109/RBME.2016.2543683, 15-31, vol. 9.

Williams, G. P., et al., "Mobility After Traumatic Brain Injury," 2013, Journal of Head Trauma Rehabilitation, 371-378, vol. 28, No. 5.

Yang, S., et al., "Estimation of spatio-temporal parameters for post-stroke hemiparetic gait using inertial sensors," Mar. 2013, Gait & Posture, 354-358, vol. 37.

"ATS Statement: Guidelines for the Six-Minute Walk Test", American Journal of Respiratory and Critical Care Medicine, vol. 166, No. 1, Mar. 2002, pp. 111-117.

Ancillao et al., "Indirect Measurement of Ground Reaction Forces and Moments by Means of Wearable Inertial Sensors: A Systematic Review", Sensors, vol. 8, No. 18:2564, Aug. 5, 2018, pp. 1-34.

Andersson et al., "How to identify potential fallers in a stroke unit: validity indexes of 4 test methods", J. Rehabil. Med., May 2006, vol. 38, 186-191.

(56) References Cited

OTHER PUBLICATIONS

Arens et al., "Real-time gait metric estimation for everyday gait training with wearable devices in people poststroke", Wearable Technologies, 2021, vol. 2, pp. e2-17.
Awad et al., "A soft robotic exosuit improves walking in patients after stroke", Sci. Transl. Med., vol. 9, No. 400:eaai9084, Jul. 26, 2017, pp. 1-12.
Awad et al., "Distance-Induced Changes in Walking Speed After Stroke: Relationship to Community Walking Activity", J. Neurol. Phys. Ther., vol. 43, No. 4, Oct. 2019, pp. 220-223.
Awad et al., "Efficacy and safety of using auditory-motor entrainment to improve walking after stroke: a multi-site randomized controlled trial of in Tandem (Trademark)", Nature Communications, vol. 15, No. 1:1081, Feb. 8, 2024, pp. 1-11.
Awad et al., "Paretic Propulsion and Trailing Limb Angle Are Key Determinants of Long-Distance Walking Function After Stroke", Neurorehabilitation and Neural Repair, vol. 29, No. 6, Jul. 2015, pp. 499-508.
Awad et al., "Reducing circumduction and hip hiking during hemiparetic walking through targeted assistance of the paretic limb using a soft wearable robot", Am. J. Phys. Med. Rehabil., vol. 96, No. 10, Supply 1, Oct. 2017, pp. S157-S164.
Awad et al., "Reducing the Cost of Transport and Increasing Walking Distance After Stroke: A Randomized Controlled Trial on Fast Locomotor Training Combined With Functional Electrical Stimulation", Neurorehabil Neural Repair, vol. 30, No. 7, Aug. 2016, pp. 661-670.
Awad et al., "Targeting paretic propulsion to improve poststroke walking function: a preliminary study", Arch. Phys. Med. Rehabil, vol. 95, No. 5, May 2014, pp. 840-848.
Awad et al., "These legs were made for propulsion: advancing the diagnosis and treatment of post-stroke propulsion deficits", Journal of Neuro Engineering and Rehabilitation, 2020, vol. 17, No. 1:139, pp. 1-16.
Awad et al., "Walking Faster and Farther With a Soft Robotic Exosuit: Implications for Post-Stroke Gait Assistance and Rehabilitation", IEEE Open J. Eng. Med. Biol., vol. 1, 2020, pp. 108-115.
Bae et al., "A lightweight and efficient portable soft exosuit for paretic ankle assistance in walking after stroke", 2018 IEEE International Conference on Robotics and Automation (ICRA), May 21-25, 2018, pp. 2820-2827.
Bae et al., "A soft exosuit for patients with stroke: Feasibility study with a mobile off-board actuation unit", Rehabilitation Robotics (ICORR), 2015 IEEE International Conference on Rehabilitation Robotics (ICORR), Aug. 11-14, 2015, pp. 131-138.
Bae et al., "Biomechanical mechanisms underlying exosuit-induced improvements in walking economy after stroke", Journal of Experimental Biology, vol. 221, Mar. 7, 2018, pp. 1-11.
Balasubramanian et al., "Relationship Between Step Length Asymmetry and Walking Performance in Subjects With Chronic Hemiparesis", Arch. Phys. Med. Rehabil., Arch Phys Med Rehabil., vol. 88, No. 1, Jan. 2007, pp. 43-49.
Balbinot et al., "Mechanical and energetic determinants of impaired gait following stroke: segmental work and pendular energy transduction during treadmill walking", Biol. Open, vol. 9, No. 7, Jul. 21, 2020, pp. 1-8.
Barker et al., "Accuracy, reliability, and validity of a spatiotemporal gait analysis system", Medical Engineering & Physics, vol. 28, Issue 5, Jun. 2006, pp. 460-467.
Baudendistel et al."Levodopa facilitates improvements in gait kinetics at the hip, not the ankle, in individuals with Parkinson's disease", J. Biomech., May 24, 2021, vol. 121: 110366, pp. 1-10.
Bejarano et al., "A Novel Adaptive, Real-Time Algorithm to Detect Gait Events From Wearable Sensors", in IEEE Transactions on Neural Systems and Rehabilitation Engineering, vol. 23, No. 3, May 2015, pp. 413-422.
Benjamin et al., "Heart Disease and Stroke Statistics-2018 Update: A Report From the American Heart Association", Circulation, vol. 137, No. 12, Mar. 20, 2018, pp. e67-e492.
Bethoux et al., "Evaluating walking in patients with multiple sclerosis: which assessment tools are useful in clinical practice?", International Journal of MS Care, vol. 13, No. 1, 2011, pp. 4-14.
Boutaayamou et al., "Development and validation of an accelerometer-based method for quantifying gait events", Medical Engineering and Physics, vol. 37, No. 2, Feb. 2015, pp. 226-232.
Bowden et al., "Anterior-Posterior Ground Reaction Forces as a Measure of Paretic Leg Contribution in Hemiparetic Walking", Stroke, vol. 37, No. 3, Mar. 2006, pp. 872-876.
Browne et al., "Ankle Power Biofeedback Reverses the Distal-to-Proximal Redistribution in Older Adults", Gait Posture, vol. 71, Jun. 2019, pp. 44-49.
Browne et al., "Does dynamic stability govern propulsive force generation in human walking?", R. Soc. Open Sci., vol. 4, No. 11:171673, Nov. 29, 2017, pp. 1-13.
Bukowska et al., "Neurologic Music Therapy Training for Mobility and Stability Rehabilitation with Parkinson's Disease—A Pilot Study", Front. Hum. Neurosci., vol. 9, Article 710, Jan. 2016, pp. 1-12.
Chen et al., "Toward Pervasive Gait Analysis With Wearable Sensors: A Systematic Review", IEEE J. Biomed. Health Inform., vol. 20, No. 6, Nov. 2016, pp. 1521-1537.
Collimore et al., "Autonomous Control of Music to Retrain Walking After Stroke", Neurorehabilitation and Neural Repair, vol. 37, No. 5, May 2023, pp. 255-265.
Confavreux, "Defining the natural history of MS: the need for complete data and rigorous definitions", Multiple Sclerosis, vol. 14, No. 3, Apr. 2008, pp. 289-291.
Conklyn et al., "A Home-Based Walking Program Using Rhythmic Auditory Stimulation Improves Gait Performance in Patients With Multiple Sclerosis: A Pilot Study", Neurorehabilitation and Neural Repair, vol. 24, No. 9, Nov.-Dec. 2010, pp. 835-842.
Daley et al., "Running stability is enhanced by a proximo-distal gradient in joint neuromechanical control", J. Exp. Biol., vol. 210, No. pt 3, Feb. 2007, pp. 383-394.
Devita et al., "Age Increases the Skeletal Versus Muscular Component of Lower Extremity Stiffness During Stepping Down", Journal of Gerontology: Biological Sciences, vol. 55, No. 12, Dec. 2000, pp. B593-B600.
Dobkin et al., "The Evolution of Personalized Behavioral Intervention Technology: Will It Change How We Measure or Deliver Rehabilitation?", Stroke, vol. 8, No. 8, Aug. 2017, pp. 2329-2334.
Donelan et al., "Mechanical work for step-to-step transitions is a major determinant of the metabolic cost of human walking", The Journal of Experimental Biology, vol. 205, No. Pt 23, Dec. 2002, pp. 3717-3727.
Engelhard et al., "Quantifying six-minute walk induced gait deterioration with inertial sensors in multiple sclerosis subjects", Gait Posture, Sep. 2016, vol. 49, pp. 340-345.
Farris et al., "Revisiting the mechanics and energetics of walking in individuals with chronic hemiparesis following stroke: from individual limbs to lower limb joints", Journal of Neuro Engineering and Rehabilitation, vol. 12, No. 24, Feb. 27, 2015, pp. 1-12.
Filli et al., "Profiling walking dysfunction in multiple sclerosis: characterisation, classification and progression over time", Sci Rep., vol. 8, No. 1:4984, Mar. 21, 2018, pp. 1-13.
Flansbjer et al., "Reliability of gait performance tests in men and women with hemiparesis after stroke", J. Rehabil. Med., vol. 37, 2005, pp. 75-82.
Forsberg et al., "The Functional Gait Assessment in People with Multiple Sclerosis Validity and Sensitivity to Change", International Journal of MS Care, Mar.-Apr. 2017, vol. 19, No. 2, pp. 66-72.
Franchignoni et al., "Using psychometric techniques to improve the Balance Evaluation Systems Test: the mini-BESTest", J. Rehabil. Med., vol. 42, No. 4, Apr. 2010, pp. 323-331.
Franz et al., "How does age affect leg muscle activity/coactivity during uphill and downhill walking?", Gait Posture, Mar. 2013, vol. 37, No. 3, pp. 378-384.
Fricke et al., "Evaluation of Three Machine Learning Algorithms for the Automatic Classification of EMG Patterns in Gait Disorders", Frontiers in Neurology, vol. 12, Article 666458, May 2021, pp. 1-11.

(56) References Cited

OTHER PUBLICATIONS

Fritz et al., "White paper: walking speed: the sixth vital sign", Journal of Geriatric Physical Therapy, vol. 32, No. 2, 2009, pp. 46-49.

Fulk et al., "Predicting Home and Community Walking Activity in People With Stroke", Arch. Phys. Med. Rehabil., vol. 91, No. 10, Oct. 2010, pp. 1582-1586.

Fulk et al., "Predicting Home and Community Walking Activity Poststroke", Stroke, vol. 48, No. Feb. 2, 2017, pp. 406-411.

GBD 2016 Parkinson's Disease Collaborators, "Global, regional, and national burden of Parkinson's disease, 1990-2016: a systematic analysis for the Global Burden of Disease Study 2016", Lancet Neurol., vol. 17, No. 11, Nov. 2018, pp. 939-953.

Genthe et al., "Effects of real-time gait biofeedback on paretic propulsion and gait biomechanics in individuals post-stroke", Top Stroke Rehabil., vol. 25, No. 3, Apr. 2018, pp. 186-193.

Gladstone et al., "The Fugl-Meyer Assessment of Motor Recovery after Stroke: A Critical Review of Its Measurement Properties", Neurorehabil Neural Repair, vol. 16, No. 3, Sep. 2002, pp. 232-240.

\* cited by examiner

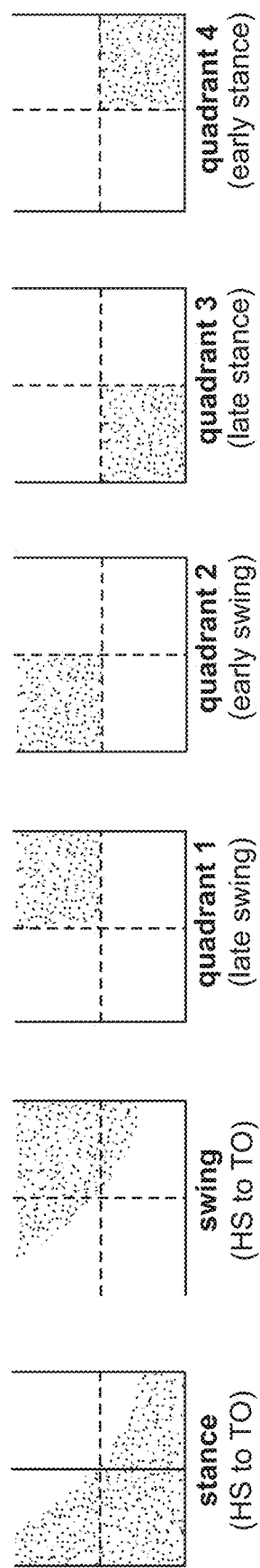
FIG. 6B
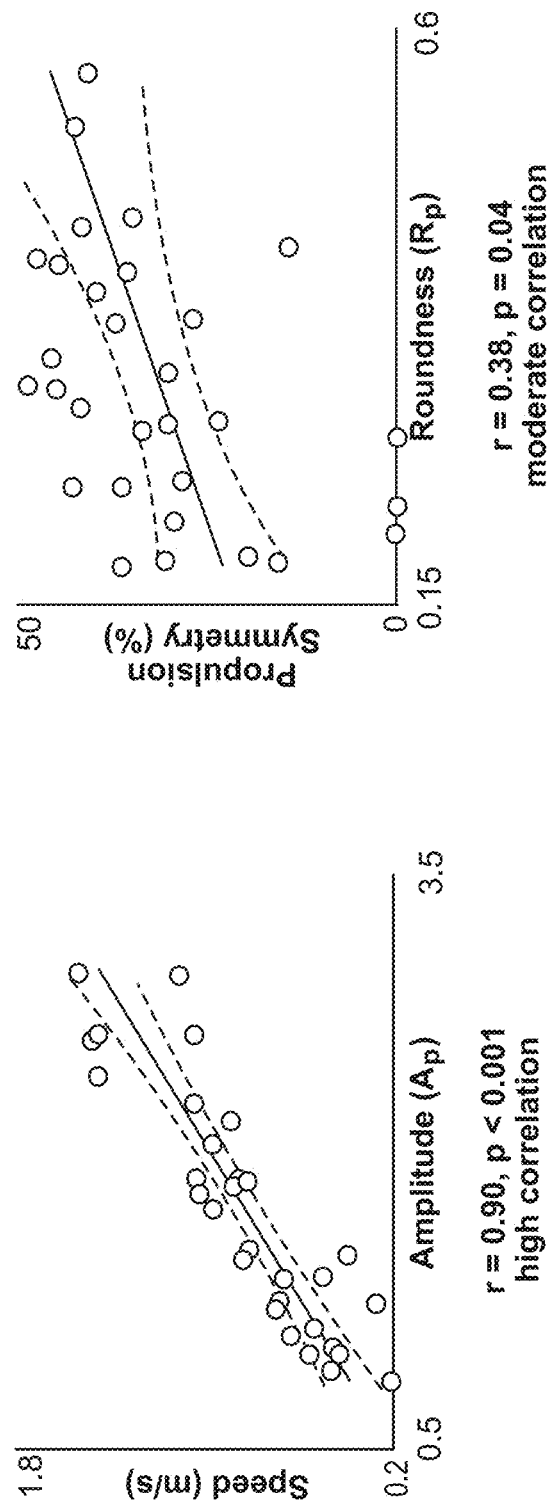
FIG. 6D
FIG. 6C

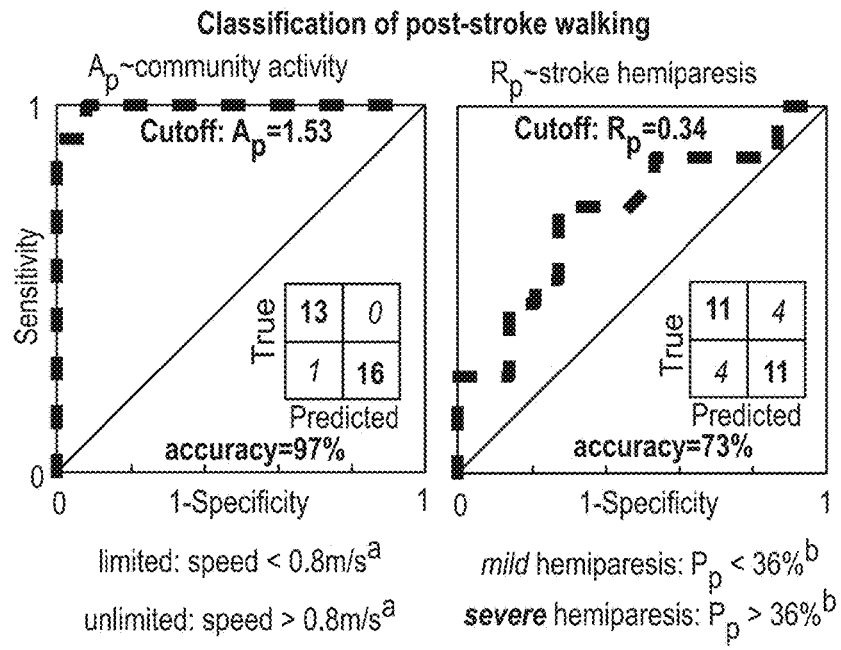
FIG. 7A
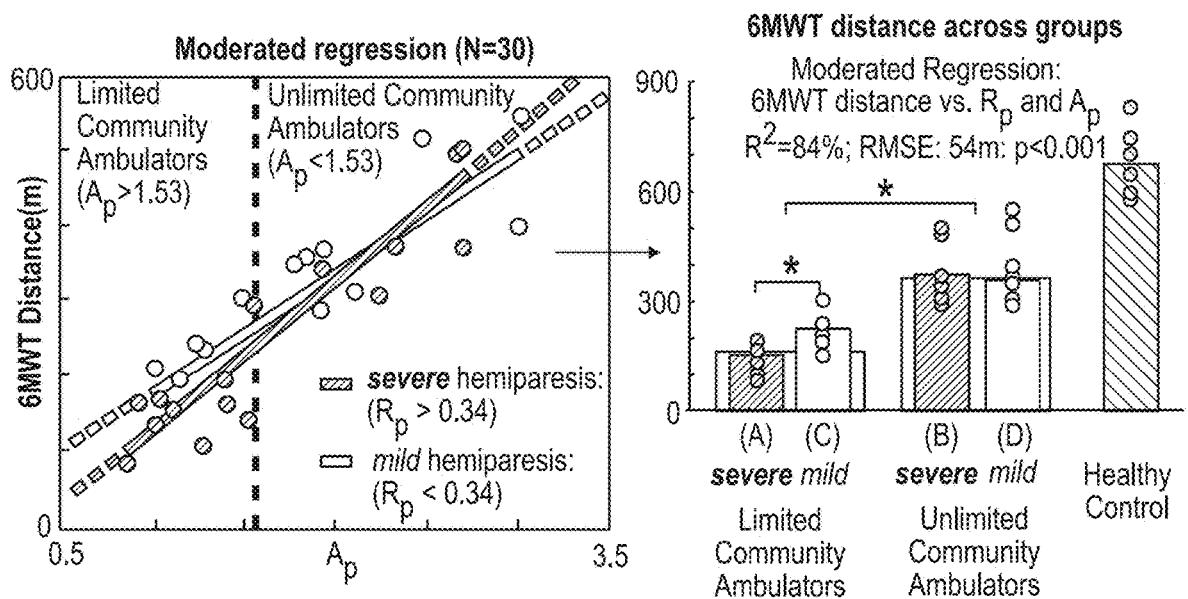
FIG. 7B
FIG. 7C

|  | Limited Community Ambulator | | | Unlimited Community Ambulator | | | Unlimited - Limited Diff | Healthy Control (N=8) |
|---|---|---|---|---|---|---|---|---|
|  | Severe (N=7) | Mild (N=6) | Diff | Severe (N=7) | Mild (N=6) | Diff | | |
| Ap | 1.03 ± 0.44 | 1.18 ± 0.18 | 0.15 | 2.28 ± 0.77 | 1.92 ± 0.49 | -0.36 | 0.97* | 3.36 ± 0.54 |
| Rp | 0.33 ± 0.04 | 0.42 ± 0.12 | 0.09* | 0.34 ± 0.16 | 0.41 ± 0.09 | 0.07* | 0.01 | 0.62 ± 0.06 |
| 6MWT, m | 142 ± 50 | 233 ± 46 | 81* | 357 ± 64 | 349 ± 80 | -8 | 185* | 677 ± 127 |
| FGA, points | 10.5 ± 4 | 14 ± 4 | 3.5† | 19 ± 3 | 20 ± 9 | 1 | 7.5* | -- |
| Pp (%) | 0.16 ± 0.40 | 0.39 ± 0.07 | 0.23 | 0.30 ± 0.07 | 0.42 ± 0.13 | 0.12* | 0.03 | 0.48 ± 0.01 |
| Age, y | 62 ± 11 | 66 ± 5 | 4 | 54 ± 11 | 54 ± 0.16 | 0 | 10* | 25 ± 4 |
| Onset, y | 5.3 ± 2.6 | 6.3 ± 11.6 | 1 | 6.5 ± 5.4 | 5.7 ± 3.7 | 0.8 | 0.38 | -- |

Abbreviation: Diff = absolute difference between mild and sever individuals within each group; Ap and Rp are the median paretic thigh polar-radius amplitude and roundness during the 6MWT respectively; Pp is the propulsion impulse asymmetry[10] (50% = perfect symmetry); *p<0.05;†p<0.10; Note: Table includes endurant individuals only (N=26)

FIG. 9

BIOMECHANICAL MEASUREMENT DEVICES AND USES THEREOF FOR PHENOTYPE-GUIDED MOVEMENT ASSESSMENT, INTERVENTION, AND ACTIVE ASSISTANCE DEVICE CONTROL

RELATED APPLICATION

This application claims the benefit of U.S. Provisional Application No. 63/487,111, filed on Feb. 27, 2023. The entire teachings of the above application are incorporated herein by reference.

GOVERNMENT SUPPORT

This invention was made with government support under EB015408 from National Institutes of Health. The government has certain rights in the invention.

BACKGROUND

Neuromotor injuries such as stroke, neurological diseases such as Parkinson disease and multiple sclerosis, and age-related neuromuscular decline each result in highly heterogeneous movement impairments. Movement scientists use resource-intensive biomechanical instruments to study the locomotor impairments of patients from these diagnostic groups. However, lab-based measurement systems are not easily accessible by rehabilitation clinicians working in inpatient settings and are not feasible in most outpatient settings. Moreover, because human movement is known to be different in clinical vs. naturalistic settings, technologies that enable free-living movement assessments are gaining interest. There is a major need for clinical movement analysis tools and approaches that combine the measurement abilities of lab-based instruments with the portability and ease-of-use required by clinical end-users.

SUMMARY

A method may comprise receiving movement data associated with a subject, the movement data collected during repetitive movement of the subject; generating a phase portrait based on the movement data; calculating a phase portrait metric of a characteristic of the phase portrait; and assigning the subject to a movement phenotype based on the phase portrait metric.

The movement data may be received from an inertial measurement unit.

The inertial measurement unit may be positioned at a thigh of the subject.

The repetitive movement may comprise ambulation including at least one stride, and the phase portrait may be generated based on the movement data associated with the at least one stride.

Calculating the phase portrait metric may comprise calculating an amplitude for a first stride of the at least one stride based on an average polar radius of the phase portrait for the first stride.

Calculating the phase portrait metric may comprise calculating an average amplitude based on the amplitude of each stride of the at least one stride.

Calculating the phase portrait metric may comprise calculating a minimum polar radius of the phase portrait for a first stride of the at least one stride; calculating a maximum polar radius of the phase portrait for the first stride; and calculating a roundness for the first stride based on a ratio of the minimum polar radius to the maximum polar radius.

Calculating the phase portrait metric may comprise calculating an average roundness based on the roundness of each stride of the at least one stride.

Calculating the phase portrait metric may comprise calculating a smoothness for a first stride of the at least one stride based on a measure of the variability of the phase portrait for the first stride, including time-domain (e.g., standard deviation, variance, root mean square, etc.), frequency-domain (e.g., power spectral density, spectral entropy, peak frequency, etc.), or non-linear methods of measuring variability (e.g., sample entropy, Lyapunov exponent, detrended fluctuation analysis, etc.).

Calculating the phase portrait metric may comprise calculating an average smoothness based on the smoothness of each stride of the at least one stride.

The method may further comprise applying a treatment to the subject based on the assigned movement phenotype, the treatment comprising at least one of a robotic exosuit, a neuroprosthesis, or a Rhythmic Auditory Stimulation (RAS) device.

Each phase portrait may comprise multiple parts, including four quadrants, or a stance and a swing phase, with each quadrant or phase corresponding to a portion of a stride of the repetitive movement comprising at least one stride, and applying the treatment may comprise applying the treatment based on the phase portrait metric within at least one quadrant or phase of the phase portrait.

Each phase portrait may comprise a stance region and the treatment may be determined based on a calculation of an average roundness of the phase portrait in the stance region.

Calculating the phase portrait metric may comprise calculating at least one of a maximum amplitude, a minimum amplitude, a maximum roundness, a minimum roundness, a maximum smoothness, or a minimum smoothness.

Calculating the phase portrait metric may comprise calculating an amplitude for each stride of the repetitive movement based on an average polar radius of the phase portrait for each stride, and calculating an average amplitude based on the amplitude of each stride, and the treatment may comprise applying exosuit augmented gait training to the subject with an assigned movement phenotype based on an average amplitude greater than a cutoff amplitude.

Calculating the phase portrait metric may comprise calculating a minimum polar radius of the phase portrait for a first stride of the at least one stride; calculating a maximum polar radius of the phase portrait for the first stride; calculating a roundness for the first stride based on a ratio of the minimum polar radius to the maximum polar radius; and calculating an average roundness based on the roundness of each stride of the at least one stride, and the treatment may comprise applying exosuit augmented gait training to the subject with an assigned movement phenotype based on the average roundness greater than a cutoff roundness.

The movement phenotype may be established based on at least one phase portrait metric cutoff associated with a biomechanical or a motor control impairment.

The method may further comprise associating the phase portrait metric with a biomechanical metric; and establishing a phenotype based on the phase portrait metric.

The method may further comprise determining a cutoff metric to establish one or more phenotypes.

The phase portrait metric may comprise the average amplitude and the biomechanical metric may comprise a walking speed.

The phase portrait metric may comprise the average roundness and the biomechanical metric may comprise a propulsion.

A system may comprise a sensor configured to collect movement data associated with a subject during repetitive movement of the subject; and a processor operationally coupled to the sensor, the processor may be configured to receive movement data associated with the subject from the sensor, the movement data collected during repetitive movement of the subject; generate a phase portrait based on the movement data; calculate a phase portrait metric of a characteristic of the phase portrait; and assign the subject to a movement phenotype based on the phase portrait metric.

The sensor may comprise an inertial measurement unit.

The repetitive movement may comprise ambulation including at least one stride, and the phase portrait may be generated based on the movement data associated with the at least one stride.

The phase portrait metric may comprise an amplitude for a first stride of the at least one stride based on an average polar radius of the phase portrait for the first stride.

The phase portrait metric may comprise an average amplitude based on the amplitude of each stride of the at least one stride.

The phase portrait metric may comprise a minimum polar radius of the phase portrait for a first stride of the at least one stride; a maximum polar radius of the phase portrait for the first stride; and a roundness for the first stride based on a ratio of the minimum polar radius to the maximum polar radius.

The phase portrait metric may comprise an average roundness based on the roundness of each stride of the at least one stride.

The phase portrait metric may comprise a smoothness for a first stride of the at least one stride based on a measure of the variability of the phase portrait for the first stride.

The phase portrait metric may comprise an average smoothness based on the smoothness of each stride of the at least one stride.

The movement phenotype may be established based on a phase portrait metric associated with a biomechanical metric or a motor control impairment.

The processor may be further configured to associate the phase portrait metric with a biomechanical metric; and establish a phenotype based on the phase portrait metric.

The system may further comprise a control interface module that translates the assigned movement phenotype into at least one device-specific actionable command.

The system may further comprise a visual interface configured to provide the assigned movement phenotype to a clinician.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 6B shows example permutations of features by changing a region of interest. HS refers to heel strike and TO refers to toe-off.

FIG. 6C shows example data for polar radius of a phase portrait plotted against speed.

FIG. 6D shows example data for roundness of a phase portrait plotted against propulsion symmetry.

FIG. 7A shows an example Receiver Operating Characteristic (ROC) curve for classification of post-stroke participants based on amplitude ($A_p$) and roundness ($R_p$) during the six-minute walk test relating to community ambulation.

FIG. 7B shows an example of a moderated regression.

FIG. 7C shows example results of a six-minute walk test and compares distance walked across groups classified based on the ROC curve cutoffs (movement phenotypes).

FIG. 9 shows an example comparison of baseline characteristics between phenotypes.

DETAILED DESCRIPTION

A description of example embodiments follows.

Movement is widely considered a window into health and disease. The advance of movement measurement tools and approaches that are accessible by clinicians and that can measure movement in naturalistic settings have the potential to enhance traditional medical diagnostics and advance patient-tailored interventions. Systems, devices, and methods described herein involve a combination of wearable movement sensors with novel movement analysis algorithms as a potential solution. Inertial measurement units (or IMUs) provide a rich array of biomechanically-relevant data that has been useful in identifying unique locomotor phenotypes based on both movement quality (i.e., gait symmetry, variability, motor control strategy, etc.) and function (i.e., speed, endurance, etc.). Experimental research in people with post-stroke hemiparesis suggests that this classification approach may have diagnostic value in identifying different patterns of biomechanical and motor control impairment, prognostic value in directing intervention selection, and evaluative value in identifying intervention-induced changes in gait quality and/or function. Because IMUs are inexpensive and can be used easily across both clinical and free-living settings, IMU-based locomotor phenotyping is highly scalable and has the potential to address measurement and intervention gaps that have hindered progress in the field of gait rehabilitation.

Precision Medicine is a new approach in medicine that accounts for unique individual patient variability during the intervention selection process, as well as during implementation [1, 2]. A dearth in targeted gait interventions, and the lack of clinically-accessible gait measurement tools and approaches that can match individual patients to those targeted gait interventions, has limited the advance of precision gait rehabilitation. Precision-based interventions are poised to make healthcare more efficient and effective [1, 2]; however, before precision approaches are attainable in the field of gait rehabilitation, new tools and methods that allow clinicians to easily capture biomechanically salient gait features in naturalistic settings are required.

Common non-specific gait deficits in neurological disease: Stroke, Parkinson's disease, and multiple sclerosis are examples of pathologically-distinct neurological conditions that affect movement. However, all three share common gait impairments, including slow walking, reduced propulsion, reduced stride lengths, increased stride times, increased variability, and spatiotemporal asymmetries. Though disease-specific impairments are clearly evident, common patterns of gait impairment are also observable across these diagnostic groups, and individuals with similar gait impairment patterns are likely to respond similarly to different gait-targeting interventions, irrespective of their diagnostic label.

Figure 1A:
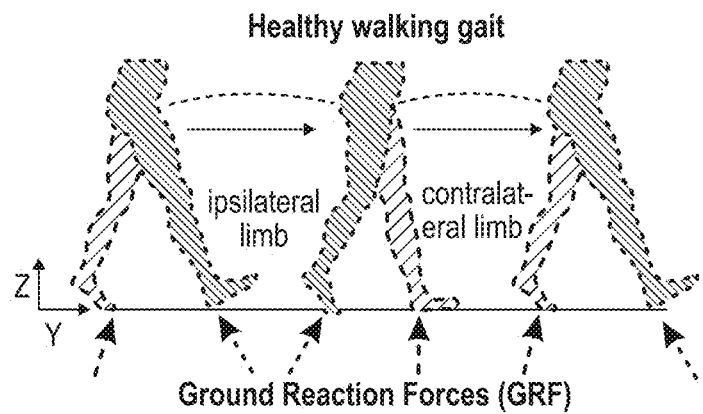
FIG. 1A shows example ground reaction forces (GRF) for a healthy walking gait.
Figure 1B:
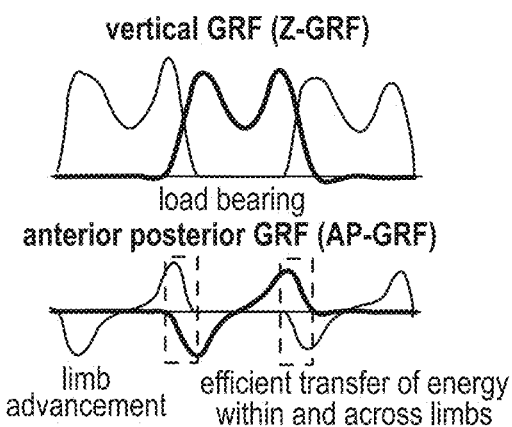
FIG. 1B shows example GRF and anterior posterior GRF (AP-GRF).

Biomechanical importance of the step-to-step transition: The neuromechanical processes underlying healthy bipedal locomotion are multi-factorial [3, 4, 5] and converge on locomotor patterns that are characteristically fast, efficient, and stable [3, 6]. An impaired ability to transition from step to step is a locomotor deficit common across many diagnostic groups [7, 8, 9, 10, 11]. During the step-to-step transition of each gait cycle, a braking force is generated by the leading limb as it makes contact with the ground in front of the body (see FIG. 1A). To efficiently accelerate the body into the next step, coordination of the timing and magnitude of the forward propulsion force generated by the trailing limb is required [12, 13, 3, 14]. Moreover, to walk faster, healthy individuals symmetrically increase the magnitude of propulsion generated by each limb while maintaining the relative timing of the propulsion peak [13, 15, 16]. In individuals with impaired propulsion function during the step-to-step transition, walking is often slow, metabolically expensive, asymmetric, and unstable [17, 18, 19, 20].

Figure 1C:
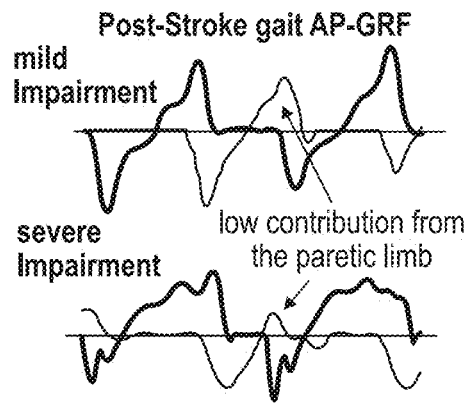
FIG. 1C shows an example of post-strike gait AP-GRF with mild impairment and severe impairment.

Propulsion impairment after stroke: Stroke is one of the foremost causes of long-term disability in adults [21]. For individuals with post-stroke hemiparesis, impaired propulsion by the paretic limb [10, 22] hinders the body's ability to accelerate forward [3], resulting in an increased energy cost of walking [23] and a characteristically slow and unstable gait [18, 19, 20, 17]. Though the propulsion deficits of individuals post-stroke are highly evident, current gait rehabilitation efforts have, by and large, focused on improving walking speed as the top priority during post-stroke rehabilitation [24], and not on improving paretic propulsion. Walking speed is a key indicator of functional independence [25] and can easily be quantified by clinicians, making it a good target measure for rehabilitation. However, the speed of walking is not indicative of the underlying propulsive strategy. Indeed, compensations within and across limbs allow individuals with significant paretic propulsion impairments to attain higher functional walking speeds [10, 26] (see FIG. 1C). When this happens, the benefits of faster walking may be overshadowed by persisting metabolically-expensive and unstable gait patterns [9, 27, 28]. Though clinicians commonly focus on the spatial-temporal characteristics of walking (i.e., stride time, step time, stance time, swing time, double support time, step length, step width, and stride length), an impaired propulsion strategy is often what underlies these more visible impairments [29].

Propulsion impairment in Parkinson's disease and multiple sclerosis: Though propulsion impairment has not been the subject of substantial study in the Parkinson disease and multiple sclerosis literature, like stroke, these neurological conditions inhibit important biomechanical functions like the step-to-step transition [30, 31], with the corresponding spatiotemporal deficits widely documented [8, 32].

Parkinson disease is a neurodegenerative disease that can lead to diverse abnormalities in gait. The cause of Parkinson's is largely unknown, leading to few diagnostic and treatment options for both the disease and its debilitating effects on gait quality and function [33]. Parkinson disease is associated with specific gait impairments, including occasional tremors, slowness of movement (bradykinesia), limb rigidity, and an overall unstable gait [8]. Recent work also suggests that non-specific deficits, including force generation during walking, may play a key role in explaining the gait deficits of people with Parkinson's. Indeed, recent work evaluating the effect of Levodopa on force production and walking ability shows a medication-induced increase in propulsive force, together with improvements in walking speed, step length, and step time [30].

Multiple Sclerosis—though pathologically different from both Stroke and Parkinson disease [34]—is also associated with substantial gait impairment. Although walking limitation is among the most visible manifestations of multiple sclerosis [7], multiple sclerosis-specific gait impairments are poorly characterized; indeed, there is no typical gait pattern associated specifically with multiple sclerosis [32]. Individuals post-stroke and individuals with multiple sclerosis often present with similar non-specific gait deficits, making multiple sclerosis difficult to identify based on observation alone, with neuro-imaging (i.e., an MRI) often necessary to confirm the diagnosis [7, 32]. Though not yet widely documented, recent work with people with multiple sclerosis demonstrates the presence of a substantial propulsion impairment that is modifiable with gait intervention and related to improved walking outcomes [31].

Movement Phenotypes in health and disease: The human bipedal gait pattern is widely recognized as a highly efficient gait pattern, with specific evolutionary adaptations selected to minimize the energetic cost of locomotion. Though there is diversity in human gait patterns, certain features are remarkably similar across individuals due to our shared anatomical and environmental constraints. Similarly, though different neurological diseases and injuries may affect locomotor control differently, neuromotor adaptations to these different impairments follow similar patterns. For example, individuals with stroke-induced brain injuries that impair neural drive to the plantarflexor muscles—a key distal muscle group with a crucial role in physiological propulsion—and individuals with non-neural musculoskeletal disruption of plantarflexor function (e.g., an Achilles tendon injury), both compensate for plantarflexor impairments by relying more on the proximal hip muscles to drive gait propulsion; this phenomenon is described as a distal-to-proximal redistribution of joint power [19,140]. The common locomotor patterns that underlie both healthy and impaired gaits inform the notion of movement phenotypes.

Biomechanical Tools: From the Lab to the Clinic and Everyday World

Tools used to quantify gait deficits in the research laboratory: Laboratory-based motion analysis equipment, such as instrumented treadmills, forceplates, and optical motion capture systems are the gold standard in measuring walking quality (e.g., gait propulsion ability) and function (e.g., walking speed) [7, 35, 8, 10, 19, 36, 37, 38, 39, 40], and have been used extensively across diagnostic groups—from older individuals to neurological populations. For example, older adults are reported to generate up to 22% less peak propulsion (i.e., the peak of the anterior ground reaction force) compared to young adults [39, 40], with this deficit associated with a higher stepping cadence, lower stride length, and ultimately lower gait speed [41, 42]. In people post-stroke, the propulsion generated by the paretic limb is up to 68% less than the non-paretic limb [10, 19, 36, 37] and is correlated with step length asymmetry [29] and clinical measures of hemiparetic severity [10, 43]. Though limited, the evidence for propulsion impairment that is modifiable with intervention in individuals with Parkinson's disease or multiple sclerosis [30, 31] further highlights the importance of propulsion measurement systems.

Limitations in the state-of-the-art: Despite the importance of propulsion to a functional bipedal gait, conventional rehabilitation efforts have, by and large, been unable to restore propulsion function after neurological injury or dysfunction. The development and study of interventions that aim to improve walking specifically by targeting propulsion impairments is a highly active area of research [44, 45, 46, 47, 48, 49, 23, 50, 51, 52]; however, the clinical translation of these experimental treatments is hindered by the limited access that rehabilitation clinicians have to the sophisticated instrumentation (i.e., forceplates and instrumented treadmills) and personnel with advanced training required to collect, analyze, and interpret the biomechanical data required to measure propulsion function. Moreover, even in settings with access to a motion analysis laboratory, locomotor differences inherent to treadmill walking and the small collection footprint of most overground forceplate walk-ways limit ecological validity. Motion capture systems are relatively expensive and require high operational expertise to extract data. Furthermore, similar to the forceplates, motion capture systems are not clinically accessible and involve cumbersome marker setup procedures. Together, these limitations of the current state-of-the-art technology motivate the development of scalable point-of-care movement measurement systems that capture critical gait deficits, like propulsion. High-efficacy gait interventions will remain untenable if the measurement instruments necessary to accurately assess gait impairment remain inaccessible to most clinicians.

Inertial measurement units: Wearable sensors offer a promising solution for this measurement gap. IMUs have the potential to collect data continuously in the background of everyday walking activities; these data can advance new healthcare paradigms for aging adults and people with chronic neurological conditions [53, 54]. For example, because gait changes may precede a change in health status [55], the detection of gait changes during long-term gait monitoring can trigger the deployment of interventions to mitigate functional decline and prevent catastrophic events, such as a fall. Wearable inertial sensors have been used to extend gait measurements outside of the laboratory [56, 57, 58, 59, 60, 61], with a wide range of methods and sensors proving to be effective in providing indirect measurements of the ground reaction forces and spatial-temporal components generated during walking [62, 63, 64, 65, 66, 67]. For patient populations, while IMU-based temporal parameter estimations have been largely accurate, the accuracy of spatial parameter estimations is tenuous, and most other gait parameter estimations fall well short of the accuracy required to guide intervention. Propulsion estimation approaches, for example, have depended on assumptions of healthy, consistent walking patterns that do not translate to impaired locomotor patterns [68, 65]. The advance of new digital assessment tools that can accurately track individual patterns of locomotor ability during everyday walking activities is of high clinical significance given the importance of walking activity to health and quality of life [69, 66].

Phase Portraits: There are many approaches to using IMU data for clinical gait analysis—here we describe and expand on a graphical approach based in phase-portraits. A phase-portrait graphs position and velocity data to facilitate the study of cyclical movements—e.g., coupling thigh angle with its angular velocity, as in previous work (see FIGS. 2A-2C). Phase portraits have been used in a wide range of movement analysis applications, including the study of balance [70, 66], walking detection [71, 66], prosthesis control [72], and more recently walking speed estimation [73]. Because the neural control of rhythmic movements, like walking, is thought to require concurrent consideration of both velocity and position, coupling position and velocity data in the form of phase-portraits, and using phase-portraits to study movement after neurological disease, offers a powerful approach for clinical gait analysis. Indeed, phase-portraits of lower extremity movement during walking reflect the spatial-temporal control of walking over repeating limb-ground interactions, and thus capture the dynamic interaction of supraspinal and spinal neural circuitry with the external environment.

Figures 2A, 2B, 2C:
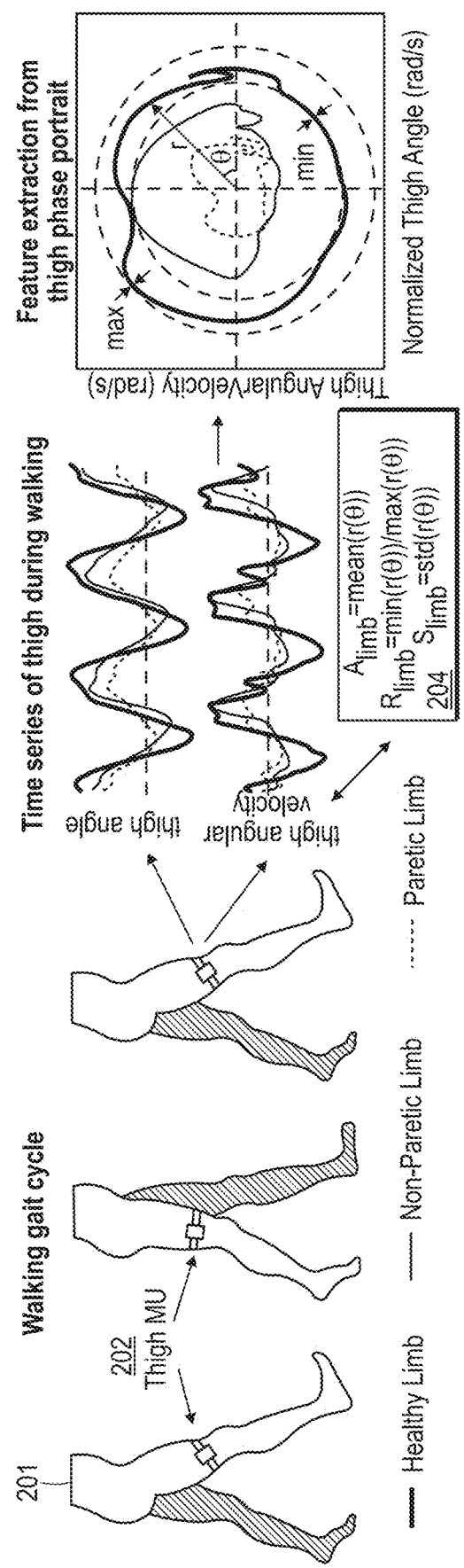
FIG. 2A shows an example walking gait cycle.
FIG. 2B shows an example time series of a thigh angle and thigh angular velocity, as measured with an inertial measurement unit (IMU).
FIG. 2C shows an example feature extraction from a thigh phase portrait.

In the example shown in FIG. 2A, a sensor 202 is positioned at a thigh of a subject 201. In this example, the sensor comprises an inertial measurement unit (IMU). In alternative configurations, a different type of sensor may be used. Example sensors may include, but are not limited to, optical motion capture sensors, flex sensors, IMUs, or any other suitable sensor. In the example shown in FIG. 2A, one sensor 202 is mounted on the subject 201. In alternative embodiments, more than one sensor 202 may be mounted on the subject 201. In the example shown in FIG. 2A, the sensor 202 is positioned at the thigh of the subject 201. In alternative configurations, at least one of the at least sensor 202 may be positioned at a different location, for example from any segment or limb. In alternative configurations, sensors 202 may be positioned over the entire body of the subject 201.

In various embodiments, such as the one shown in FIG. 2A, at least one of the at least one sensor 202 communicates with a processor 204. The communication may be wireless, wired, or a combination of both wireless and wired. The processor 204 may be configured to generate and/or organize data related to the activity of the subject 201. For example, FIG. 2B shows information related to the subject's 201 thigh angle and thigh angular velocity. The processor may be configured to generate a phase portrait, such was the one shown in FIG. 2C. The processor may be configured to extract at least one feature from a phase portrait (for example, amplitude, roundness, or smoothness).

In various embodiments, the processor 204 assigns a phenotype. In various embodiments, a different processor may assign a phenotype. In various embodiments, one or more devices may communicate phenotype information to a clinician. For example, in some embodiments, a visual interface may communicate phenotype information to the clinician. In some embodiments, the at least one sensor 202 and/or the processor 204 may communicate with at least one control interface module/unit. In some embodiments, the at least one sensor 202 and/or the processor 204 may communicate with at least one active assistance device.

Gait Augmenting Technology

Gait-targeting treatments are becoming more and more common in the field of gait rehabilitation. For example, Soft Robotic Exosuit technology aims to improve the walking of people with neuromotor impairments resulting from stroke, Multiple Sclerosis, and Parkinson's disease by way of mechanically augmenting the force output of target joints. Neuroprosthetic technologies are similar in their goal of increasing the force output of target joints; however, they utilize electrically-evoked muscle contractions to access latent force-generating capacity. Digitally-delivered Rhythmic Auditory Stimulation (RAS) interventions similarly aim to improve the walking of individuals from these same diagnostic groups, but instead of acting on muscles and/or joints, RAS acts on supraspinal neuromotor pathways by way of the neurally-mediated process of auditory-motor entrainment. Each of these gait interventions rely on a different mechanism-of-action to improve walking, and like pharmacological interventions in the field of medicine, the clinical effectiveness of these targeted gait interventions thus depends on appropriately matching patients to the right intervention.

Figure 3:
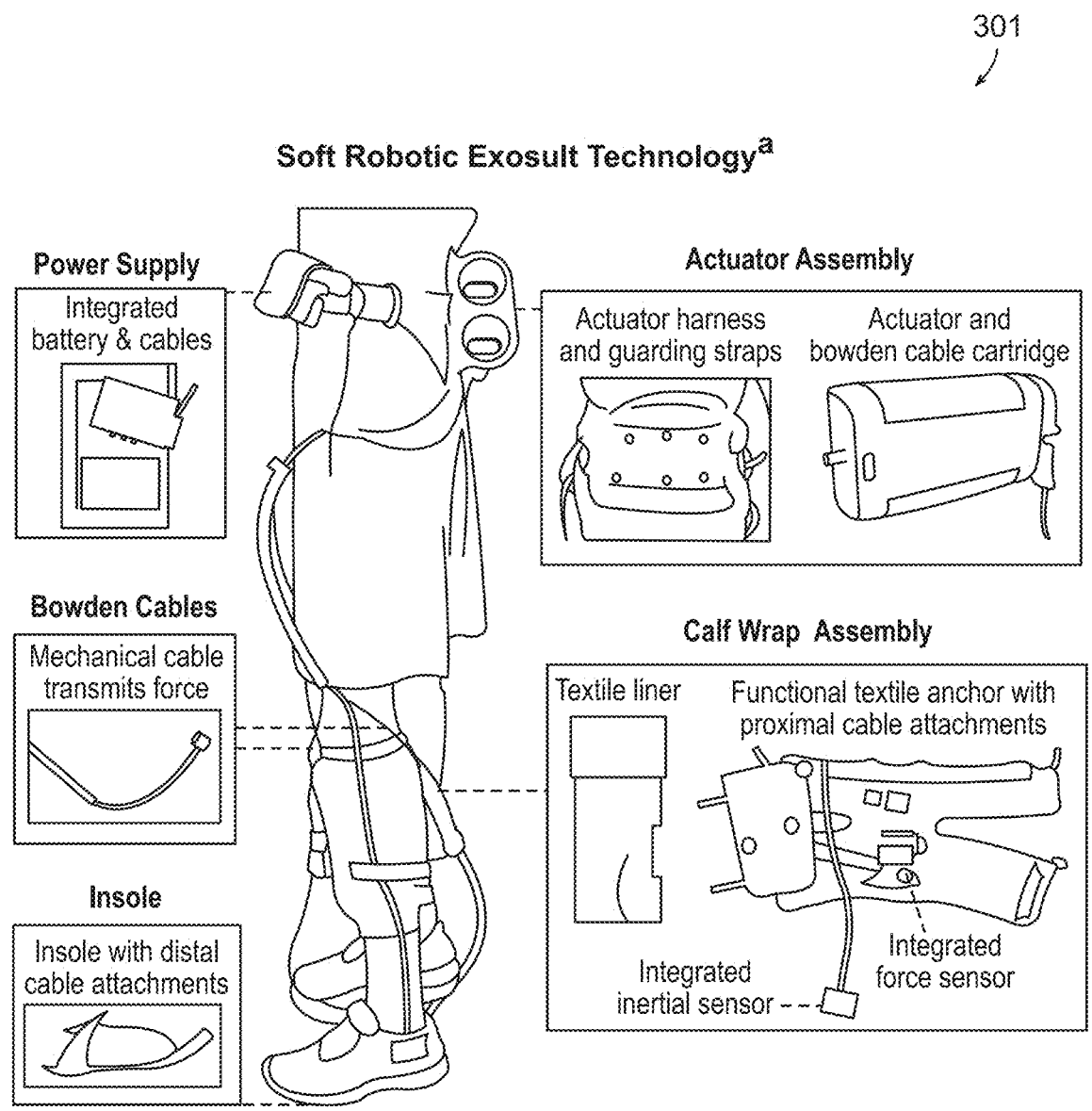
FIG. 3 shows an example of soft robotic exosuit technology.

Soft robotic exosuit technology: Systems, devices, and methods described herein may involve soft wearable robots, called exosuits 301 (see FIG. 3). The exosuit may be designed to assist paretic dorsiflexion during swing phase of the gait cycle to facilitate ground clearance and assist paretic plantarflexion during stance phase of the gait cycle to enhance propulsion [76, 77]. Past research on exosuits that focused on device development demonstrated within-session improvements in paretic ground clearance, forward propulsion [44], interlimb symmetry [44, 77], walking economy [80], and reduced gait compensations [78]. Together, these biomechanical changes enabled clinically-meaningful improvements in both short and long-distance walking function [79]. More recent studies have shown meaningful therapeutic improvements in paretic propulsion, and short and long-distance walking function with repeated exosuit-augmented gait intervention [26,136].

Figure 4:
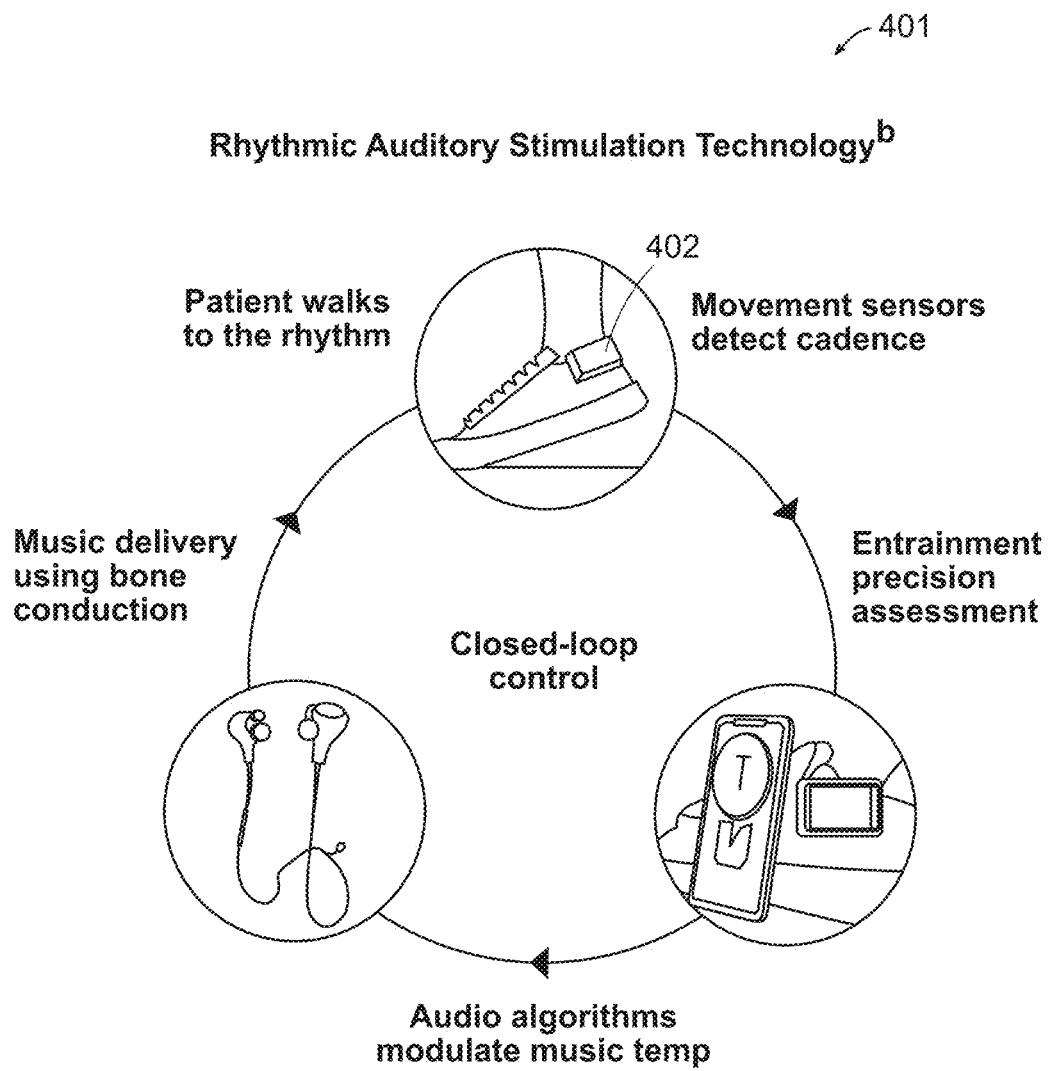
FIG. 4 shows an example process associated with Rhythmic Auditory Stimulation Technology.

Rhythmic Auditory Stimulation (RAS) technology 401: Digitally-delivered rhythmic auditory stimulation interventions have recently been advanced for people post-stroke [141], Parkinson disease [142], and multiple sclerosis [143] Past studies have shown that auditory-motor pathways exist in the part of the brain responsible for movement [81]—meaning the body movement patterns can be altered using auditory stimulation. Randomized controlled trials of RAS interventions have demonstrated improved walking speed compared to standard of care in multiple neurological populations, including in stroke [82, 75], Parkinson disease [83], multiple sclerosis [84], and cerebral palsy [85]. Previous work describing the digital delivery of rhythmic auditory stimulation (FIG. 4) shows that using foot sensors 402 to actively detect the wearer's walking pattern and adjusting the music's tempo accordingly can induce changes in the wearer's gait [75]. Similar to the exosuit technology, methods to optimize the delivery of the intervention, and the characteristics of individuals likely to respond to RAS-based gait intervention, remain important areas of study and development.

Stroke, Multiple Sclerosis, and Parkinson Disease are neurological diseases with different etiologies; however, in the context of gait rehabilitation, these diagnostic labels are not sufficient to guide targeted gait treatments. Though of different origins, the gait impairments observed across these three neurological diagnoses are biomechanically similar: altered spatiotemporal control results in impaired gait quality—i.e., a slow, variable, asymmetric gait that requires substantial metabolic effort—and poor walking function—i.e., reduced walking speed, distance, and community walking activity. Importantly, high gait quality is not always indicative of high function; there is a well-documented disconnect between capacity and function that is thought to be mediated by biopsychosocial factors. Moreover, low gait quality is not always indicative of low function; people can achieve high function through compensatory mechanisms. These factors, taken together, motivate the coupling of gait quality and walking function to form multi-dimensional movement phenotypes.

Various embodiments, devices, systems, and methods described herein may use data from at least one sensor that is worn by a subject to identify patterns of locomotor ability based on measures of gait quality, walking function, and/or their combination. Work with people post-stroke has shown that these movement phenotypes have: (i) biomechanical relevance in that they are associated with different movement strategies, (ii) functional and clinical relevance in that they are associated with long-distance walking performance and standardized clinical scores, (iii) prognostic value in that they (a) distinguish among immediate responders and non-responders to targeted gait training—guiding selection of ideal gait training paradigms, and have (iv) capacity to guide intervention and prescription—for both active assistive devices (for example, robotic exosuits, neuroprostheses, and/or RAS) and different rehabilitation strategies.

Overview of Proof-of-Principle Movement Phenotyping Research Studies

Figure 8A:
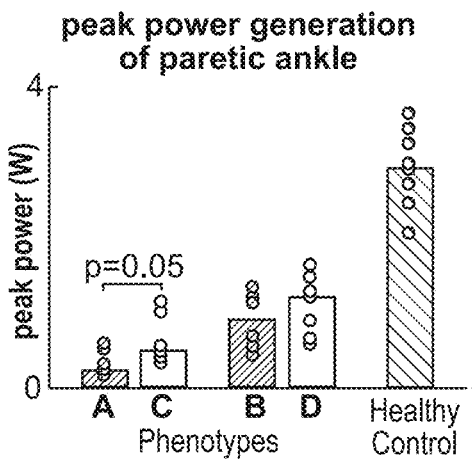
FIG. 8A shows example results of intra-limb peak power generation of a paretic ankle across post-stroke phenotypes and healthy control.
Figure 8B:
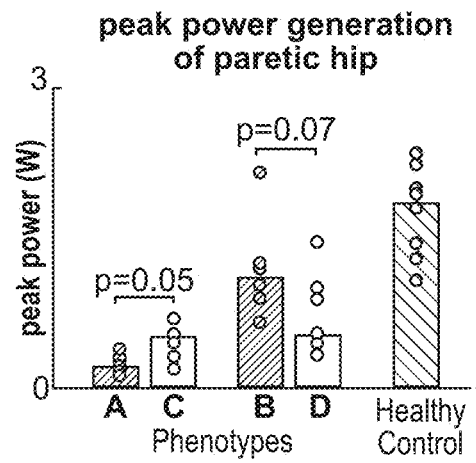
FIG. 8B shows example results of intra-limb peak power generation of a paretic hip across post-stroke phenotypes and healthy control.
Figure 8C:
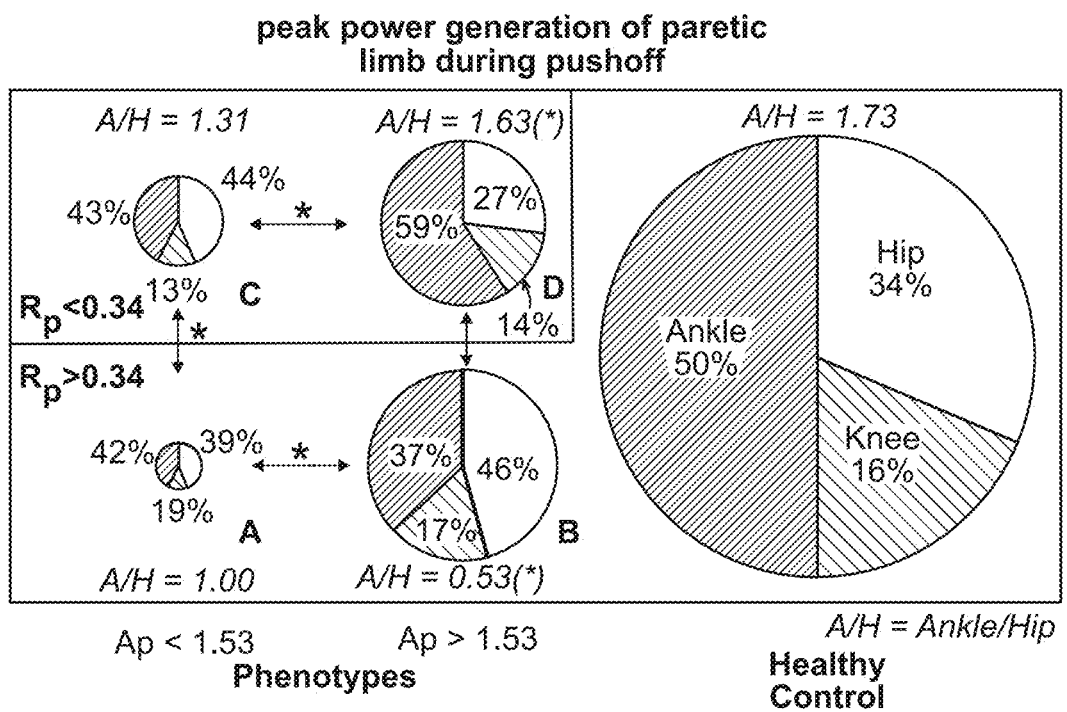
FIG. 8C shows example results of intra-limb power distribution of a paretic limb during pushoff across post-stroke phenotypes and healthy control.
Figures 10A, 10B, 10C:
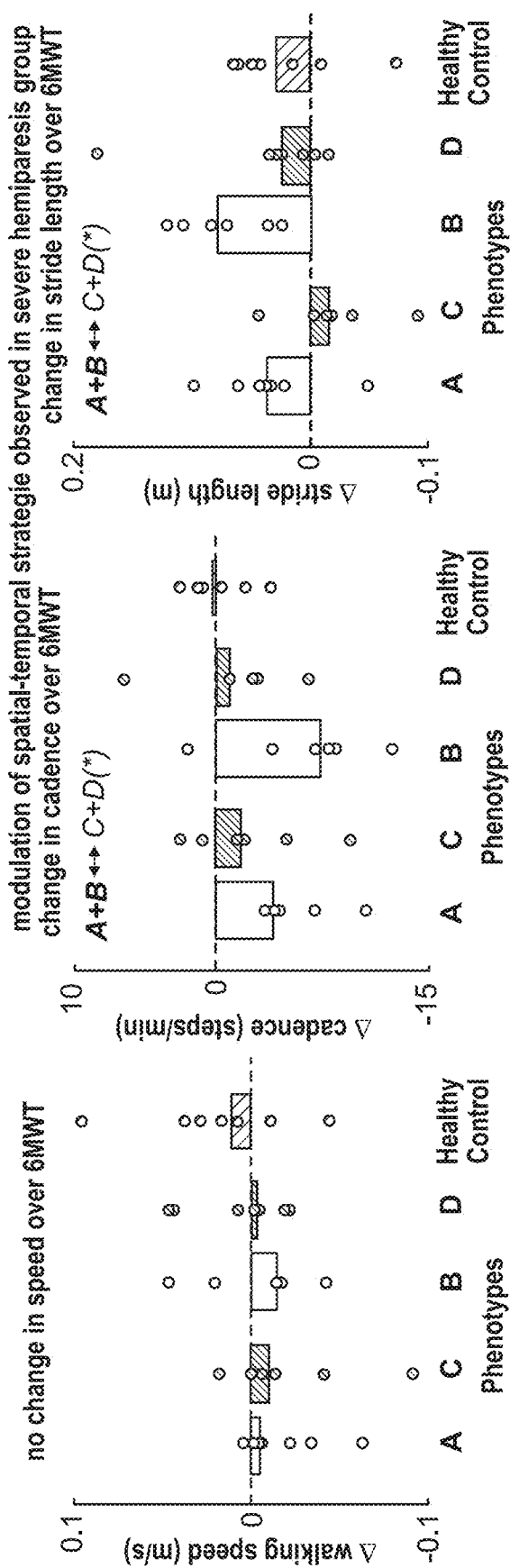
FIG. 10A shows example results of change in speed over a six-minute walk test across post-stroke phenotypes and healthy control. The change is the last 30 seconds minus the first 30 seconds.
FIG. 10B shows example results of change in cadence over a six-minute walk test across post-stroke phenotypes and healthy control. The change is the last 30 seconds minus the first 30 seconds.
FIG. 10C shows example results of change in stride length over a six-minute walk test across post-stroke phenotypes and healthy control. The change is the last 30 seconds minus the first 30 seconds.

In proof-of-principle study 1, the novel locomotor phenotyping approach is shown to reflect biomechanically- and functionally-relevant patterns of locomotor impairment in people post-stroke. This study specifically focused on post-stroke gait as an example and this work has been expanded to other neurological populations. Individuals in the chronic phase of stroke recovery were recruited to participate in a testing session combining biomechanical and functional data collections. Each study participant's thigh phase-portrait was generated as per a single thigh IMU embodiment, from which each study participant's movement phenotype was identified. The goal of proof-of-principle study 1 was to demonstrate that the locomotor phenotypes identified with this embodiment reflect different patterns of biomechanical and functional impairment, thus establishing a basis for phenotype-guided movement assessment and phenotype-guided intervention and prescription (FIGS. 13A-13D). More specifically, metrics from the following domains were compared across the phenotypes: (1) mobility and function (see FIG. 7C, FIG. 9), (2) propulsion ability (see FIG. 9), (3) distance-induced changes in gait spatial-temporal strategy (see FIG. 10), (4) limb kinematics (see FIGS. 13A-13D, FIG. 17C), (5) neuromotor function (see FIGS. 13A-13D, FIG. 17C), and (6) differences in the intra-limb distribution of joint power during walking (using inverse dynamics)(see FIGS. 8A-8C).

In proof-of-principle study 2, the different locomotor phenotypes were shown to respond differently to targeted gait intervention. More specifically, we evaluated differences in the immediate effects of: a soft robotic exosuit designed to mechanically assist paretic plantarflexion and dorsiflexion during post-stroke walking (study 2a) and a digitally-delivered rhythmic auditory stimulation intervention harnessing auditory-motor entrainment (study 2b).

In proof-of-principle study 3, study 2 is built on to demonstrate that the different locomotor phenotypes are predictive of the longitudinal rehabilitative gains in walking ability resulting from a multi-week exosuit-augmented gait training.

In proof-of-principle study 4, the different locomotor phenotypes are shown to respond differently to control parameter tuning for RAS intervention.

An alternative movement phenotyping approach. In a final study, phase-portrait generated measures were shown to be exploitable to directly estimate spatial gait parameters and clinically-salient measures like walking speed, at the point-of-care, and with no additional calibration procedures required. The point-of-care spatiotemporal estimation during a long distance walking test that is demonstrated in this study is shown to be able to distinguish between neurotypical and neurologically-impaired gait, and thus also useful for movement phenotyping.

General Data Collection Procedures

Lab-Based Tethered Motion Analysis Instruments

For at least some of the studies described herein, the following instrumentation was used. These instruments are considered state-of-the-art and are used by most movement scientists around the world. Whenever possible, all data were collected in a time-synchronized manner using a synchronization pulse triggered at the start of a data collection period.

Figure 5:
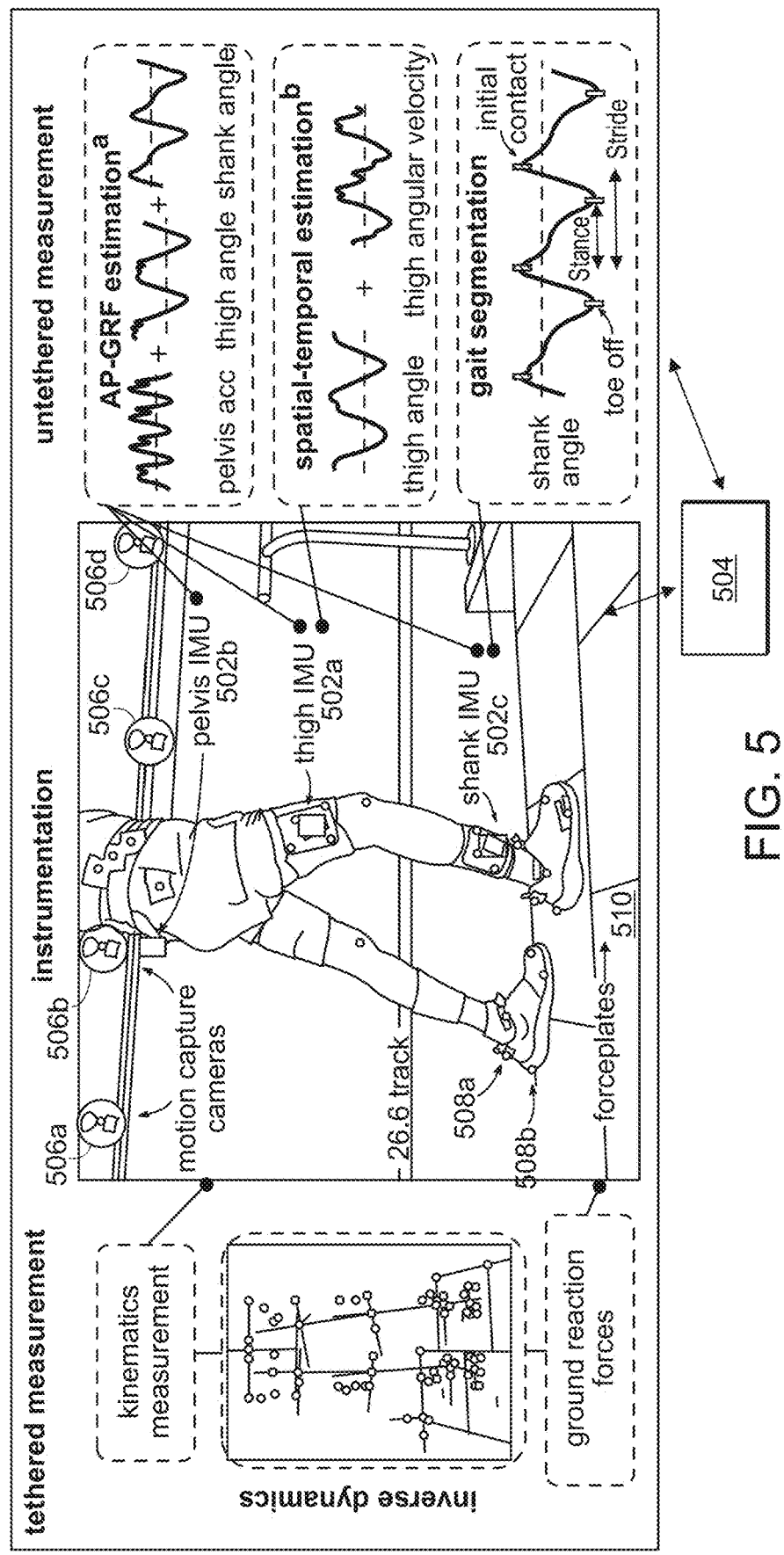
FIG. 5 shows an example arrangement of IMUs and associated measurements.

1. Motion Capture System: A state-of-the-art optical motion capture system can provide ground-truth measurements of human movement [86]. In various embodiments, such a system may comprise (1) multiple cameras 506 around a fixed capture space (for example, an 18-camera system, four cameras 506a-506d are shown in FIG. 5); (2) retro-reflective markers (many markers are shown in FIG. 5, for example a first marker 508a and a second marker 508b) and retro-reflective marker clusters placed on the anatomical landmarks and limb segments of an individual to best emulate their motion. Together they enable the collection of 3D kinematic data (position, velocity, angles, and their derivatives). This system, however, is limited to a specific capture space that depends on how the cameras are setup and requires many hours of manual processing.

2. Forceplate: A state-of-the-art load-cell based system provides ground-truth measurements of human kinetics. Forceplates 510 are either embedded in a treadmill or fixed flush with the ground. Both instrumented treadmills and forceplates are multiple axial load transducers that measure resultant orthogonal 3-D force and moments acting on the platform [87] during walking tasks. When combined with a motion capture system, forceplates 510 enable the study of human biomechanics though inverse dynamics [86], which has led to the contemporary understanding of gait, both in healthy and neurological populations. The forceplate technology, however, has a limited capture space.

Though the capture space can be expanded by the addition of multiple forceplates (see FIG. 5), forceplates cannot be used effectively outside laboratory settings.

Portable Motion Analysis Instruments

The following instruments may be incorporated into systems and methods described herein and may be used in lab, clinical, or at-home settings. When used in the lab, the data may be collected in a time-synchronized manner with the relevant tethered motion analysis instruments.

An inertial measurement unit (IMU) 502 is a wearable sensor that may include an integrated accelerometer, gyroscope and/or magnetometer fused together to capture inertial data (angular velocities and linear accelerations). IMUs may be used to capture kinematic data [88, 69, 66, 73] (see FIG. 5) and estimate kinetic parameters [89]. IMUs are also utilized in the previously-described active assistive technologies; they allow these technologies to detect and act on human movement [76, 75]. FIG. 5 shows a user wearing three IMUs 502a, 502b, 502c. In different configurations, a different number of IMUs may be worn. In different configurations, the IMUs may be worn in different locations. In alternative embodiments, a different type of sensor may be used. In some embodiments, a processor 504 is operationally coupled one or more of the sensors (for example, IMUs 502a, 502b, 502c). In general, the processor 504 can be coupled to any sensor configured to collect movement data.

Clinical Tests of Mobility and Function

All of the studies described herein include relevant standardized clinical tests to enable baseline characterization of mobility and function as currently measurable in clinical settings. The following is a list of the specific clinical tests that are discussed herein, including a description of each test and its significance. More details on each test, its validity in neurological populations, and its significance can be found in this seminal clinical practice guideline [97].

Ten-meter walk Test (10 mWT): A test to measure the walking speed of a person by measuring the time it takes to cover the middle 6 meters of a 10-meter walk. A 2 meter acceleration space is provided at the start of the walk and a 2 meter deceleration space is provided at the end of the walk. The 10 mWT is a common clinical end-point in clinical trials.

2. Six Minute Walk Test (6MWT): A test to measure the total distance that a person can walk (safely and maximally) during 6 minutes. It is a popular clinic-based test of long-distance walking capacity and has been shown to predict community participation and reintegration after stroke [98, 99], Parkinson's disease [100, 101], and Multiple Sclerosis [102].

More recently, the distance-induced change in walking speed during the 6MWT has been used to classify people post-stroke as endurant versus non-endurant, with the non-endurant group presenting with substantially less everyday community walking activity [103]. That is, regardless of how far they can walk during the 6MWT, individuals who slow down during the test walk less in the community than more endurant individuals. Given the clinical significance of the 6MWT, implementation of wearable sensors during this test can serve to elucidate the biomechanical mechanisms used by patients to walk long distances.

3. Functional Gait Assessment (FGA): A test used to assess postural stability and ability to perform multiple motor tasks during walking. The FGA test contains 10 individual item tasks scored on an ordinal scale from 0 to 3, with 0=severe impairment and 3=normal ambulation, for a total possible score of 30. The FGA is a reliable and valid tool to assess functional gait performance in stroke [104], Parkinson's disease [105], and Multiple Sclerosis [106].

Wearable Sensors and Phase-Portrait Metric Methods

Wearable sensors offer a promising solution to close the lab-to-clinic measurement gap. Indeed, wearable inertial sensors have been used to extend gait measurements outside of the laboratory [56, 57, 58, 59, 60, 61] and are already used in the form of activity monitors in clinical and real-world settings. A good example of this is the use of IMUs for gait detection. Human gait comprises of repetitive cycles of movement that can be used to simplify gait as phases between repeating gait events. All discrete events throughout the gait cycle (i.e., heel strike, midstance, toe-off, etc.) can be identified as percentage intervals of the gait cycle (0% to 100%). Typically, gait is defined between consecutive heel-strikes. Heel-strike is most accurately measured within the very limited forceplate capture footprint that may only span several meters in a laboratory. IMUs offer a feasible solution to not only make gait detection easier in laboratory settings, but also offer translatability to clinical and free-living settings.

Minimal IMUs: In the literature many approaches have been developed to exploit IMUs for gait analysis [61, 66]. Notably, among people with post-stroke hemiparesis, the use of multiple IMUs located across the paretic and non-paretic limbs has proven effective in improving accuracy of spatial-temporal estimation compared to one IMU located on one limb [67]. Previous work exploited the use of three IMUs to provide an accurate estimate of the anterior-posterior ground reaction forces produced during walking [89]. Though effective, increasing the number of sensors poses usability challenges, especially in clinical settings where the addition of each IMU can mean a loss of time for therapeutic activities. Therefore, there is a strong incentive to minimize the number of IMUs needed, which can in turn minimize the setup and implementation time needed, and thus facilitate seamless clinical integration. Some embodiments of systems, methods, and devices described herein focus on the data available from a single IMU.

Considerations for the Location of the IMU: In individuals with limited range of motion due to musculoskeletal [113, 114] or neurological [115] conditions, IMUs worn proximally at the waist or on the thigh may be easier to self-manage than distally-worn IMUs. Relatedly, a thigh-worn IMU may be more desirable for embedded control of wearable robots and orthoses that do not extend below the knee [88, 116, 117]. Beyond usability, thigh-worn IMUs may be preferable to distally-worn IMUs from a measurement perspective. In addition to potentially being less susceptible to errors arising from out-of-plane movements by lower segments (as described in [118]), the proximo-distal hypothesis of joint coordination during walking suggests that changes in the walking pattern emerge largely from feed-forward control of the proximal leg muscles [119], and thigh data collected during walking have been shown to be highly predictive of distal joint motion [120]. Moreover, in past work on spatial-temporal [73] and ground reaction force [89] estimation during walking, thigh IMUs were shown to be instrumental. Some embodiments of systems, devices, and methods described herein focus on the data available from a single IMU worn on the thigh.

Thigh Phase-Portraits: Amplitude, Smoothness, and Roundness

Figure 6A:
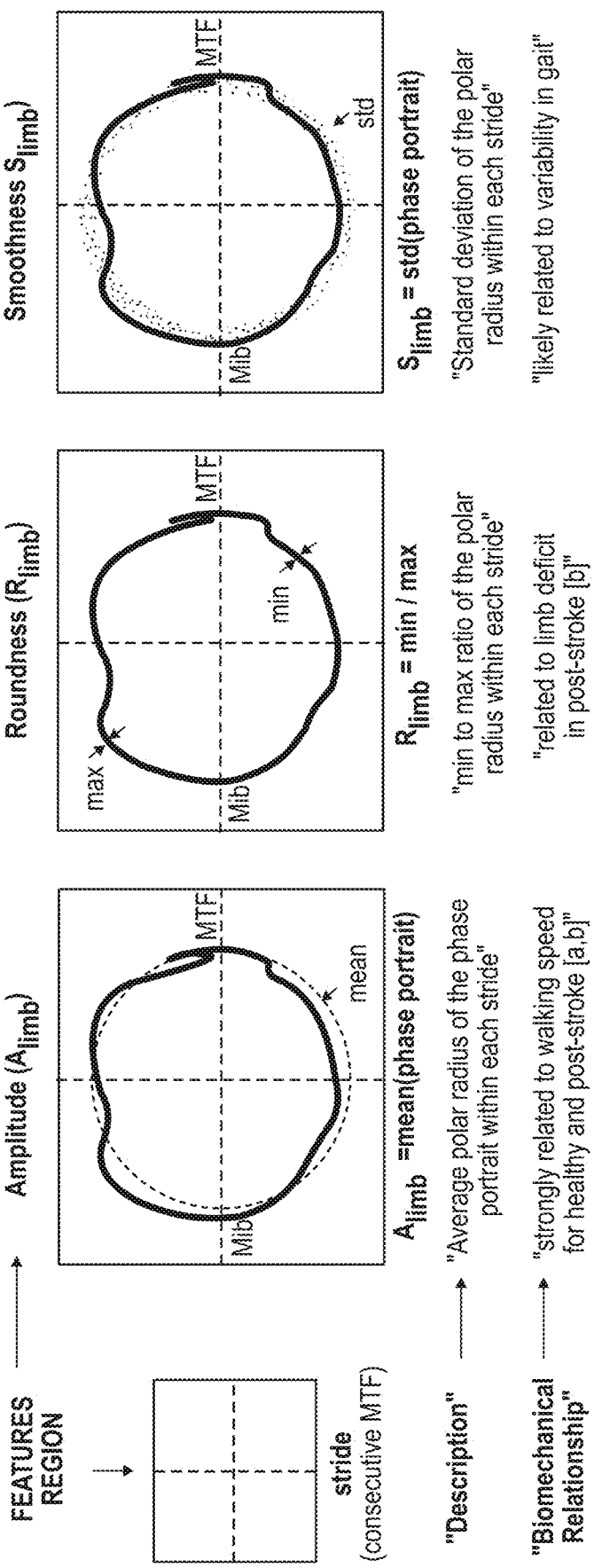
FIG. 6A shows an example phase portrait and examples of phase portrait characteristics.

Amplitude and Smoothness: A dominant feature of the thigh phase portrait is its circular orbit [71]. As depicted in FIGS. 6A-6B, several variables can be extracted from the circular orbit that are of high relevance to walking performance. (Variables may also be referred to as characteristics or features or phase portrait metrics herein). The first and second variables of interest are the "amplitude" and the "smoothness" of the phase portraits. The amplitude of the phase portrait is computed as the average polar radius of the circle produced for each gait cycle, and the smoothness of the phase portrait as the standard deviation of the polar radius of the circle produced for each gait cycle (see FIG. 6A). The amplitude of the phase portrait has been shown to be highly correlated to walking speed in healthy [71, 73] and post-stroke individuals [73]. That is, as the walking speed increased, the amplitude of the phase portrait increased proportionally. Decreased smoothness may be associated with deficits in the sequential progression of the walking subtasks-bodyweight support, propulsion, and limb advancement within each gait cycle. Unlike traditional standard deviation-based measurements of gait variability that are concerned with variability across gait cycles (e.g., stride time variability), phase portrait smoothness considers gait variability within the gait cycle. In addition to calculating smoothness as the standard deviation of the polar radius of the circle produced for each gait cycle, other time-domain measures of variability (e.g., variance, root mean square, etc.), as well as frequency-domain measures of variability (e.g., power spectral density, spectral entropy, peak frequency, etc.) and/or non-linear measures of variability (e.g., sample entropy, Lyapunov exponent, detrended fluctuation analysis, etc.) may be used. Moreover, inter- and intra-quadrant permutations (see FIG. 6B) of phase portrait amplitude and smoothness measurements may be of clinical significance. That is, knowing which specific phase portrait quadrants the deviations in amplitude and smoothness occur could speak to different gait deficits. For example, it is well-established that individuals with Parkinson's disease have high gait variability [121], but study of how gait variability evolves within the gait cycle is not clear. Knowledge of quadrant-specific permutations of the smoothness variable is likely to be especially useful to identify novel gait subtypes and direct more targeted gait therapies. In FIG. 6B, HS refers to heel strike and TO refers to toe-off.

Roundness: The third phase portrait variable of interest is the "roundness". Roundness may be quantified as the ratio between the inscribed and the circumscribed circle; that is, the ratio between the largest circle that fits inside the phase portrait and the smallest circle that can enclose the phase portrait [73]. Based on this definition, a perfect circle would have a roundness of 1; a roundness of less than 1 indicates a deviation from the perfect circular orbit. Although thigh phase portraits generated from healthy walking data are not expected to have perfect roundness of 1, it is expected that gait deficits that impair the thigh angle, velocity, or coordination of angle and velocity will result in deviations in the circular orbit of the phase portrait and decrease roundness. In prior work [73] it was determined that the roundness of the thigh phase portraits could differentiate between healthy and post-stroke walking, and between the paretic and non-paretic limbs of people post-stroke. Moreover, permutations (see FIG. 6) of roundness may be of clinical significance—that is, knowing which specific quadrants or when during the gait cycle the motion deviates from the norm, is likely to reflect different gait asymmetries and compensatory strategies. For example, gait deficits related to propulsion are expected to arise from the stance phase of the gait cycle; thus, to study propulsion deficits, using the stance phase permutation of the roundness variable may be most sensitive.

Systems, devices, and methods described herein may use roundness, smoothness, and/or amplitude, to identify biomechanically and functionally relevant patterns of gait impairment among individuals with neurological diseases, and use these digitally-acquired locomotor phenotypes to predict the immediate response to gait-targeting interventions and guide control parameter tuning for active assistive devices, such as robotic exosuits, neuroprostheses, and/or RAS devices.

FIG. 6C shows example data for polar radius of a phase portrait plotted against speed.

FIG. 6D shows example data for roundness of a phase portrait plotted against propulsion symmetry.

In some embodiments, an amplitude of a single phase portrait may be used. In some embodiments, an average amplitude of more than one phase portrait may be used. In some embodiments, a maximum amplitude of more than one phase portrait may be used. In some embodiments, a minimum amplitude of more than one phase portrait may be used.

In some embodiments, an average of the minimum amplitudes of more than one phase portrait may be used. In some embodiments, an average of the maximum amplitudes of more than one phase portrait may be used.

In some embodiments, a roundness of a single phase portrait may be used. In some embodiments, a roundness of more than one phase portrait may be used. In some embodiments, a maximum roundness of more than one phase portrait may be used. In some embodiments, a minimum roundness of more than one phase portrait may be used.

In some embodiments, a smoothness of a single phase portrait may be used. In some embodiments, a smoothness of more than one phase portrait may be used. In some embodiments, a maximum smoothness of more than one phase portrait may be used. In some embodiments, a minimum smoothness of more than one phase portrait may be used.

In some embodiments, the phase portrait metric is associated with a biomechanical metric, and a phenotype determination is made using a salient cut-off for that biomechanical metric. In alternative embodiments, the phenotype determination can be made solely based on phase portrait metric.

Alternative strategies: It has been demonstrated that estimates of the AP-GRF, and thus propulsion function, can be reliably predicted using a combination of the thigh, shank, and pelvis IMU [89]. In some configurations, systems, devices, and methods described herein, multiple sensors may be used to generate clinical and/or biomechanical cutoffs.

In some embodiments, systems, devices, and methods described herein, machine learning techniques (for example convolution neural networks) may be used to help with classifications. In Fricke2021 [122] the authors used three different machine learning algorithms, namely convolutional neural network, support vector machine and K-Nearest Neighbors, to automatically classify eletromyographic patterns in individuals with gait disorder. Although these approaches are promising, they carry a significant risk of not being generic enough, at least with limited sample size due to the heterogeneity in neurological gait. The clinicallydriven approaches described in the proof-of-principle studies herein overcome this problem by relying on historic data and observations.

Proof-of-Principle Study 1: Experimental Methods and Preliminary Results

Participant Characteristics:

Stroke: About 70 unique individuals with chronic post-stroke hemiparesis were recruited to participate in multiple experiments that comprise proof-of-principle study 1. Inclusion criteria consisted of being greater than six months post-stroke, having the ability to walk without the assistance of another individual, and presenting with observable gait deficits. Exclusion criteria included comorbidities other than stroke that impair walking ability, resting heart rate outside the range of 40 to 100 beats per minute, resting blood pressure outside the range of 90/60 to 170/90 mmHg, inability to communicate with investigators, and pain in the lower limbs or spine. Individuals post-stroke were recruited from research participant registries, referrals from local clinics and hospitals, and distributed flyers.

Written informed consent was obtained from all study participants and the study procedures were reviewed and approved by the Institutional Review Board before the start of the study. Data from up to 15 healthy participants free of conditions that impair walking ability (as per self-report) served as the reference group.

Sample Data Collection and Processing Plan for Identifying Movement Phenotypes and their Unique Deficit Profiles:

Data collection will start with clinical testing to characterize the functional status of each research participant. The motion capture markers and IMUs will then be placed on the lower limbs. A 6-minute walk test (6MWT) [99] will then be administered. The 6MWT walkway is instrumented with forceplates located level with the surrounding floor to enable the collection of ground reaction forces during the test and a motion capture system to enable concurrent collection of kinematic data. During the 6MWT, the IMUs, forceplates, and motion capture signals will be collected in a time-synchronized manner using a synchronization pulse triggered at the start of data collection. Though motion capture and forceplate data will only be available during the instrumented 10 m straightaway, IMU data will be available for the entire 6MWT.

IMU, motion capture, and forceplate data will be collected at 100 Hz, 200 Hz, and 2000 Hz respectively exceeding the minimum frequency needed for robust data collection. All data will be filtered at 10 Hz using a second-order Butterworth filter, and downsampled to match the IMU collection frequency of 100 Hz. Any calculation with motion capture and forceplate data (i.e., inverse kinematics and dynamics) will be computed at 200 Hz, filtered at 10 Hz using a second-order Butterworth filter and then down sampled to match the IMU collection frequency. All data will be segmented between consecutive gait events and time-normalized to 100 points to represent the one gait cycle of walking. Gait events may be defined in one of two ways depending on the availability of the IMUs used in the analysis. Either the maximum peaks in the IMU-measured shank angle [57, 89] or the maximum peaks in the IMU-measured thigh angle [73] will be used to approximate initial contact.

Analysis plan: Correlation and ROC analyses will be used to assess the relationships between different phase-portrait metrics and reference standard measures of gait quality and walking function. More specifically, we will:

Identify candidate phase-portrait metrics of gait quality. Phase-portrait metrics with at least a moderate bi-variate correlation with a gait quality parameter reference (i.e., step length asymmetry, stride time variability, or propulsion asymmetry) will be evaluated in ROC analyses designed to determine cutoffs for the phase-portrait metrics that can differentiate gait quality. This study focuses on the phase-portrait metrics of smoothness, roundness, and their permutations.

Identify candidate phase-portrait metrics of walking function. Phase-portrait metrics with at least a moderate bi-variate correlation with a walking function reference (e.g., the 6MWT threshold for community ambulation) will be evaluated in ROC analyses designed to determine cutoffs for the phase-portrait metrics that can differentiate walking function. This study focuses on the phase-portrait metric of amplitude and its permutations.

Movement phenotypes. In the embodiment studied in this example, pairings of phase-portrait metrics associated with gait quality and walking function are used to create 4 locomotor phenotypes. The Kruskal-Wallis test and post-hoc Wilcoxon rank-sum tests are used to determine if these phenotypes are associated with differences in clinical and biomechanical performance.

Results: Example Workflow for Identifying Movement Phenotypes and their Unique Deficit Profiles: Proof-of-Principle Study 1

Thirty post-stroke (N=30) and twelve healthy (N=12) individuals participated in this study. The study goal was to determine if locomotor phenotypes generated using thigh phase-portrait metrics were associated with biomechanically and functionally relevant patterns of gait impairment. The study focused on using two phase-portrait metrics: phase portrait amplitude across the gait cycle ($A_P$) and phase portrait roundness within the stance phase ($R_P$). A summary of the phenotyping approach and validation testing is provided below:

After data collection, thigh IMU data was used to generate the phase-portraits and their respective point metrics (amplitude, roundness, etc)

Candidate phase-portrait metric identification: $A_P$ was found to have a strong (r=0.90, p<0.001) correlation with walking function as measured by 6-minute walk test speed, and $R_P$ was found to have a moderate (r=0.38, p=0.04) correlation with gait quality as measured by propulsion asymmetry.

Identifying salient phase-portrait metric cutoffs using the published clinical literature for the associated walking function and gait quality variables: ROC analyses revealed clinically-useful cutoffs in the phase-portrait metrics: a cutoff $A_P$=1.53 distinguished, with 97% accuracy, individuals post-stroke classified based on their 6MWT walking speed as being limited vs. unlimited community ambulators [25]. And a cutoff $R_P$=0.34 distinguished, with 73% accuracy, individuals post-stroke classified based on their propulsion asymmetry ratio as having mild-moderate vs. moderate-severe hemiparesis [10] (see FIG. 7A). It should be noted that while the phase-portrait cutoffs used in the current embodiment are associated with clinically-salient cut-offs in the published clinical literature, this is not necessary to generate and use phase-portrait-based locomotor phenotypes; future embodiments may demonstrate more utility and accuracy with phase-portrait metric cut-offs identified via alternative analysis methods—e.g., based on large-scale data collection and analysis of phase-portrait data alone.

Assigning individual patients to a locomotor phenotype: After using bivariate correlation to determine the suitability of $R_P$ and $A_P$ to respectively capture variability in the gait quality and walking function reference standards, and ROC analyses to identify clinically-relevant cutoffs for these metrics, these cutoffs were used to classify individuals into one of four gait locomotor phenotypes, with each phenotype representing a different combination of high/low gait quality (i.e., associated with propulsion asymmetry-based classification of hemiparetic severity) and high/low walking function (i.e., associated with walking speed-based classification of community ambulation status). Using the identified cutoffs for $R_P$ and $A_P$, the post-stroke study participant sample was divided into: Phenotype A (limited community ambulators with severe hemiparesis, N=8), Phenotype B (unlimited community ambulators with severe hemiparesis, N=7), Phenotype C (limited community ambulators with mild hemiparesis, N=6), and Phenotype D (unlimited community ambulators with mild hemiparesis, N=9).

Functional validation of the locomotor phenotypes: To determine the functional relevance of this phenotyping approach, moderated regression was used to evaluate if the different phenotypes performed differently on the 6-minute walk test. A significant interaction between $R_P$ and $A_P$ was observed, with the model explaining a substantial amount of the variance in total distance walked during the test ($R^2$=84%, p<0.001, RMSE=54 m) (see FIG. 7B). As expected, and in support of the 2-dimensional phenotyping approach, though unlimited community ambulators walked more distance than limited community ambulators ($\Delta$=196 m, p<0.001) (see FIG. 7C), within the limited community ambulator subgroup, individuals with severe hemiparesis walked significantly less distance than individuals in the mild hemiparesis subgroup ($\Delta$=71 m, p=0.008). Interestingly, in the unlimited community ambulator subgroup, there was no significant difference in the distance walked between the severe and mild hemiparesis subgroups ($\Delta$=13 m, p=1); however, differences in biomechanical propulsive strategy and perceived effort were observed, as described below.

Biomechanical validation of the locomotor phenotypes: To determine the biomechanical relevance of this phenotyping approach, differences in (1) inter- and intra-limb joint power distribution (i.e., propulsive strategy) and (2) distance-induced changes in gait quality (i.e., spatiotemporal strategy) were evaluated. Moreover, (3) replication and extension of this phenotyping approach in a different cohort of individuals post-stroke, and using a different measurement system, was examined, with focus on phenotype-specific differences in limb kinematics and plantarflexor neuromotor function.

(1) Differences in propulsive strategy: Among the limited community ambulator subgroup, total power generated by the paretic limb was significantly higher in the mild hemiparesis subgroup compared to the severe hemiparesis subgroup ($\Delta$=0.490 W, p=0.005). However, the ratio of paretic ankle to hip power was the same ($\Delta$=0.31, p=0.95) (see FIGS. 7A-7C). Total power by the non-paretic limb ($\Delta$=0.03 W, p=0.45) and the ankle to hip ratio ($\Delta$=0.26, p=1) were also similar across the mild and severe hemiparesis subgroups. Among the unlimited community ambulator subgroup, total power generated by the paretic limb was similar between the mild and severe hemiparesis subgroups ($\Delta$=0.26 W, p=0.73). However, the ratio of ankle to hip power was significantly different ($\Delta$=1.11, p=0.04), with the severe hemiparesis subgroup generating the majority of their total power from the hip (A/H=0.53±0.70), whereas the mild hemiparesis subgroup generated the majority of their total power from the ankle (A/H=1.64±0.72) (see FIGS. 8A-8C). The total power generated by the non-paretic limb ($\Delta$=0.19 W, p=0.53) and the ankle to hip ratio ($\Delta$=0.20, p=0.63) were similar across mild and severe hemiparesis subgroups.

(2) Differences in distance-induced changes in spatiotemporal strategy: This sub-analysis included the 26 out of 30 post-stroke participants and 8 out of 12 healthy control participants who demonstrated no meaningful change in gait speed over the course of the 6MWT (as defined in [103] as |$\Delta$speed|<0.1 m/s). See FIG. 9 for baseline characteristics on a per-phenotype basis. As designed, all participants in this analysis, regardless of their locomotor phenotype, maintained their walking speed over the duration of the 6-minute walk test. However, individuals with severe hemiparesis altered their spatiotemporal strategy over the course of test, showing a decline in cadence ($\Delta$=−3 step/min (6%), p=0.009) concurrent with an increase in stride length ($\Delta$=0.05 m (6%), p=0.02) (see FIGS. 8A-8C). This effect was notably higher for study participants in the unlimited community ambulator subgroup ($\Delta$CAD=−7 step/min; $\Delta$ SL=0.06 m) (see FIGS. 10A-10C). In contrast, individuals with mild-hemiparesis did not alter their spatiotemporal strategy during the 6-minute walk test.

Figures 17A, 17B, 17C, 17D:
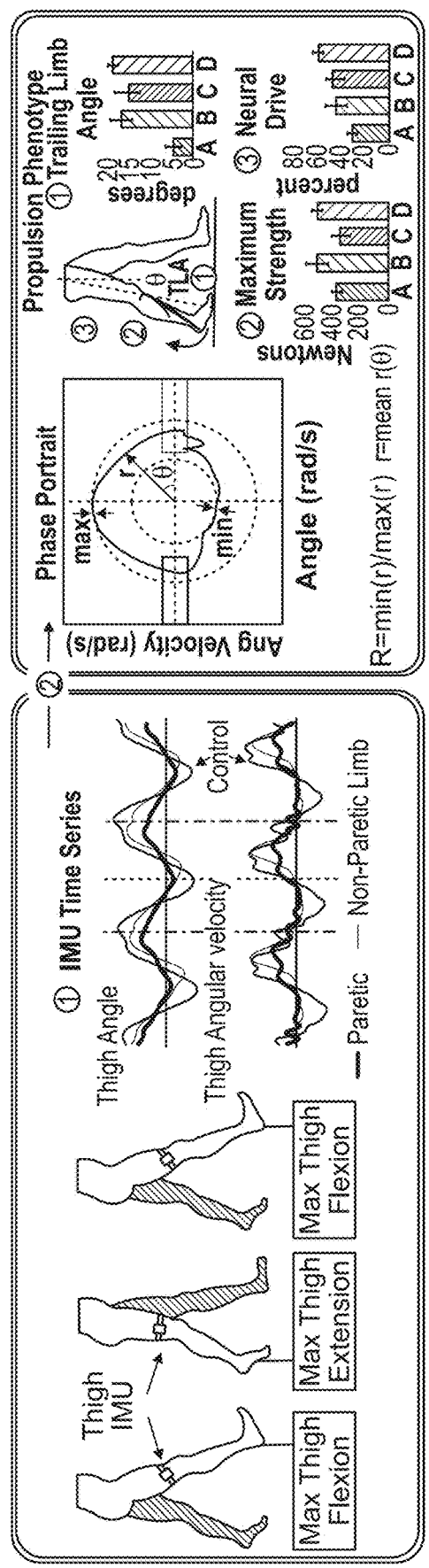
FIG. 17A shows an example embodiment of a sensor positioned at a subject's thigh.
FIG. 17B shows example thigh angular position and velocity time series data.
FIG. 17C shows an example phase portrait. Systems, devices, and methods described herein use novel locomotor assessment algorithms to generate a phase portrait and identify specific features that are used to identify a patient's locomotor phenotype.
FIG. 17D shows example propulsion phenotype information. In this embodiment, an amplitude (r) cutoff of 1.53 and a roundness (R) cutoff of 0.34 was used to identify four different locomotor phenotypes associated with differences in key propulsion determinants: (1) trailing limb angle, (2) plantarflexor strength capacity, and (3) plantarflexor neural drive. In other work [FIG. 8] these locomotor phenotypes were associated with differences in joint power distributions within and across the paretic (P) and non-paretic (NP) limbs, as well as differences in walking endurance and distance-induced changes in spatiotemporal determinants of walking speed.

(3) Differences in limb kinematics and plantarflexor neuromotor function: In a different lab-based biomechanical study including a different cohort of individuals with chronic post-stroke hemiparesis, the same locomotor phenotypes identified using ground-truth biomechanical data collected in a gait laboratory demonstrated markedly different patterns of neuromotor dysfunction in key propulsion determinants (FIG. 17D). More specifically, Phenotype A (i.e., limited community ambulators with severe hemiparesis) were found to have a reduced trailing limb angle, a reduced plantarflexor force generating capacity, and impaired neural drive to the plantarflexors. In contrast, Phenotype B (i.e., unlimited community ambulators with severe hemiparesis) was found to have only impaired neural drive to the plantarflexors. Phenotype C (i.e., limited community ambulators with mild hemiparesis) was found to have both reduced plantarflexor force generating capacity and impaired neural drive to the plantarflexors. Finally, Phenotype D (i.e., unlimited community ambulators with mild hemiparesis) was found to have minimal impairment in these propulsion determinants.

Summary of Proof-of-Principle Study 1: Phase-portrait metrics extracted from walking data collected by a single IMU worn on the thigh reveal patterns of locomotor impairment that span the domains of gait quality and walking function; and these patterns have both biomechanical and functional relevance. Examination of the biomechanical and functional differences observed across the phenotypes provides valuable insight into the locomotor deficits of these patients. Indeed, these phenotypes are able to link the total power generated by each limb during walking, and the intra-joint distribution of that power, to the long-distance walking function of individuals post-stroke-both in terms of the total distance walked and the spatiotemporal strategy used over the duration of the test. By linking biomechanical mechanism to functional ability in this way, these phenotypes have substantial potential to guide intervention selection and delivery. Moreover, the replication and extension of these findings in a different biomechanical experiment focused on post-stroke neuromotor function demonstrates the robustness of the phenotyping approach.

Phenotype-Guided Gait Interventions

Figure 19:
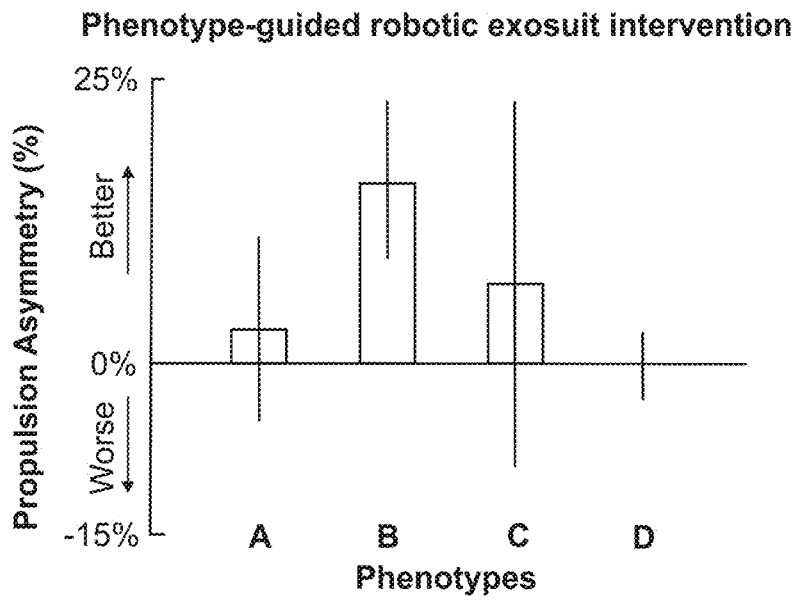
FIG. 19 shows example findings of a proof-of-principle phenotyping study demonstrating highly variable intervention responses to soft robotic exosuit intervention as a function of locomotor phenotype.

Proof-of-principle study #2a: Phenotype-guided exosuit-augmented walking. Recent data collected in a lab-based study of 23 individuals with post-stroke hemiparesis demonstrates the value of phenotype-guided intervention with soft robotic exosuits. In the study, the individuals post-stroke completed instrumented walking trials where the propulsive forces generated by the paretic and non-paretic limbs were measured during walking with and without the soft robotic exosuit. The exosuit-induced change in interlimb propulsion asymmetry—the biomechanical target of the intervention—was computed for each condition and compared across the current embodiment of 4 locomotor phenotypes based on the thigh phase portrait (FIG. 19). As expected, very different intervention responses were found across the 4 phenotypes. Whereas Phenotype D presented with negligible changes, Phenotype B presented with substantial improvements. Meanwhile, Phenotypes A and C presented with modest average improvements and significant variability across individual subjects.

Clinical interpretation of the findings of this proof-of-principle phenotyping study suggests that individuals with Phenotype B are ideal candidates for the soft robotic exosuit deployed in this study and should expect a robust and immediate response, whereas individuals with Phenotype D are likely not good candidates and should be prescribed other interventions. In contrast, individuals with Phenotypes A and C may indeed benefit from the soft robotic exosuit; however, intervention-augmenting approaches should be explored, including combining the robotic exosuit with a parallel intervention, such as concurrent neuroprosthetic intervention from a hybrid exosuit (see below).

Figure 20:
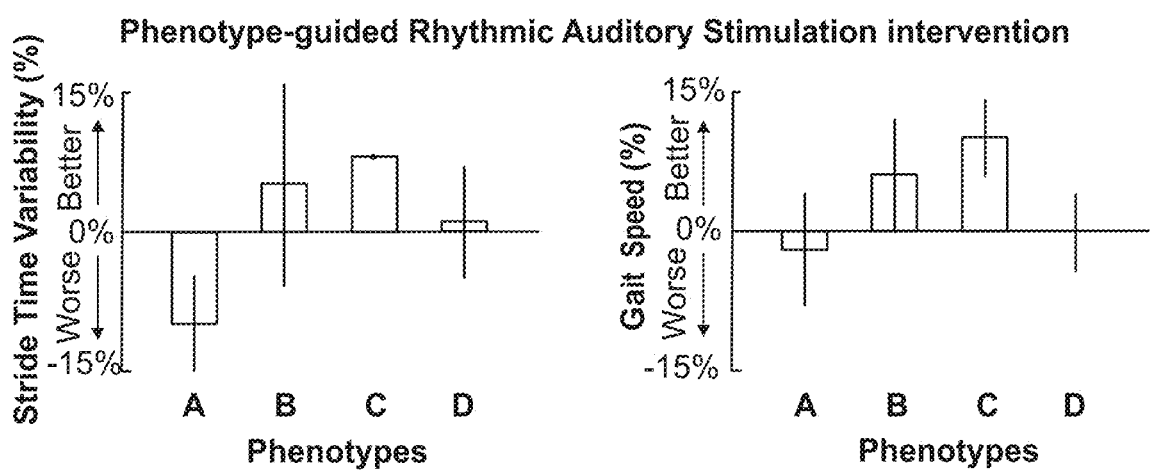
FIG. 20 shows example findings of a proof-of-principle phenotyping study demonstrating highly variable intervention responses to digitally-delivered Rhythmic Auditory Stimulation intervention as a function of locomotor phenotype.

Proof-of-principle study #2b: Phenotype-guided Rhythmic Auditory Stimulation. The value of phenotype-guided intervention is further evidenced in a different proof-of-principle phenotype-guided intervention study that was conducted with a very different active assistive wearable device. In contrast to robotic exosuits that support a patient's gait using mechanical augmentation, or neuroprosthetic devices that support a patient's gait using neuromuscular electrical stimulation, rhythmic auditory stimulation (RAS) devices can retrain neurologically-impaired walking by way of a neurally-mediated process called auditory-motor entrainment [134]. However, not all patients respond similarly to RAS intervention and, to the best of our knowledge, prognostic biomarkers of the response to RAS intervention have yet to be identified. It is thus noteworthy that, like the above-described soft robotic exosuit phenotyping study, marked differences in RAS intervention response were observed across the current embodiment of 4 locomotor phenotypes based on IMU-measured amplitude and roundness of the thigh phase portraits. Among the 19 individuals with post-stroke hemiparesis that completed the study, Phenotype C demonstrated substantial and robust improvements in both stride time variability and walking speed (FIG. 20), with Phenotype B demonstrating similar notable average improvements but with greater individual subject variability. In contrast, individuals with Phenotype D were largely non-responders and individuals with Phenotype A were, surprisingly, negative responders, demonstrating worsened gait variability and walking speed with RAS intervention. Clinical use of phase portrait-based phenotypes to guide RAS intervention can indicate that patients with Phenotypes B and C are good candidates for RAS intervention, whereas patients with Phenotypes A and D likely should be prescribed alternative interventions.

Proof-of-principle study #3: Phenotype-guided longitudinal Robotic Exosuit Augmented Locomotion (REAL) gait training. Building on proof-of-principle study #2's examination of differences in the immediate response to active assistive gait interventions, such as soft robotic exosuits and rhythmic auditory stimulation, proof-of-principle study #3 sought to evaluate the prognostic utility of the current embodiment of 4 locomotor phenotypes based on the thigh phase-portrait when used to evaluate the long-term therapeutic response to an exemplar multi-week rehabilitation program-specifically the standardized, 12-session, Robotic Exosuit Augmented Locomotion (REAL) gait training program [76, 77, 44, 78, 79, 26]. The ability to prospectively identify likely responders and non-responders to such interventions could dramatically alter clinical decision-making and optimize the care provided to such patients.

Figure 11A:
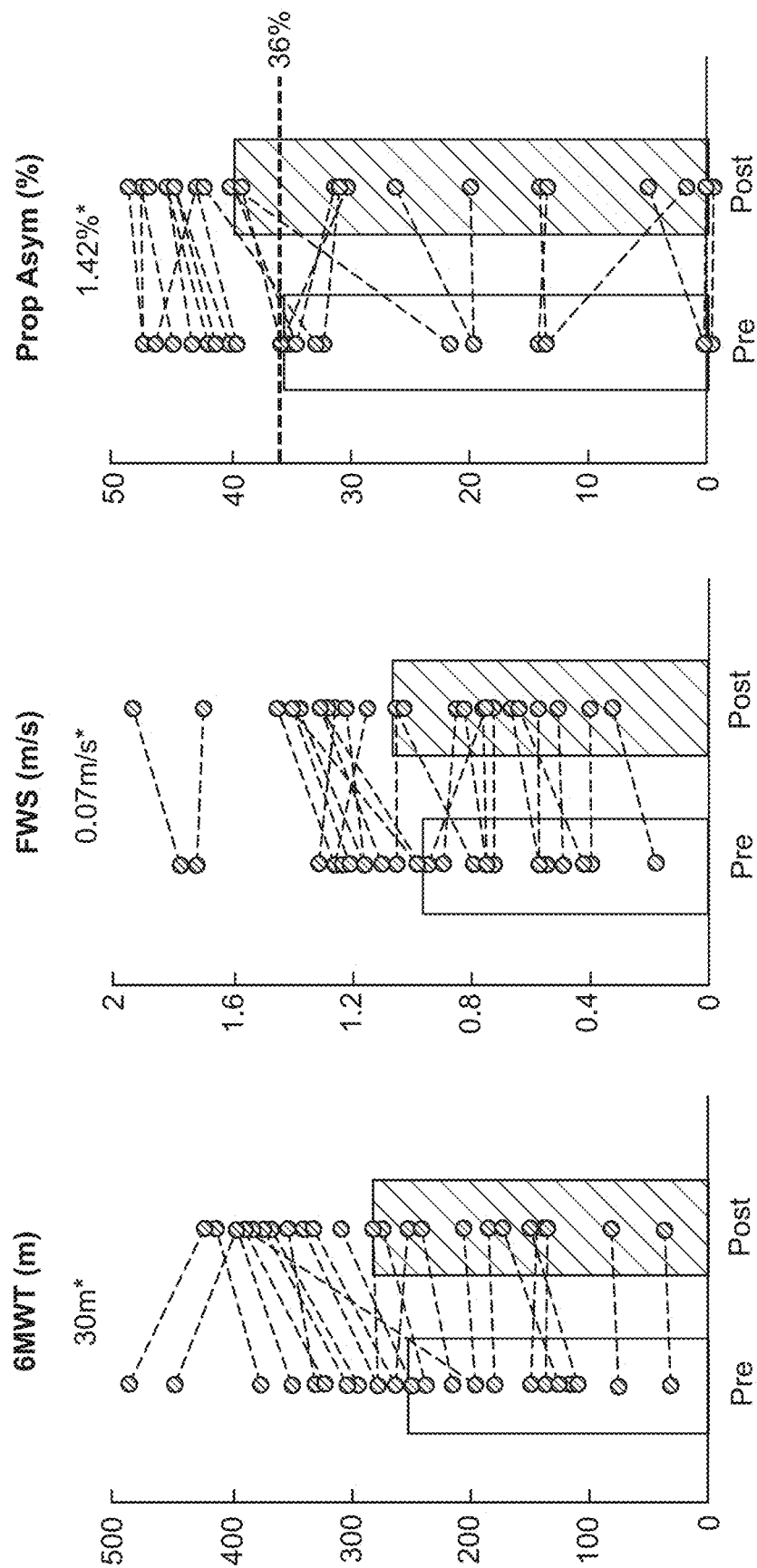
FIG. 11A shows example clinical and biomechanical improvements after Robotic Exosuit Augmented Location gait training.

Data collected from 25 individuals post-stroke who participated in a clinical trial of the REAL gait training program (NCT04818424) were included in proof-of-principle study #3. The phase-portrait metrics of amplitude ($A_P$) and roundness ($R_P$) were also used in the phenotyping analysis. After 12 training visits, study participants had an average increase in the total 6-minute walk test (6MWT) distance of 30 m, maximal walking speed of 0.07 m/s, and average decrease in propulsion asymmetry of 1.42% (FIG. 11A). Though the group-level averages indicate a positive intervention response across all outcomes, individual responses varied widely. Thus, similar to proof-of-principle studies #2a and #2b, intervention outcomes were examined based locomotor phenotypes identified using an $A_P$ cutoff of 1.53 and $R_P$ cutoff of 0.34, with each used independently as examples of single phase-portrait metric phenotypes.

Figure 11B:
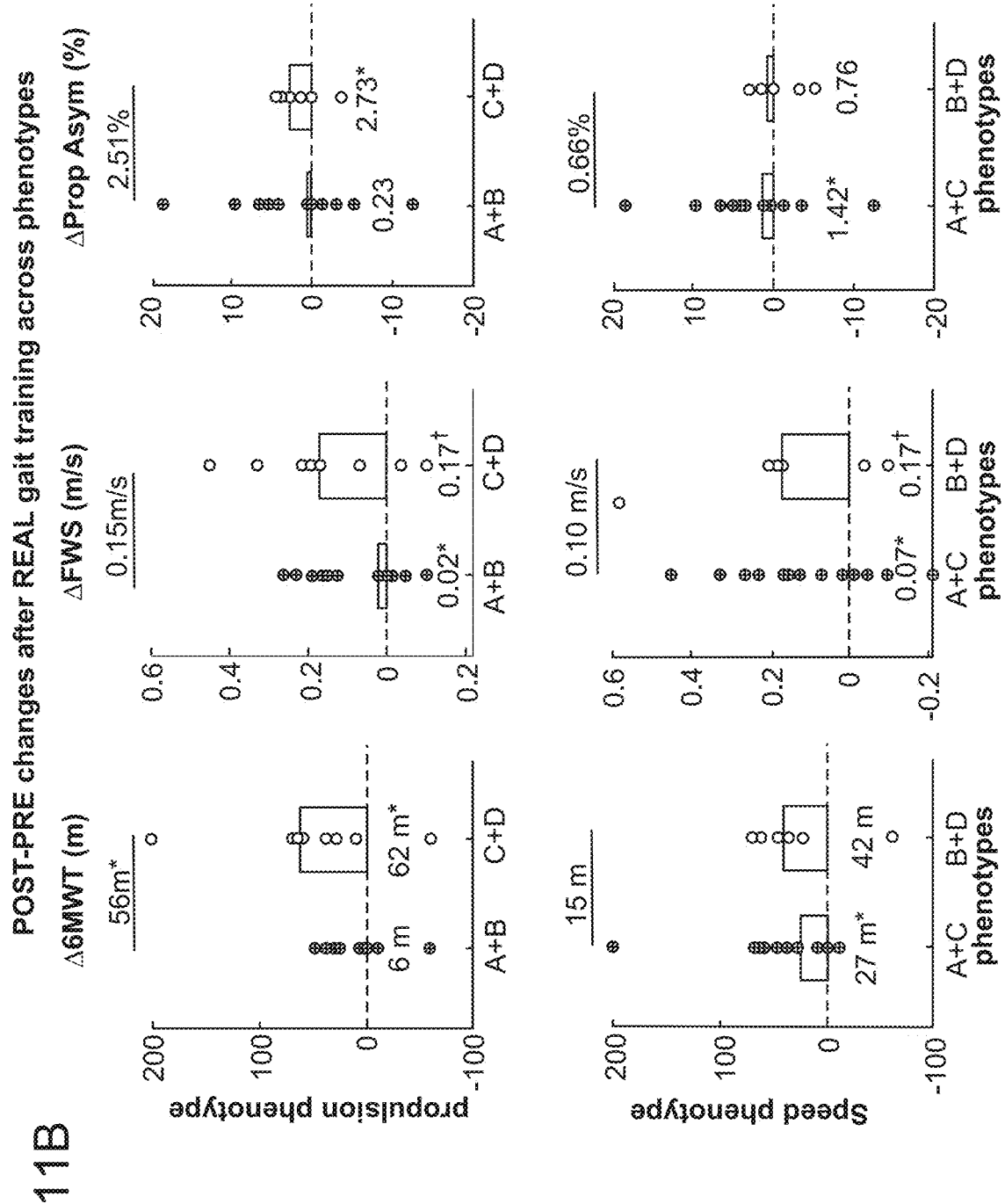
FIG. 11B shows example results of the effects of exosuit intervention across post-stroke phenotypes.

$A_P$ (speed-based) phenotypes (FIG. 11B, bottom): For the 6MWT total distance outcome, speed-based phenotypes identified using the $A_P$ cutoff showed that unlimited community ambulators (N=8) responded similarly to limited community ambulators (N=17) (i.e., an increase of 42 m vs. 27 m). However, for the maximal walking speed outcome, unlimited community ambulators had a substantially larger increase in maximal walking speed (i.e., an increase of 0.17 m/s vs. 0.07 m/s) but, with a surprisingly moderately worse improvement in propulsion asymmetry (i.e., a decrease of only 0.76% vs. 1.42%).

RP (propulsion-based) phenotypes (FIG. 11B, top): For the 6MWT total distance outcome, propulsion-based phenotypes identified using the $R_P$ cutoff showed that individuals with mild hemiparesis (N=11) responded substantially better than individuals classified by $R_P$ as having severe hemiparesis (N=14). More specifically, individuals identified as having mild hemiparesis increased their total 6-minute walk test distance by more than 10 times the magnitude of individuals identified as having severe hemiparesis (62 m vs. 6 m)—a clinically meaningful difference [127]. Similarly, individuals classified as having mild hemiparesis had a substantially larger increase in maximal walking speed (0.17 m/s vs. 0.02 m/s) and a substantial decrease in propulsion asymmetry (2.73% vs. 0.23%) compared to those classified by $R_P$ as having severe hemiparesis.

Summary of Proof-of-Principle Studies #2 and #3: The findings of proof-of-principle studies #2 and #3 demonstrate the prognostic value of locomotor phenotypes identified from thigh phase-portrait data, both the 4-phenotype embodiment utilizing two phase-portrait metrics (i.e., $R_P$ and $A_P$) used in the two experiments included in study #2, and the 2-phenotype embodiments utilizing either $R_P$ or $A_P$ alone used in the experiment included in study #3.

Proof-of-principle study #4: Phenotype-guided control parameter tuning with RAS. In proof-of-principle study #2b, the prognostic value of applying phase portrait phenotypes to guide the digital delivery of rhythmic auditory stimulation (RAS) was demonstrated; however, it is important to note that, like other active assistive devices (e.g., robotic exosuits and neuroprosthetic devices), effective RAS intervention requires user-personalization of the RAS control parameters-namely the prescribed rhythm. Personalization of the RAS control parameters has been a key focus of recently developed autonomous RAS intervention systems. Indeed, because RAS interventions provide individualized and progressive gait intervention by modulating the tempo of the prescribed rhythm, they depend mechanistically on the user being able to synchronize their movements to the prescribed auditory rhythm. Tailoring the rhythmic auditory stimulus to the patient's gait abilities is thus critical, and, as demonstrated in FIG. 21, the disclosed embodiment of locomotor phenotypes has significant potential to guide this process.

More specifically, in this study of 19 individuals with chronic post-stroke hemiparesis, the effects of 5 different tempo prescriptions for the RAS intervention were evaluated. The effect on walking automaticity, as measured by stride time variability (with a reduction indicative of improved automaticity), was the tuning outcome of interest. Very different optimal RAS tempos were found across the locomotor phenotypes studied in the 4-phenotype embodiment. Whereas Phenotype A benefited substantially more from RAS intervention set between 0 and +5% of their natural walking rhythm, Phenotype D required RAS intervention to be set markedly slower at −10% of their natural walking rhythm. In contrast, for Phenotypes B and C, none of the prescribed tempos produced the desired reduction in stride time variability; both phenotypes presented with a deterioration in stride time variability regardless of the tempo target, with Phenotype B showing the least deterioration with RAS intervention set slower at −5% of their natural cadence and Phenotype C showing the least deterioration with RAS intervention set faster at +10% of their natural cadence.

Summary: Though Phenotypes B and C failed to show a robust immediate response during RAS tuning in proof-of-principle study #4, it should be recalled that these same phenotypes demonstrated the greatest benefit to RAS intervention in proof-of-principle study #2b (see FIG. 20). That is to say, whereas the absolute change may be important when assessing an intervention's therapeutic outcomes, it is the relative change across the tunable parameter conditions that is evaluated during the tuning process. Critically, the current embodiment of 4 locomotor phenotypes based on the thigh phase portrait has the ability to both guide control parameter tuning (as demonstrated in proof-of-principle study #4) and predict the intervention response (as demonstrated in proof-of-principle study #2b).

Figure 21:
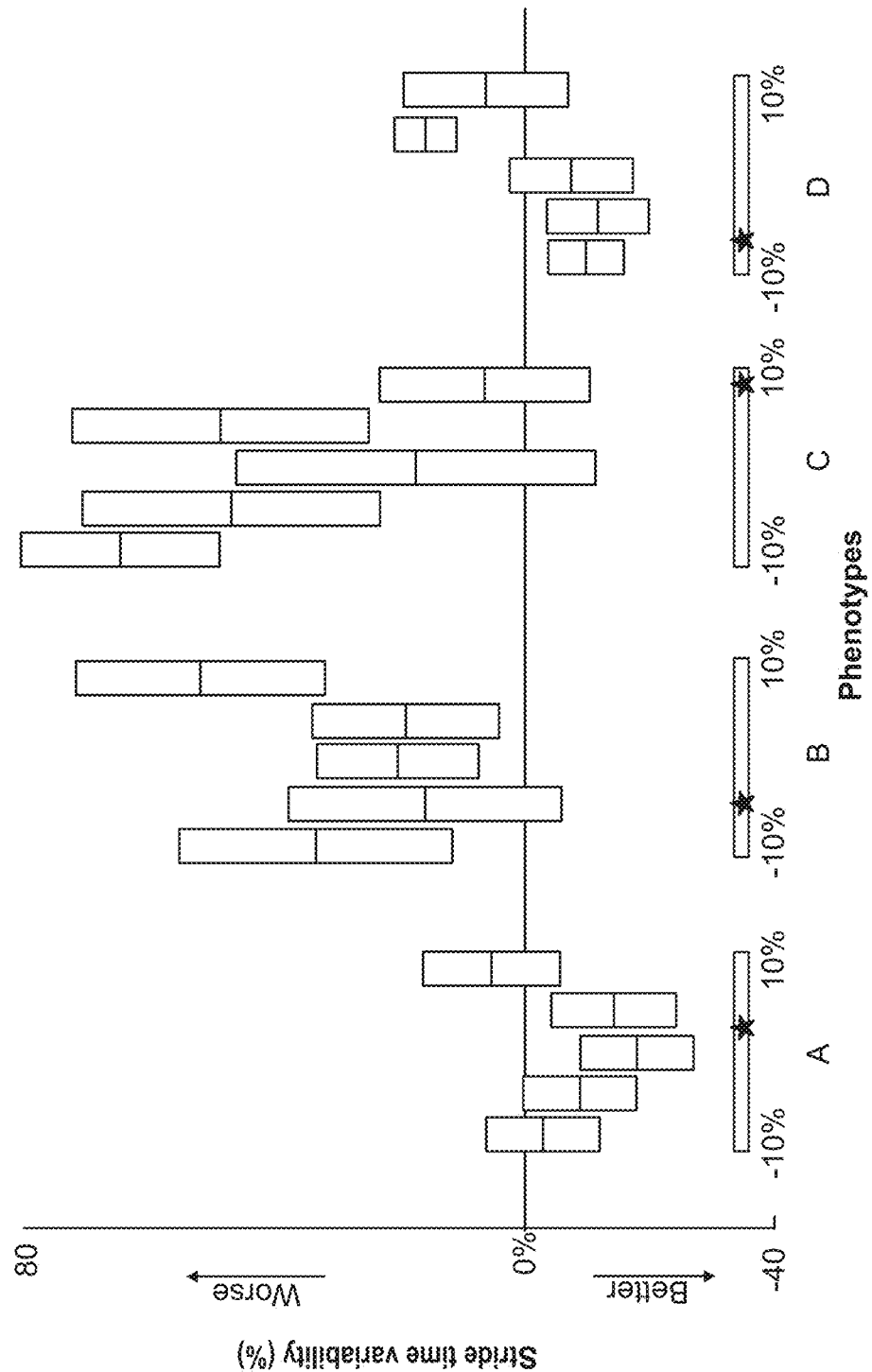
FIG. 21 shows example findings of a proof-of-principle phenotyping study demonstrating the ability of an embodiment of four locomotor phenotypes generated based on select features of the thigh phase portrait to guide the tuning of auditory-motor intervention devices.

FIG. 21 shows an example embodiment of an adaptive and tunable multi-modal exosuit for gait assistance and rehabilitation. The advance of phenotype-directed parameter tuning and prescription also supports multi-modal intervention systems, such as hybrid neuroprosthetic and robotic active assistive devices. These hybrid devices can effectively harness the strengths of component technologies only if the right assistive parameters are selected for the right patient. A phenotype-guided approach allows selection of the most optimal actuation strategy for a patient based on their assigned phenotype. For example, phenotype A, identified by high amplitude and low roundness requires more integrated support (i.e., multimodal and intraphase robotic and neuroprosthetic support) than phenotype B, characterized by both high amplitude and high roundness, which requires only unimodal and interphase actuation.

SUMMARY

Figure 12:
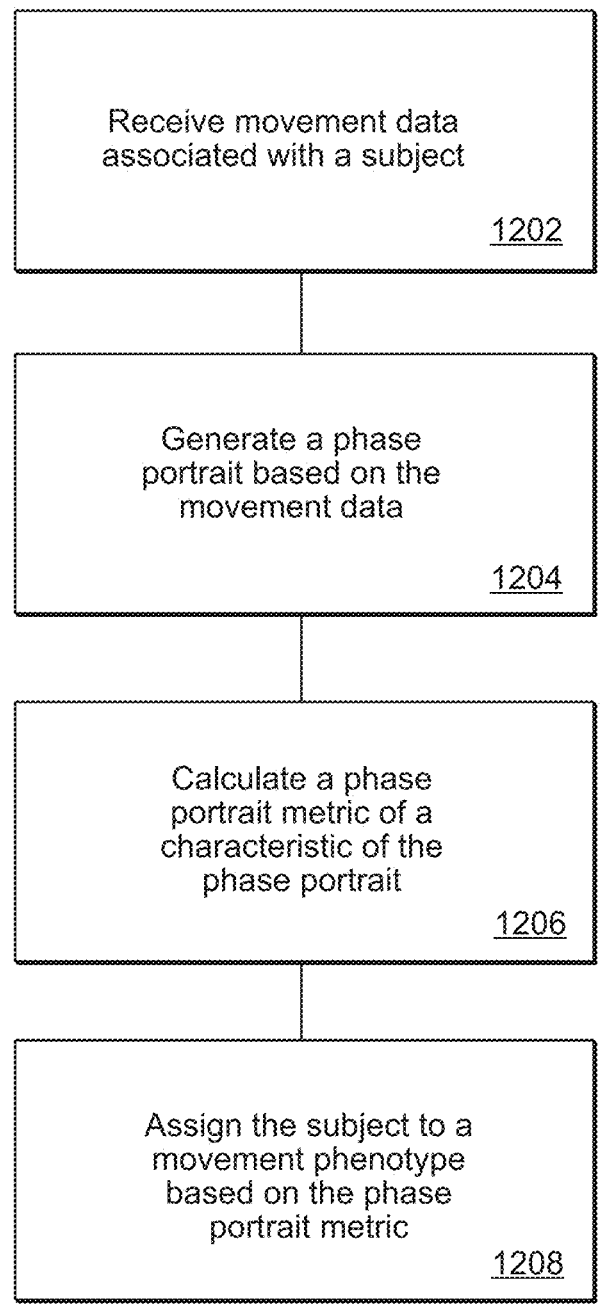
FIG. 12 shows an example method of assigning a subject to a movement phenotype.

FIG. 12 shows an example method. The method may comprise receiving movement data associated with a subject 1202, the movement data collected during repetitive movement of the subject; generating a phase portrait based on the movement data 1204; calculating a phase portrait metric of a characteristic of the phase portrait 1206; and assigning the subject to a movement phenotype based on the phase portrait metric 1208.

Figures 13A, 13B:
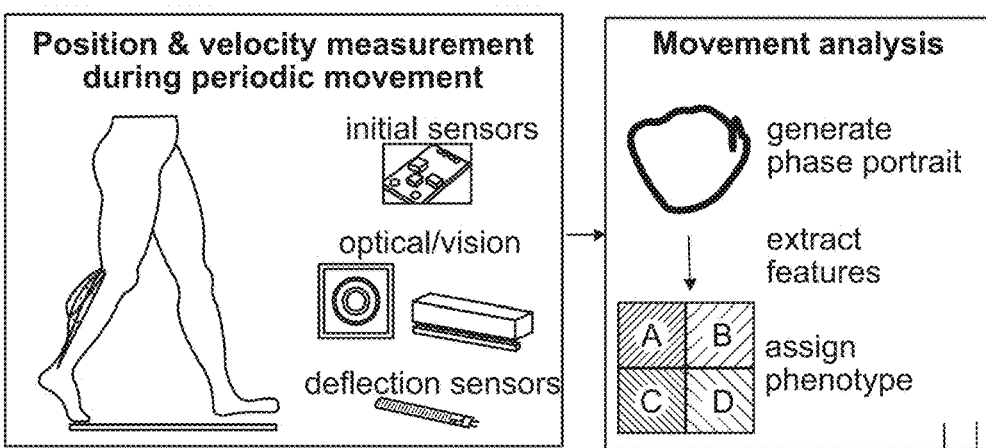
FIGS. 13A-13D show examples of phenotype-based movement diagnostics and screening.
Figure 13C:
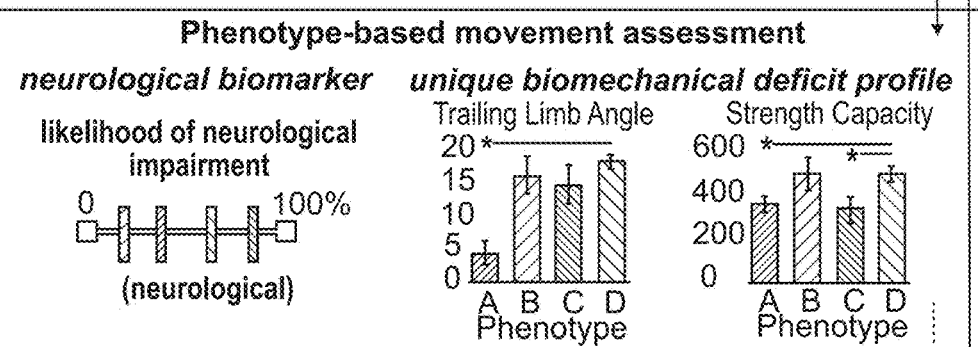

FIGS. 13A-D shows examples of phenotype-based movement diagnostics and screening. The phenotypes-though identified and assigned solely based on phase portrait features extracted from any kinematic measurement system (FIGS. 13A-13B)—reflect a distinct underlying pattern of functional, neuromuscular, and motor control deficits that can discriminate between neurotypical vs. neurological impairment (FIG. 13C). These diagnostic patterns are "universal"; that is, they go beyond traditional neurological diagnoses (e.g., stroke, Parkinson disease, multiple sclerosis, etc.) and provide actionable insights for both patients and clinicians (see FIG. 13D).

More specifically, phase portrait features (e.g., roundness, smoothness, amplitude) reflect different dimensions of impairment because they are biomechanically- and clinically-inspired. For example, roundness is associated with propulsive symmetry, and thus gait biomechanics and motor control; smoothness with gait variability, and thus motor control and automaticity; and amplitude with gait speed, and thus walking function.

Although these phase-portrait features are associated with these clinically-salient dimensions of movement impairment, this association is not necessary to use the phenotypes.

Systems, devices, and methods herein embodied this process of assigning phenotypes into a single sensor measurement system. Across the proof-of-principle studies described herein, this system has been shown to produce powerful insights that traditionally-measured gait variables (e.g., joint angles and spatiotemporal gait parameters) are unable to replicate.

Because each phenotype reflects a distinct, multi-dimensional pattern of movement impairment, each phenotype requires different intervention types and approaches.

Figure 13D:
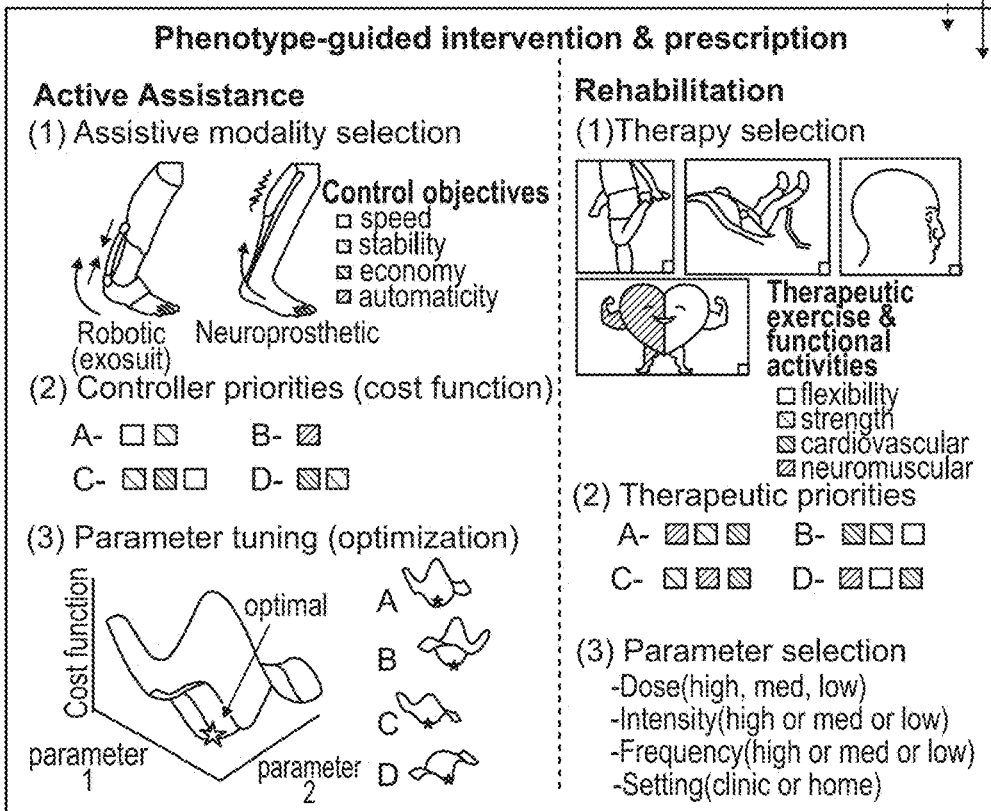

The intervention types can range from assistive (i.e., robotic or neuroprosthetic), rehabilitative (i.e., flexibility, strength, cardiovascular, neuromuscular), or combination interventions (panel FIG. 13D(1)).

The intervention implementation approaches can range from different controller priorities (for active assistance wearables) to different therapeutic priorities (for rehabilitative therapies) (FIG. 13D(2)).

Moreover, after the intervention type and approach are selected, the intervention parameters can be further tailored and optimized for the patient based on their phenotype.

For active assistive devices, this can be in the form of prospectively identifying responders and non-responders, as well as identifying a narrower parameter space for a closed-loop controller (FIG. 13D(3), left), resulting in faster optimization of the assistive parameters. To be used by a closed-loop controller to guide parameter tuning, the phenotype can be provided via a control interface module that translates the phenotype into device-specific actionable commands.

For a rehabilitative intervention, this can be in the form of prospectively identifying responders and non-responders, as well as identifying tailored treatment parameters (FIG. 13D(3), right), resulting in more effective treatment outcomes and lower safety-related adverse events. To be used by a clinician to guide their prescription of a treatment program, the phenotype can be provided to the clinician via a visual interface.

FIG. 17A shows an example embodiment of a sensor positioned at a subject's thigh.

FIG. 17B shows example thigh angular position and velocity time series data.

FIG. 17C shows an example phase portrait. Systems, devices, and methods described herein use novel locomotor assessment algorithms to generate a phase portrait and identify specific features that are used to identify a patient's locomotor phenotype.

FIG. 17D shows example propulsion phenotype information. In this embodiment, an amplitude (r) cutoff of 1.53 and a roundness (R) cutoff of 0.34 was used to identify four different locomotor phenotypes associated with differences in key propulsion determinants: (1) trailing limb angle, (2) plantarflexor strength capacity, and (3) plantarflexor neural drive. In other work (FIGS. 8A-8C) these locomotor phenotypes were associated with differences in joint power distributions within and across the paretic (P) and non-paretic (NP) limbs, as well as differences in walking endurance and distance-induced changes in spatiotemporal determinants of walking speed.

Figure 18A:
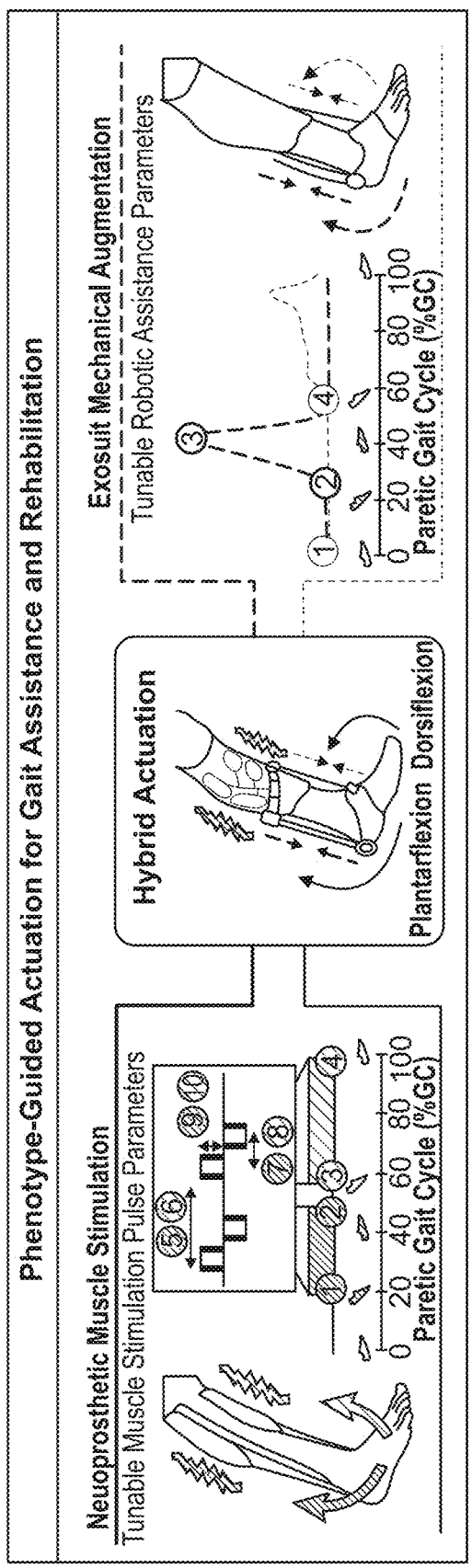
FIG. 18A shows an illustration of examples of uni-modal and multi-modal (hybrid) assistance of ankle plantarflexion and dorsiflexion during walking by individual and hybrid robotic and neuroprosthetic active assistance wearable devices.

FIG. 18A shows an Illustration of examples of uni-modal and multi-modal (i.e., hybrid) assistance of ankle plantarflexion and dorsiflexion during walking by an individual and hybrid robotic and neuroprosthetic active assistance wearable devices.

Figure 18B:
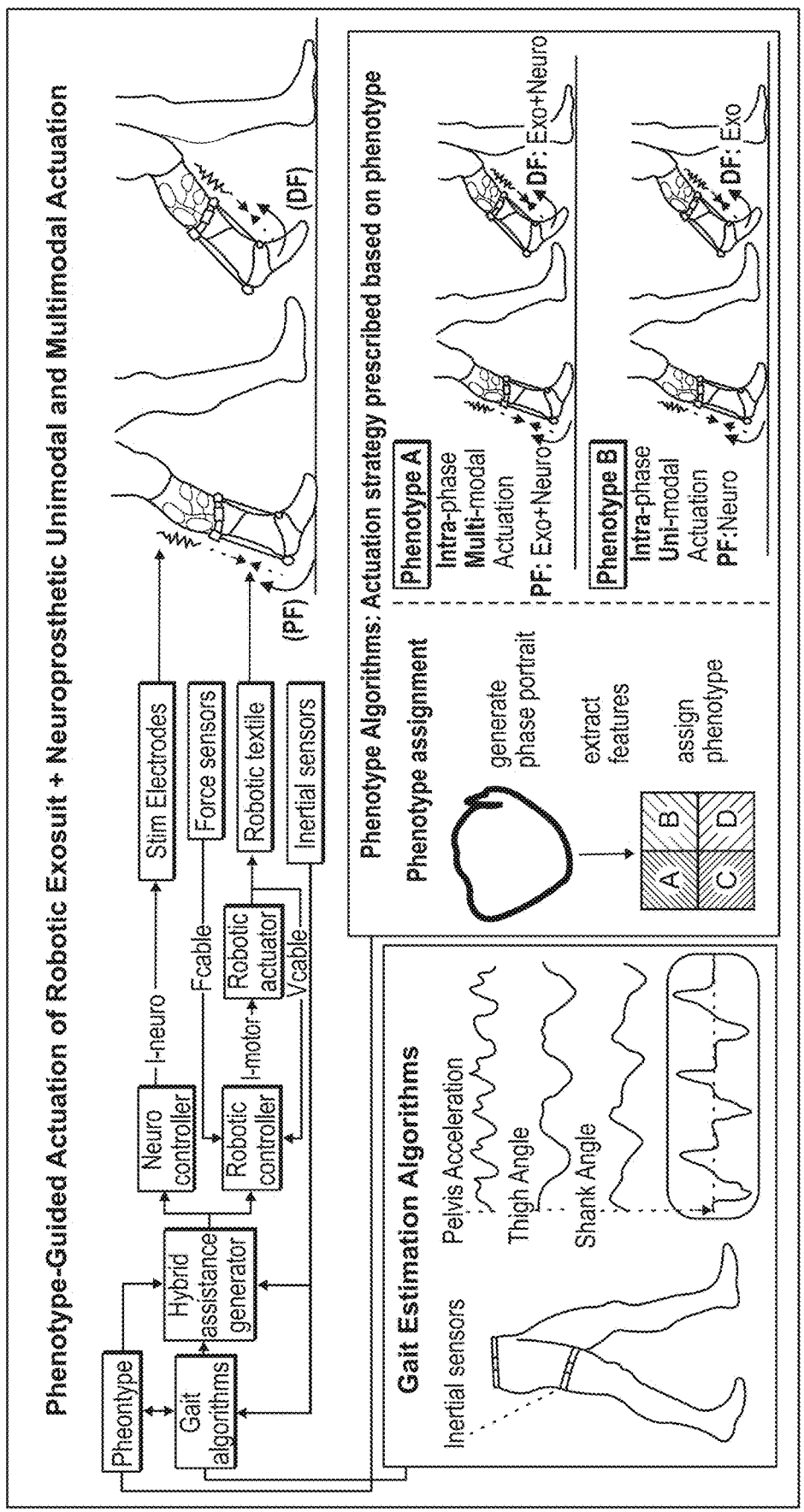
FIG. 18B shows an illustration of examples of phenotype-guided actuation. Phenotype algorithms operate in parallel with gait estimation algorithms to prescribe an optimal actuation strategy for an individual patient, reducing or eliminating the need for long and extensive individual tuning procedures.

FIG. 18B shows an illustration of phenotype-guided actuation. Phenotype algorithms operate in parallel with gait estimation algorithms to prescribe an optimal actuation strategy for an individual patient, reducing or eliminating the need for long and extensive individual tuning procedures. The active assistive wearable receiving the phenotype input may have built-in logic to translate the phenotype into an actionable set of commands (i.e., device-specific parameter inputs). If not, the phenotyping system will provide the phenotype-specific actionable commands via a control interface module. For example, for a multi-muscle neuroprosthetic, the actionable commands can include phenotype-specific stimulation (a) location (i.e., which muscle), (b) timing (i.e., when each muscle should be actuated, as a function of the gait cycle), and (b) pulse parameters (i.e., duration (usec), amplitude (mA), and frequency (Hz)). For a robotic exosuit the phenotype-specific actionable commands could be the corresponding force timing and/or amplitude control parameters.

In some embodiments, treatment based on the movement phenotype may be from an active assistive device. In some embodiments, treatment based on the movement phenotype may be delivered from a clinician-prescribed treatment program.

In some embodiments, to direct a clinician-prescribed treatment program, the phenotype can be provided to the clinician via a visual interface, whereas to direct an active assistive device, the phenotype could be: (1) provided directly to the device's controller if the controller has logic to make sense of the phenotype (i.e., a built-in decision-tree) or (2) translated into the controller's input language (i.e., device-specific parameter inputs). An example of (2) for a neuroprosthetic can be different: stimulation (a) location, (b) timing, and (b) pulse parameters (i.e., duration, amplitude, and frequency) as a function of the assigned phenotype. For a robotic exosuit these can be the corresponding force timing and/or amplitude control parameters.

Phenotype-guided control of wearable active assistive devices. An example of phenotype-guided treatment is in the control of wearable active assistive devices that act on the human body through different mechanisms of action to improve walking. Such devices may include neuroprosthetic devices that activate muscle through neuromuscular electrical stimulation, robotic exoskeletal devices that provide mechanical augmentation through external rigid elements or cables, and/or rhythmic auditory stimulation devices that activate the motor system via auditory-motor entrainment. Regardless of the type of device, to work safely and effectively, active assistive devices require user-personalized control parameters—i.e., tuning. Whether tuned manually with a clinician-in-the-loop [135,136], or autonomously via decision-tree [75,137] or optimization algorithms [138], the tuning process is often resource- and time-intensive, often requiring iterative trial-and-observe testing to converge on the most effective control profile for an individual user [138,139].

This tuning process is further complicated when considering the tuning needs of multi-modal systems that may combine individual assistive systems. For example, in past work with neuroprosthetic and robotic exosuit devices [44, 45,79,135], in addition to the individualized tuning of gait cycle-based onset and offset times that these devices require to work synergistically with the locomoting user, each device type also requires tuning of the multiple device-specific parameters that define the delivered actuation. Whereas neuroprosthetic devices require tuning of electrical stimulation pulse parameters (e.g., pulse duration, amplitude, and frequency), robotic exosuit devices require tuning of force delivery parameters (e.g., force timing and amplitude). The parallel delivery of robotic and neuroprosthetic assistance from hybrid systems requires highly complex tuning procedures that must consider the collective effect of the assistive modalities on the desired objective (see FIG. 18A for an example illustration of uni-modal and multi-modal assistance of ankle plantarflexion and dorsiflexion during walking).

Applying current embodiment of locomotor phenotypes to guide the control of hybrid actuation. Phenotype-guided intervention with active assistive wearable devices has the potential to dramatically reduce, if not eliminate, the cumbersome and labor-intensive tuning process currently required to tailor the delivered assistance to needs of individual users. In the example of a hybrid neuroprosthetic and robotic device (FIG. 18B), phenotype-guided intervention guides selection of the most optimal actuation strategy for an individual user based on their phenotype. For example, among the four locomotor phenotypes included in the disclosed exampled embodiment (FIG. 17D), Phenotype A—which is assigned based on a low amplitude and low roundness thigh phase portrait—is associated with several biomechanical deficits contributing to impaired gait propulsion, including a reduced trailing limb angle, a reduced plantarflexor force generating capacity, and impaired neural drive to the plantarflexors. Patients with this phenotype are likely to benefit from the maximal support that can be provided by combined robotic and neuroprosthetic active assistance, as depicted in the bottom right panel of FIG. 18B. In contrast, Phenotype B—which is assigned based on a high amplitude phase portrait with low roundness—is associated with a different set of biomechanical deficits contributing to impaired gait propulsion. Notably, whereas both phenotypes have marked deficits in neural drive to the plantarflexors, Phenotype B does not present with the substantial deficits in trailing limb angle or plantarflexor force generating capacity that Phenotype A presents with. An individual assigned to Phenotype B is thus an ideal candidate for less complex actuation strategies that can safely help them access the latent force-generating capacity of the plantarflexors, such as can be provided with the coupling of neuroprosthetic plantarflexor support and robotic exosuit dorsiflexor support, as depicted in the bottom right panel of FIG. 18B. Phenotype C—which is assigned based on a low amplitude phase portrait with high roundness—is likely to benefit from additional robotic exosuit plantarflexor support given additional marked deficits in plantarflexor strength capacity. Finally, Phenotype D—which is assigned based on a high amplitude and round phase portrait, and is associated with minimal propulsion deficits—is likely to benefit from an assist-as-needed robotic exosuit-only assistance paradigm where active assistance is provided only when needed, such as due to muscular fatigue with prolonged walking.

The paretic plantarflexor muscles have a latent force-generating capacity that patients are unable to voluntarily access. Research has shown that neuroprostheses can facilitate unique changes in corticomotor plasticity and muscle coordination and improve walking outcomes across the domains of body structure and function, activity, and participation that are not dependent on continued use of the neuroprosthesis. In an N=50 randomized controlled trial, durable gains were observed in the generation of paretic plantarflexor moments and the energy cost of walking that were not seen in controls who trained without the neuroprosthesis.

In contrast to neuroprostheses that use electricity to purposefully activate the biological musculature, soft robotic exosuits (i.e., functional textiles with integrated sensing and actuation) may generate assistive torques in parallel with the underlying paretic muscles. Unlike rigid exoskeletons, exosuits are worn like clothing, allowing for a more natural interaction between the person, the device, and the environment. Previous work has shown immediate improvements in biomechanical and functional outcomes when patients walk with an exosuit.

Systems, devices, and methods described herein involve the integration of robotic and neuroprosthetic actuation benefits from a phenotype-directed approach where individual patient phenotypes are matched to the most optimal hybrid actuation strategy.

Some embodiments described herein involve four phenotypes. In alternative embodiments, more than four phenotypes may be used. In alternative embodiments, fewer than four phenotypes may be used.

Using Phase-Portrait Generated Measures to Estimate Spatial Gait Parameters at the Point-of-Care without the Need for Additional Calibration Steps.

Clinical walking analysis requires measurement of both spatial and temporal gait parameters. Wearable sensors have long-made direct measurement of temporal parameters possible in clinical settings; however, high-accuracy estimation of spatial parameters has proven elusive outside of gait laboratories, requiring complex techniques that are difficult to scale. In some embodiments, systems, devices, and methods described herein validate a point-of-care spatial measurement technique that requires no additional calibration steps to enable high-accuracy estimation of spatial gait parameters from a single thigh-worn inertial sensor. 52 individuals with neurological gait deficits (N=26 post-stroke and N=26 with Parkinson disease) completed an instrumented 6-minute walk test. Very high-accuracy estimation of spatial gait parameters was achieved: <2.3 m error in the total distance walked, <1.4 m error every 30 m walked, and <9 mm error per stride. The per-stride spatial and temporal data were then processed, demonstrating that individuals with neurological gait deficits (N=52) were ~3× more likely to have distance-induced changes in spatiotemporal gait parameters compared to neurotypical healthy controls (N=12) ($\chi^2(1,64)>5.4$, $p<0.02$). This single-sensor gait assessment approach has the potential to democratize high-accuracy spatiotemporal gait assessment across clinic, community, and home settings.

INTRODUCTION

Neurological conditions, such as stroke and Parkinson disease, are leading causes of walking-related disability [A1,A2]. To describe the degree of walking impairment and track rehabilitation progress and/or disease progression over time, neurorehabilitation clinicians rely primarily on metrics derived from patient self-report, visual gait analysis, and standardized functional assessments [A3]. Although gait impairment can be grossly measured using these assessment approaches [A4,A5], inter- and intra-observer assessment variabilities are large enough to affect clinical decision-making [A6,A7], motivating more objective gait assessment approaches.

Lab-based optical motion capture is the gold standard for objectively assessing gait parameters with a high degree of precision, accuracy, and reliability [A8]; however, these systems are rarely used in clinical settings due to their high cost, required expertise, cumbersome setup procedures, and extensive post-collection data processing needs. Indeed, clinicians express a need for gait assessment tools that can be used easily and quickly, without compromising reliability and validity [A9]. We posit that point-of-care gait assessment techniques that retain the accuracy, precision, and reliability of lab-based instruments, yet can be readily used independently by clinicians across care settings (e.g., the clinic, home, and community), are critically needed to democratize clinical gait analysis and advance more effective gait interventions.

Recent developments in wearable movement sensors and digital assessment techniques have the potential to revolutionize patient care [A10]. One such technology, inertial measurement units (IMUs), provide a portable, easy-to-use, and low-cost method for the objective measurement of multiple gait parameters in different settings, from the clinic to the everyday world [A3, A11, A12]. However, the accuracy and reliability of an IMU's gait measurement abilities depend on the analysis methods used. Standard methods that exploit the periodicity of human walking [A13, A14] have enabled IMUs to accurately estimate temporal gait parameters (e.g., stride time, step time, stance time, and swing time) in both healthy and neurologically-impaired individuals [A15]. Unfortunately, common analysis methods—including the double integration approach [A16], human gait model approach [A17], and abstract machine learning approaches [A18]—have not been able to reliably and accurately estimate spatial gait parameters in a clinically-accessible way (see the review by Chen et. al. [A3] for a thorough description and critique of each of these approaches). In addition to an incomplete assessment of walking ability, the unavailability of spatial gait parameter estimates also hinders computation of clinically salient walking metrics, like walking speed and walking distance, which require high-accuracy measurements of both spatial and temporal parameters [A3,A5].

Usability factors must also be considered; the location of an IMU's placement on the body, the number of IMUs used, and the complexity of any required calibration procedures are factors that can affect clinical viability and adoption of wearable sensors. For example, though multi-sensor setups can be employed to increase measurement accuracy [A19, A20, AR2020], such an approach can be time-consuming and not practical for many end-user applications. To reduce the number of sensors required, estimation models derived via machine learning have emerged [A18] but are often limited by compromised generalizability due to erroneously coupling variables that are not truly linked [A3,A21]. The generalizability of these estimation models is also affected when patient groups are not sufficiently represented in model training [A11, A21]. Indeed, estimation approaches developed and validated with healthy individuals often rely on the identification of specific gait features (e.g., heel strike and toe off events) that can be challenging to detect accurately and reliably in patient populations that exhibit significant variability in impairments [A22].

To address the usability challenges of multi-IMU sensing systems, and the generalizability limitations of machine learning-based estimation models, a spatiotemporal gait assessment technique was developed that leverages a geometric analysis of walking data collected from a single thigh-worn inertial sensor to produce high-accuracy estimates of walking speed and its spatiotemporal determinants (i.e. stride length and frequency) [A23] (FIG. 14). In prior work [A23], it was demonstrated that, once calibrated, the single-sensor system can be used to collect high-accuracy spatiotemporal gait data in any setting (i.e., clinic, home, and community); however, because the initial calibration is dependent on ground-truth motion capture data, scalable deployment beyond settings with some access to a gait laboratory was limited.

Figures 14A, 14B:
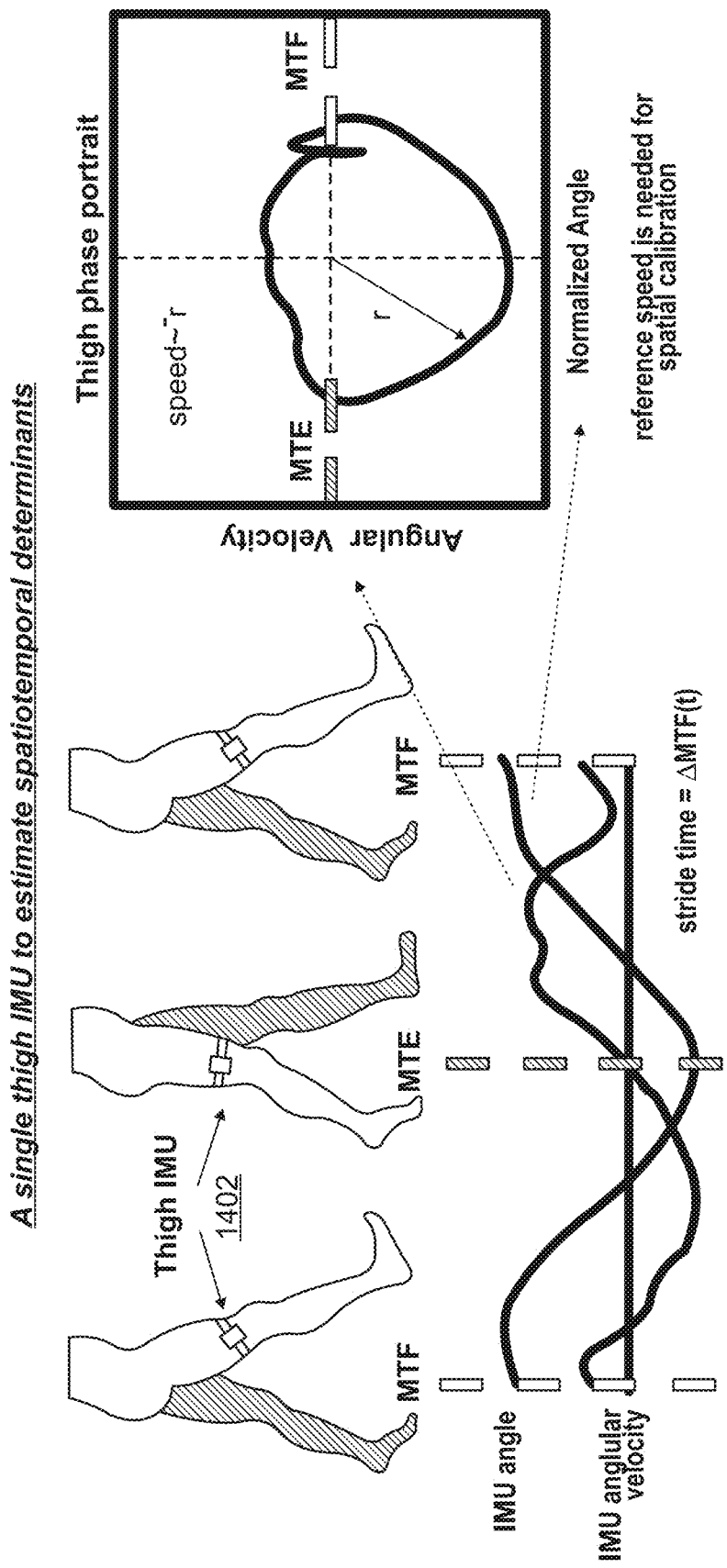
FIGS. 14A-14D show an example speed estimation approach overview.
Figures 14C, 14D:
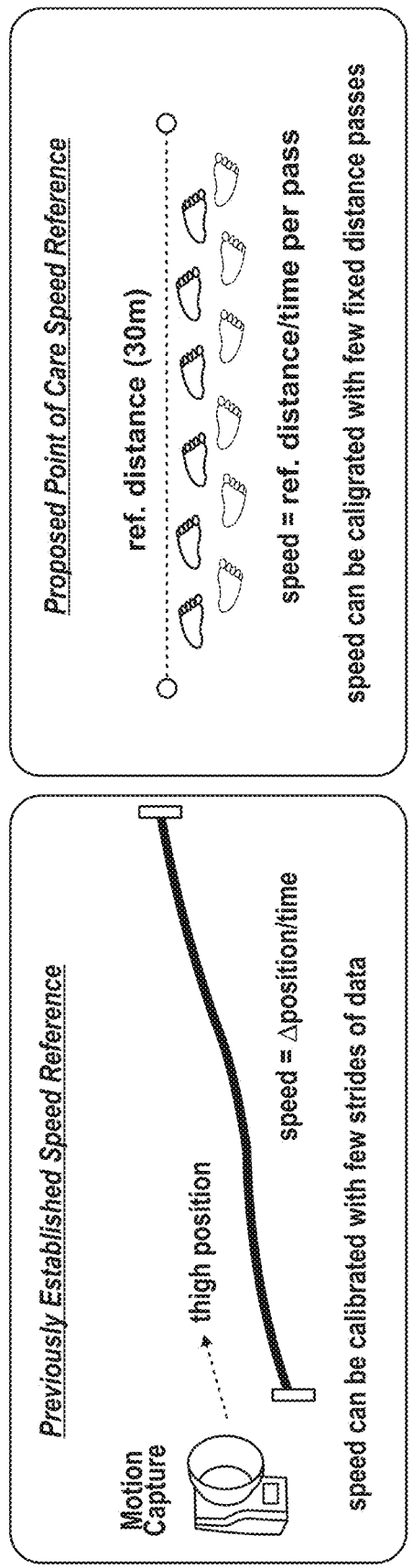

FIGS. 14A-14D show an example speed estimation approach overview. In prior work [A23], it was demonstrated that a single thigh inertial measurement unit 1402 (IMU) could be used to produce phase portraits, from which specific features (e.g., the polar radius [r]) could be used to estimate walking speed and its spatiotemporal determinants (FIGS. 14A-14B). Previous calibration of the spatial estimation algorithms required ground-truth position data inputs from a laboratory-based optical motion capture system (FIG. 14C). Proposed point-of-care calibration technique utilizing a single measurement of a reference distance as the calibration input (FIG. 14D). Abbreviations: MTF: Maximum thigh flexion, MTE: maximum thigh extension, r: polar radius, also referred to herein as Amplitude In some embodiments, systems, devices, and methods described herein validate a clinically-accessible and simple-to-implement spatial estimation technique that can be implemented at the point-of-care, thus alleviating the need for ground-truth motion capture data during subject-specific calibration. The point-of-care procedure requires only the initial input of a reference distance and repeated walks along that distance to calibrate (FIGS. 14A-14D). To validate the spatial gait parameter outputs of the single-sensor system when calibrated using this technique, we evaluated the system's performance in three clinical use-case applications.

First, we sought to examine the accuracy of the system when assessing the 6-minute walk test performance of individuals with post-stroke hemiparesis and Parkinson disease, with specific focus on the total distance walked and the distance walked every 30 m. These are clinically-salient spatial variables we calculate using the system's estimates of individual stride lengths (see prior work for a description of the estimation procedure [A23]).

Second, we analyzed the per-stride spatial and temporal gait data produced by the calibrated single-sensor system to evaluate gait differences between neurologically-impaired individuals versus neurotypical healthy controls. Based on the well-established prior work documenting reduced cadences, stride lengths, and/or walking speeds among individuals with Stroke and Parkinson disease compared to neurotypical healthy individuals [A24,A25], we hypothesized lower system-estimated spatiotemporal gait parameters in the study's neurologically-impaired individuals compared to neurotypical healthy individuals—a finding that can support the validity of the system's measurements.

Third, given recent work that has identified distance-induced changes in walking speed and its spatiotemporal determinants as an emerging and promising indicator of movement impairment [A26,A27,A28,A29], we evaluated whether the system could detect between-group differences in the distance-induced changes in spatiotemporal gait parameters, hypothesizing a greater prevalence in neurologically-impaired vs. neurotypical healthy controls.

Results
Participants

Twenty-six individuals with chronic post-stroke hemiparesis (6F/20M, 59.0±9.1 years, 172±10 cm, 88±18 kg, 14L/12R paretic), twenty-six individuals with mild to moderate Parkinson Disease (19F/7M, 62.5±9.3 years, 167±8 cm, 74±13 kg), and twelve healthy neurotypical individuals (6F/6M, 21.4±2.9 years, 170±10 cm, 63±13 kg) participated in the study (Table 1). The neurologically-impaired cohort had a wide range of walking speeds between 0.3 to 1.8 m/s, whereas the neurotypical cohort had an expectedly narrower range of walking speeds between 1.3 to 2.0 m/s.

Validation Study 1: Spatial Parameter Estimation Accuracy

Figures 15A, 15B:
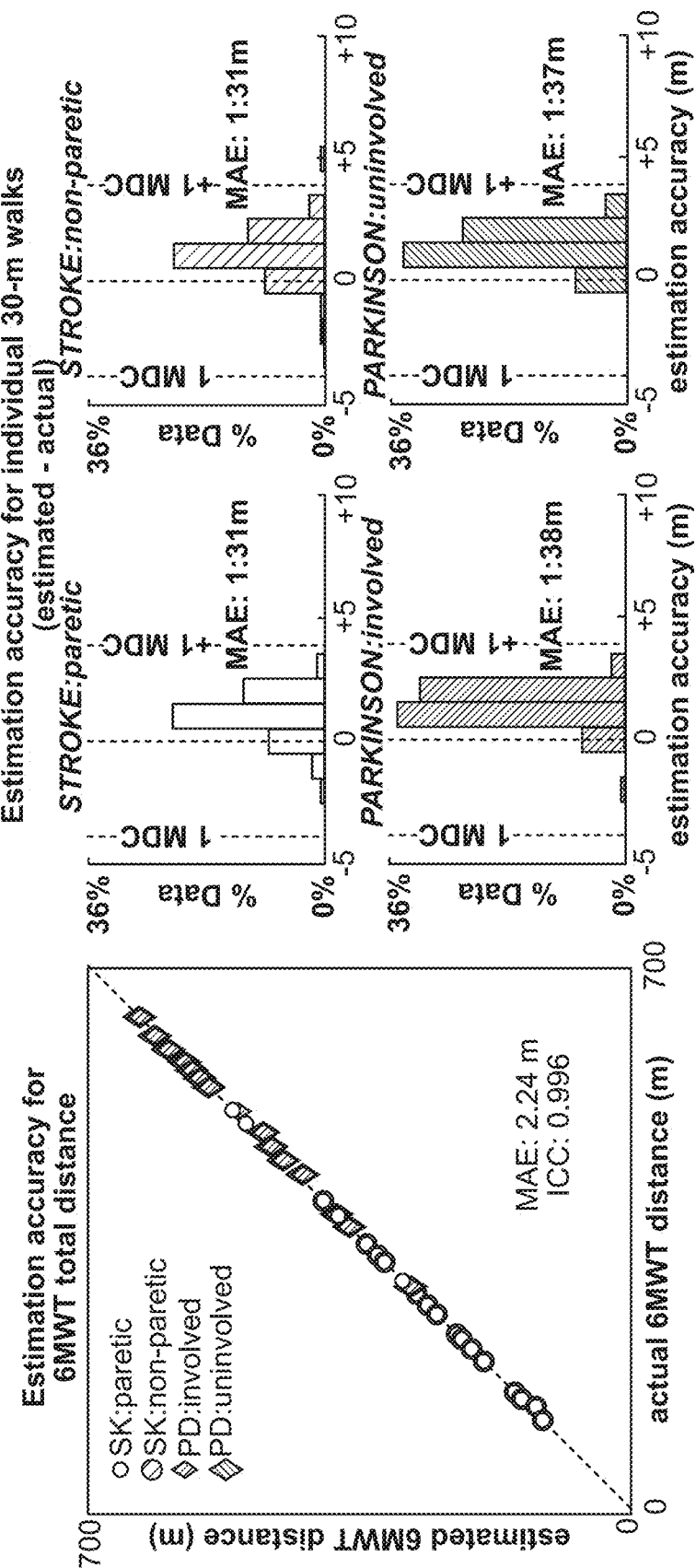
FIG. 15A shows an example of the accuracy of the total distance walked during the 6-minute walk test, which was assessed by comparing measurements made by a clinician using a measuring wheel (actual) and estimated by the single-sensor system (estimated).
FIG. 15B shows an example of the accuracy of the estimates of the distance walked per known 30-m walk.

The single-sensor IMU system demonstrated high accuracy and agreement in its measurements of the total distance walked during the 6-minute walk test. Clinician-measured total walking distances were 274±107 m for the post-stroke cohort, 510±83 m for the Parkinson disease cohort, and 586±72 m for the neurotypical healthy cohort. The single-sensor system's estimates of total walking distance had low absolute error (mean absolute error [MAE]: 1.25 m and 2.24 m) and high absolute agreement (intra-class correlation [ICC]: 0.999 and 0.996) in the neurotypical and neurologically-impaired cohorts, respectively, when compared to the clinician ground-truth measurements (FIG. 15A).

Similarly, single-sensor estimates of the distance walked every 30 m during the 6MWT were highly accurate, with average error <4.7% (i.e., <1.4 m MAE). Of the 1137 distinct 30 m walks completed by all study participants as part of their 6-minute walk tests, 1133 (99.7%) had estimates that were substantially less than the previously established minimal detectable change (MDC) of 13% for the 6-minute walk test (i.e., 3.9 m per 30 m walk) [A30] (FIG. 15B). Expressing the error on a per-stride basis reveals an average stride length error of less than 1% in each cohort—i.e., an average error of 5.7±3.5 mm was observed in the post-stroke cohort, which had an average stride length of 0.97 m, and an average error of 8.5±5.3 mm was observed in the Parkinson disease cohort, which had an average stride length of 1.46 m.

TABLE 1

Participant characteristics

|  | Post-stroke | Parkinson Disease | Healthy control |
|---|---|---|---|
| Age (years) | 59.0 ± 9.1 | 62.5 ± 9.3 | 21.4 ± 2.9 |
| Height (cm) | 172 ± 10 | 167 ± 8 | 170 ± 10 |
| Weight (kg) | 88 ± 18 | 74 ± 13 | 63 ± 13 |
| Sex (M/F) | 6F/20M | 19F/7M | 6F/6M |
| Onset (years) | 4.2 ± 3.9 | 6.7 ± 4.3 |  |
| Affected limb | 14L/12R | 15L/11R |  |
| 6MWT (m) | 274 ± 107 | 510 ± 83 | 586 ± 72 |
| FMA-LE | 19.0 ± 5.0 |  |  |
| FGA | 13.0 ± 4.0 |  |  |
| MiniBEST |  | 24.5 ± 2.4 |  |
| UPDRS - Part 3 |  | 20.4 ± 8.2 |  |

Abbreviations: FMA-LE: Fugl-Meyer Assessment of Motor Recovery after Stroke—Lower Extremity subsection; FGA: Functional Gait Assessment; MiniBEST: Mini Balance Evaluation Systems Test; UPDRS-Part3: Unified Parkinson's Disease Rating Scale—Part 3.

Figure 15C:
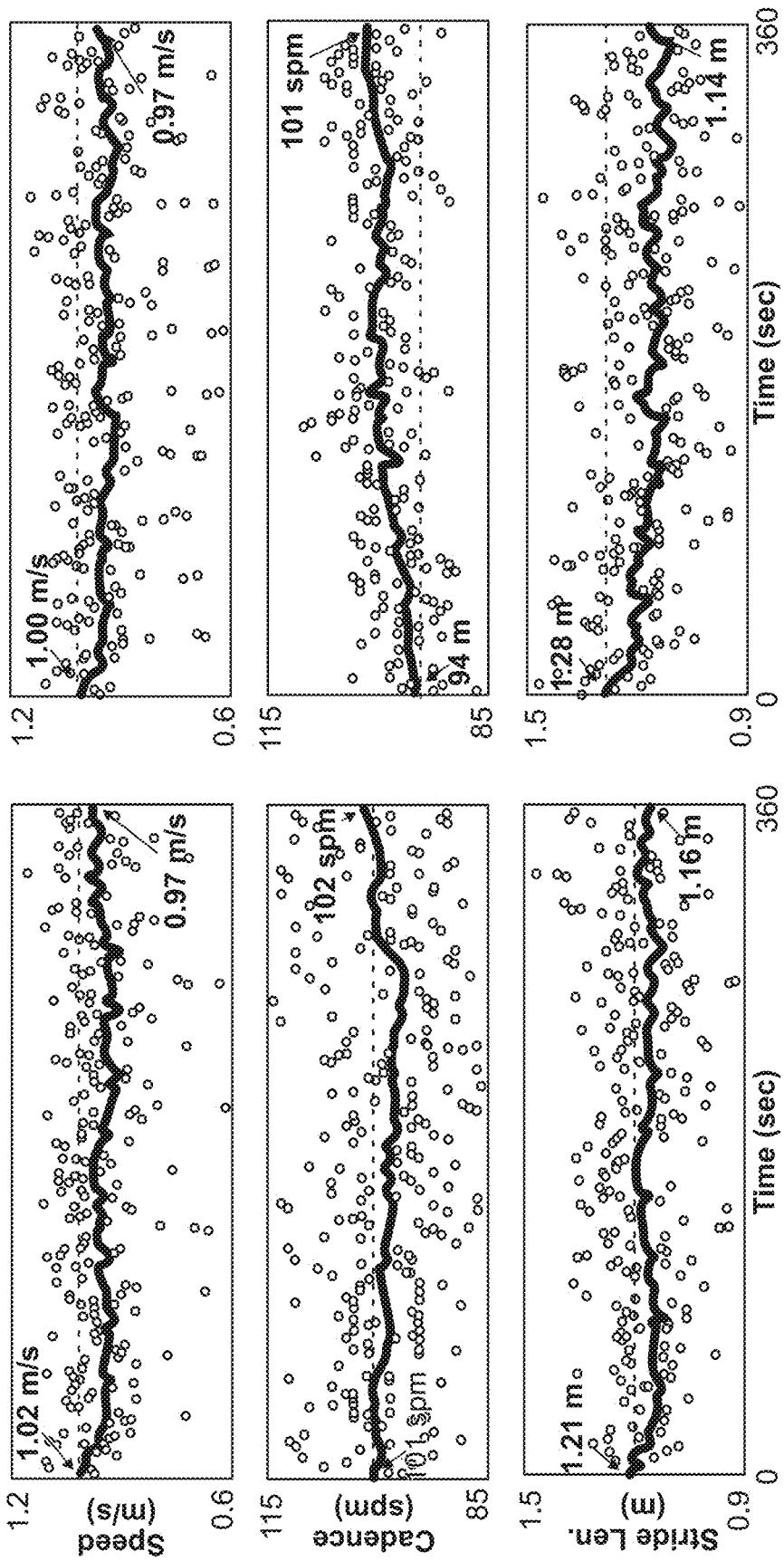
FIG. 15C shows an example visual depiction of the per-step spatiotemporal data estimated by the single-sensor system during 6-minute walk tests completed by two exemplar study participants.

FIGS. 15A-15C show example accuracy of spatial gait parameter estimates in neurological populations. FIG. 15A shows an example of the accuracy of the total distance walked during the 6-minute walk test, which was assessed by comparing measurements made by a clinician using a measuring wheel (actual) and estimated by the single-sensor system (estimated). For completeness, the accuracy of the estimates produced when the single-sensor was worn on either limb was independently measured. We observed a mean average error (MAE) of 2.24 m. FIG. 15B shows an example of the accuracy of the estimates of the distance walked per known 30-m walk. Over 99% of the 30 m walks had estimates of the distance walked that were less than 3.9 m, which we defined as an acceptable error threshold for a 30 m walk based on the minimum detectable change score (MDC) of 13% established for the 6-minute walk test [A26]. We observed MAEs<1.38 m. FIG. 15C shows an example visual depiction of the per-step spatiotemporal data estimated by the single-sensor system during 6-minute walk tests completed by two exemplar study participants. Though the two participants had equivalent 6MWT total distances, and neither demonstrated changes in walking speed over the course of the test, marked differences in the spatiotemporal strategies used to maintain speed over the duration of the test were observed across participants. Abbreviations: SK: Stroke, PD: Parkinson disease. Involved limb—is the side with more impairment as measured by the per UDPRS.

Validation Study 2: Between-Group Differences in Spatiotemporal Gait Parameters

We applied the per-stride spatial and temporal gait data to evaluate gait differences between neurologically-impaired individuals and neurotypical cohorts. Between-group differences in the median walking speed, cadence, and stride length measured during the 6-minute walk test were observed across the three cohorts ($\chi^2(2)>35$, $p<0.001$). Compared to the healthy neurotypical cohort, individuals with post-stroke hemiparesis had lower system-estimated walking speeds, cadences, and stride lengths ($p<0.001$); in contrast, individuals with Parkinson disease had lower system-estimated walking speeds and stride lengths ($p<0.05$), but not cadences ($p=0.78$) (see Table 2).

TABLE 2

Spatiotemporal parameter during the six-minute walk test

|  | Neurologically-impaired | | Neurotypical | Between- |
|---|---|---|---|---|
|  | Stroke (N = 26) | Parkinson (N = 26) | Healthy Young (N = 12) | Group Statistics |
| Speed (m/s) | 0.77 [0.38] | 1.46 [0.28] | 1.62 [0.31] | *p < 0.001<br>A: p < 0.001<br>B: p = 0.021 |
| Cadence (spm) | 97 [13] | 120 [15] | 117 [11] | *p < 0.001<br>A: p < 0.001<br>B: p = 0.777 |
| Stride length (m) | 0.97 [0.38] | 1.46 [0.24] | 1.61 [0.15] | *p < 0.001<br>A: p < 0.001<br>B: p = 0.003 |

Median and interquartile range reported; *Kruskal-Wallis test between all three groups. A and B are the Wilcoxon rank sum test between post-stroke vs. healthy young cohorts and Parkinson vs. healthy young cohorts, respectively.

Validation Study 3: Distance-Induced Changes in Spatiotemporal Gait Parameters

Differences in the prevalence of distance-induced changes in walking speeds, cadences, and stride lengths were observed in the neurologically-impaired cohort compared to the neurotypical healthy cohort. More specifically, though the prevalence of distance-induced changes in walking speed (i.e., of at least 3% (based on what we can reliably detect)) was not statistically different ($\chi^2(1,64)=1.28$, $p=0.26$) when comparing the neurologically-impaired cohort (i.e., 60%) and the neurotypical healthy cohort (i.e., 42%), we observed marked differences in the prevalence of distance-induced changes in cadence ($\chi^2(1,64)=5.41$, $p=0.020$) and stride length ($\chi^2(1,64)=6.52$, $p=0.011$). Compared to neurotypical healthy individuals, markedly more individuals in the neurologically-impaired cohort presented with distance-induced changes in cadence (neurotypical: 17% vs. neurologically-impaired: 54%) and stride length (neurotypical: 25% vs. neurologically-impaired: 65%) (Table 3).

TABLE 3

Frequency of individuals with changes in distance-induced spatial-temporal strategies over the 6MWT

|  | Neurologically-impaired | | | Neurotypical | | |
|---|---|---|---|---|---|---|
|  | Stroke (N = 26) | Parkinson Disease (N = 26) | Combined (N = 52) | Healthy Young (N = 12) | Chi-square (p-value) | Likelihood ratio (+) |
| ΔSpeed | 61.5% | 57.7% | 59.6% | 41.7% | 0.258 | 1.429 |
| ΔCAD | 53.9% | 53.9% | 53.9% | 16.7% | 0.020 | 3.228 |
| ΔStride length | 69.2% | 61.5% | 65.4% | 25% | 0.011 | 2.616 |

* chi-square analysis performed between neurologically-impaired (N = 52) and neurotypical (N = 12) cohorts

DISCUSSION

This foundational study describes and validates the use of a single Inertial measurement unit (IMU) 1402 worn on the thigh to measure clinically-useful spatial gait parameters with high accuracy and reliability in both neurologically-impaired and neurotypical individuals. IMUs are portable, low-cost wearable sensors that can provide accurate real-time measures of movement and can be used in any setting—from the gait laboratory and clinic to the everyday world.

The major contribution of this study is a point-of-care spatial parameter estimation system run on a single thigh-worn IMU [A23] that requires minimal calibration to enable high-accuracy stride-by-stride estimates of walking speed and its determinants (i.e., stride length, and cadence), from which a complete spatiotemporal analysis of a patient's walking ability can be produced.

A second contribution of this study includes using the per-stride estimates made by a single-sensor system to show that distance-induced changes in spatiotemporal gait parameters measured by a single IMU sensor 1402 can distinguish between neurologically-impaired and neurotypical individuals. Whereas routine clinical assessments of the 6-minute walk test are clinically focused on the total distance walked [A31], emerging research has shown the prognostic value of examining distance-induced changes in walking speed during the test [A26]. Here we show that estimates of distance-induced changes in walking speed are not discriminative of neurological impairment; however, distance-induced changes in spatiotemporal determinants of speed were more discriminative of neurological impairment. Taken together, this foundational study advances a highly scalable, single-sensor gait assessment approach with potential to democratize high-accuracy spatiotemporal gait assessments and yield new opportunities to track and monitor salient mobility impairments that provide a window into neurological disease [A10].

In neurologically impaired individuals, spatiotemporal gait parameters like walking speed, cadence, and stride length are strongly correlated with health factors like fall risk [A32], metabolic effort [A33], cognition [A34,A35], physical activity [A31] and mortality [A5,A36]. The use of inertial sensors to measure spatiotemporal gait parameters in everyday walking environments has the potential to pave the way for new health paradigms—from prevention to rehabilitation. Indeed, beyond assessing the degree of impairment, longitudinal tracking of these variables may identify gait changes that are known to precede a health decline and enabling preventative treatments that extend health, function, and quality of life [A10,A35].

Despite this potential, the usability of inertial sensors in measuring spatial-temporal variables largely depends on the algorithms used and their validity among neurological diagnostic groups with a highly heterogeneous gait compared to what is observed in neurotypical groups [A12]. The latest estimation approach using a single inertial sensor reported a 2-14% error [A12], while a 13% MDC in observed for post-stroke gait [A30]. In comparison this approach achieved high accuracy (MAE<2.2 m) and inter-rater agreement (ICC>0.99) across neurotypical and neurologically-impaired cohorts, with errors between 1-5%, emphasizing the higher precision and sensitivity of the IMU measure compared to standard clinical procedures that utilizes a measuring wheel administered by a physical therapist while retaining at least similar accuracy and consistency. This allows for tracking smaller increments of changes previously unattainable with measuring wheels—thereby advancing precision rehabilitation. The study contributes to a better understanding of spatial-temporal changes during the six-minute walk test, a strongly correlate of community mobility [A26, A31, A37], addressing a previously inaccessible aspect of the six-minute walk test.

Consistent with previous post-stroke studies [A25], the post-stroke cohort exhibit reduced walking speed, stride length, and cadence compared to neurotypical young individuals. Similarly, consistent with Parkinson previous studies [A24, A38, A39], the Parkinson cohort demonstrated a reduced walking speed and stride length and maintained a comparable cadence to neurotypical young individuals. These outcomes together externally validate the disclosed single-sensor approach, showcasing its ability to capture population-level gait differences and facilitating future studies to accurately and reliability estimate population-level spatiotemporal measures.

Readily we observed that neurologically-impaired cohorts during the 6MWT have a higher likelihood of distance-induced changes in stride length and cadence, rather than walking speed compared to neurotypical cohorts. While changes in walking speed can be clinically approximated using a measuring wheel and stopwatch; changes in stride length or cadence are not clinically accessible. Distance-inducted spatiotemporal changes hold significant clinical value; clinical measurable change in average walking speed is related community mobility [A26] and walking related motor fatigue [A28, A40]. This method has the potential to expedite the adoption of wearable movement sensors across care settings, enabling the assessment of spatial-temporal parameters beyond walking speed. These measures may offer increased sensitivity in neurologically-impaired individuals, where individual changes in stride length or cadence due to fatigue, exertion, or rehabilitation may precede changes in walking speed, providing prognostic and diagnostic value that can impact clinical decision-making. Future studies can now test these hypotheses with a point-of-care approach as described herein.

Methods

Data Collection

This study analyzes baseline data collected for two parent clinical trials involving individuals post-stroke (NCT04818424) and Parkinson disease (NCT05421624), as well as baseline data collected with a convenience sample of healthy neurotypical individuals. All participants completed the 6-minute walk test using a standard 30-meter walkway while instrumented with a single-thigh IMU (Xsens, Enschede, Netherlands). Although assessing the accuracy of single-sensor estimations is the goal of this study, IMUs were worn on both limbs to allow for analyses of accuracy per limb. Six-minute walk test (6MWT) distance was measured by a physical therapist and assistant using a hand-held measuring wheel (FIG. 16).

Data Processing

Inertial data (IMU) were collected on a collection computer using the MTw system (DOT Pro, Movella, Netherlands) at 100 Hz for the stroke study, while IMU data were collected on a mobile phone using the Xsens DOT app (DOT, Movella, Netherlands) at 60 Hz for the healthy young and Parkinson disease studies. In all cases, raw IMU data were filtered at 10 Hz using a second-order Butterworth filter. The IMU orientations during the quiet standing before the 6MWT served as the zero reference for the IMU orientation signals during walking. The roll axis of the IMU was roughly aligned with the sagittal rotation axis of the thigh. Individual strides were segmented based on maximum thigh flexion (MTF) and the temporal difference between consecutive strides defines stride times [A23] (FIG. 16).

Figure 16:
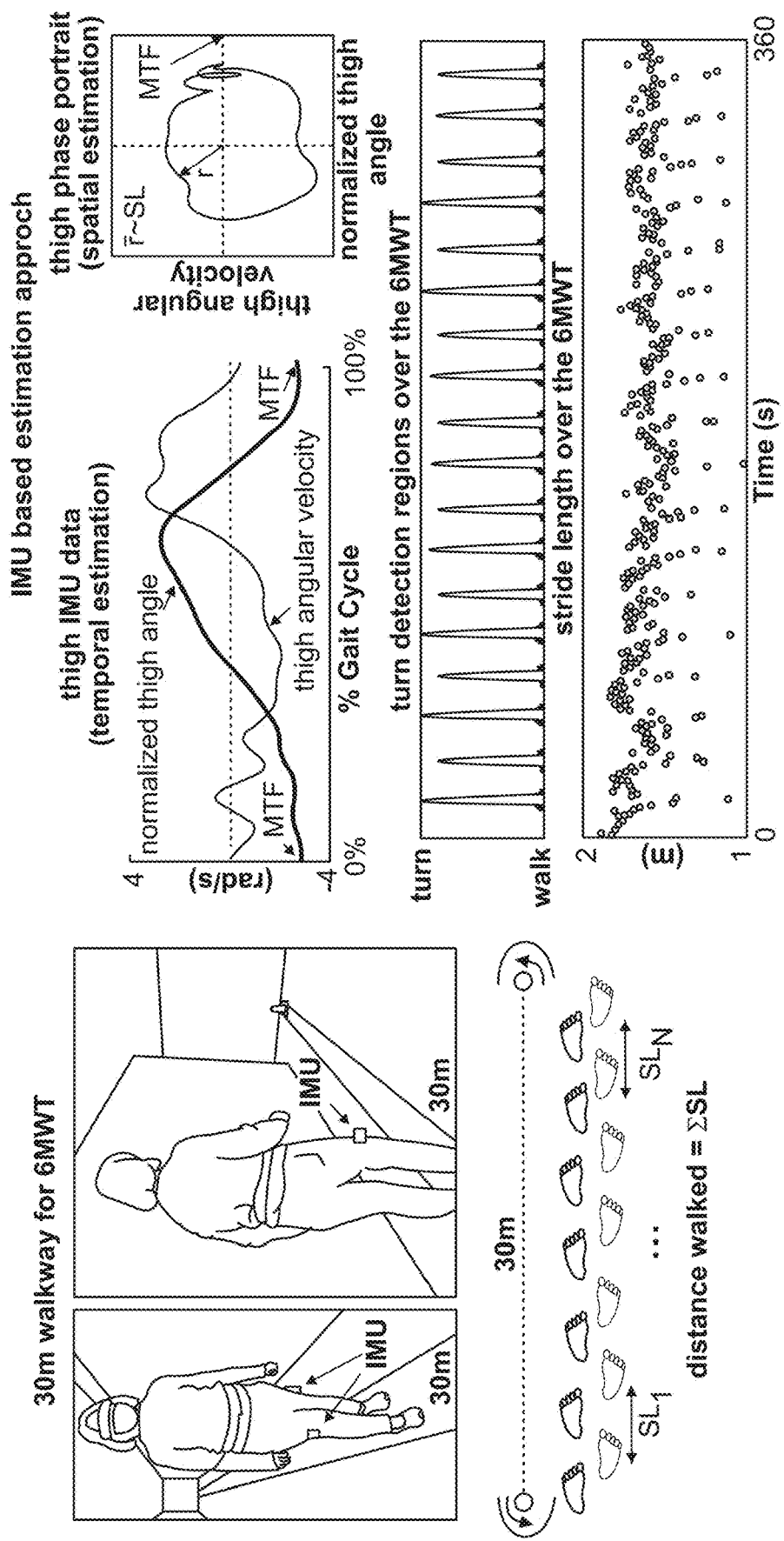
FIG. 16 shows an example data collection setup during a standard 6-minute walk test (6MWT) and example results. Abbreviations: MTF: Max thigh flexion, SL=stride length, r=Amplitude.

FIG. 16 shows an example data collection setup during a standard 6-minute walk test (6MWT) and example results. Abbreviations: MTF: Max thigh flexion, SL=stride length, r=polar radius.

Data Analysis

A previous study showed that a single thigh-worn inertial sensor calibrated for each subject utilizing ground-truth motion-capture data can produce accurate and reliable estimates of walking speed and its spatiotemporal determinants [A23]. In this disclosure, a new approach for subject-specific calibration is evaluated. The approach uses as calibration inputs known walking distances, such as the known 30 m distance walked along every pass of the 30 m walkway traditionally used during clinical 6MWTs.

The point-of-care calibration procedure leverages the highly linear relationship ($v=c1+c2*r$) between walking speed (v) and the IMU-derived measure of thigh polar radius (r) obtained from the geometric analysis of thigh phase portraits described in previous work [A23]. More specifically, instead of finding subject-specific coefficients (c1 and c2) based on stride-by-stride measurements of motion-capture measured walking speed and IMU-measured polar radius, we use the average walking speed and the average polar radius per 30 m walk during the 6-minute walk test. Once these coefficients are identified, we use stride-to-stride measures of r to estimate stride-to-stride measures of walking speed. We then divide walking speed by the IMU-measured stride times, to get stride length. To estimate the total distance walked during the 6MWT and each 30-m walk, we add up all the relevant stride lengths.

To determine the average speed per 30-m walkway, we implemented a turn detection algorithm that used the thigh angle in the frontal plane to detect 180 deg turns during the 6MWT. When a turn is detected, we know that 30-m distance is walked for a standard 6MWT walkway [A41], plus a small turn radius—which we set to be 0.75 m. We calculated the average speed for each 30-meter walkway based on this known distance and time detected between each turn. While we demonstrated this method using a 30 m walkway as a reference, any known fixed distance can be used to calibrate the algorithm, as long as enough time is given for the participants walking to stabilize after each turn. Once calibrated, the estimation can be used in any context (straight line or otherwise).

Validation Study 1

We evaluated the accuracy and agreement of the IMU-estimated 6MWT distance against the physical therapist-measured 6MWT distance using mean absolute error (MAE) and two-way mixed effect, absolute agreement, single rater intraclass correlation coefficients (ICCs) [A42,A43], with ICC values above 0.9 considered to be excellent [A42]. We also compared the accuracy for each 30-meter segment of the 6MWT and reported the MAE, to show consistency of results across the 6MWT. Using the total number of strides walked during the 6MWT and the 6MWT distance error, we compute the average stride length error.

Validation Study 2 and 3

We evaluated the average spatial-temporal differences across individuals in the three cohorts using a Kruskal-Wallis test. We then compared the stroke and Parkinson's cohort to neurotypical cohorts using a Wilcoxon rank sum test. We also evaluated differences across cohorts in the frequency of distance-induced spatiotemporal changes (i.e., changes in speed, stride length, and cadence) between minute 1 and minute 6 of the 6MWT. We set the threshold for change to be ±3% since we can reliably detect stride length within 1% and added a factor of 3 to improve robustness. We also conducted a chi-square analysis to see if the spatial-temporal change is different between the neurologically-impaired and neurotypical cohorts.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

BIBLIOGRAPHY

[1] E. A. Ashley, "Towards precision medicine," Nature Reviews Genetics, vol. 17, pp. 507-522, September 2016.

[2] M. R. Kosorok and E. B. Laber, "Precision Medicine," Annual Review of Statistics and Its Application, vol. 6, pp. 263-286, mar 2019.

[3] A. D. Kuo and J. M. Donelan, "Dynamic Principles of Gait and Their Clinical Implications," Physical Therapy, vol. 90, no. 2, pp. 157-174, 2010.

[4] R. Neptune, S. Kautz, and F. Zajac, "Contributions of the individual ankle plantar flexors to support, forward progression and swing initiation during walking," Journal of Biomechanics, vol. 34, pp. 1387-1398, November 2001.

[5] L. H. Ting, H. J. Chiel, R. D. Trumbower, J. L. Allen, J. L. McKay, M. E. Hackney, and T. M. Kesar, "Neuromechanical principles underlying movement modularity and their implications for rehabilitation," vol. 86, no. 1, pp. 38-54, 2016.

[6] M. G. Browne and J. R. Franz, "Does dynamic stability govern propulsive force generation in human walking?," Royal Society Open Science, vol. 4, no. 11, 2017.

[7] F. Bethoux and S. Bennett, "Evaluating Walking in Patients with Multiple Sclerosis," Inter-national Journal of MS Care, vol. 13, pp. 4-14, June 2011.

[8] M. E. Morris, F. Huxham, J. McGinley, K. Dodd, and R. Iansek, "The biomechanics and motor control of gait in Parkinson disease," Clinical Biomechanics, vol. 16, pp. 459-470, July 2001.

[9] C. E. Mahon, D. J. Farris, G. S. Sawicki, and M. D. Lewek, "Individual limb mechanical analysis of gait following stroke," Journal of Biomechanics, vol. 48, pp. 984-989, April 2015.

[10] M. G. Bowden, C. K. Balasubramanian, R. R. Neptune, and S. A. Kautz, "Anterior-Posterior Ground Reaction Forces as a Measure of Paretic Leg Contribution in Hemiparetic Walking," Stroke, vol. 37, pp. 872-876, mar 2006.

[11] Y. P. Ivanenko, G. Cappellini, I. A. Solopova, A. A. Grishin, M. J. MacLellan, R. E. Poppele, and F. Lacquaniti, "Plasticity and modular control of locomotor patterns in neurological disorders with motor deficits," Frontiers in Computational Neuroscience, vol. 7, no. SEP, pp. 1-11, 2013.

[12] J. M. Donelan, R. Kram, and A. D. Kuo, "Mechanical work for step-to-step transitions is a major determinant of the metabolic cost of human walking," Journal of Experimental Biology, vol. 205, no. 23, pp. 3717-3727, 2002.

[13] D. Kuhman and C. P. Hurt, "The timing of locomotor propulsion in healthy adults walking at multiple speeds," Human Movement Science, vol. 68, p. 102524, dec 2019.

[14] K. E. Zelik and P. G. Adamczyk, "A unified perspective on ankle push-off in human walking," The Journal of Experimental Biology, vol. 219, pp. 3676-3683, December 2016.

[15] M. D. Lewek, "The influence of body weight support on ankle mechanics during treadmill walking," Journal of Biomechanics, vol. 44, no. 1, pp. 128-133, 2011.

[16] P. O. Riley, U. D. Croce, and D. Casey Kerrigan, "Propulsive adaptation to changing gait speed," Journal of Biomechanics, vol. 34, pp. 197-202, February 2001.

[17] L. N. Awad, D. S. Reisman, R. T. Pohlig, and S. A. Binder-Macleod, "Reducing the Cost of Transport and Increasing Walking Distance after Stroke," Neurorehabilitation and Neural Repair, vol. 30, no. 7, pp. 661-670, 2016.

[18] S. A. Combs, M. Van Puymbroeck, P. A. Altenburger, K. K. Miller, T. A. Dierks, and A. A. Schmid, "Is walking faster or walking farther more important to persons with chronic stroke?," Disability and Rehabilitation, vol. 35, pp. 860-867, May 2013.

[19] D. Farris, A. Hampton, M. D. Lewek, and G. S. Sawicki, "Revisiting the mechanics and energetics of walking in individuals with chronic hemiparesis following stroke: from individual limbs to lower limb joints," Journal of NeuroEngineering and Rehabilitation, vol. 12, no. 1, p. 24, 2015.

[20] D. S. Reisman, K. S. Rudolph, and W. B. Farquhar, Influence of speed on walking economy poststroke," Neurorehabilitation and Neural Repair, vol. 23, no. 6, pp. 529-534, 2009.

[21] E. J. Benjamin, S. S. Virani, C. W. Callaway, A. M. Chamberlain, A. R. Chang, S. Cheng, S. E. Chiuve, M. Cushman, F. N. Delling, R. Deo, S. D. de Ferranti, J. F. Ferguson, M. Fornage, C. Gillespie, C. R. Isasi, M. C. JimÁ´enez, L. C. Jordan, S. E. Judd, D. Lackland, J. H. Lichtman, L. Lisabeth, S. Liu, C. T. Longenecker, P. L. Lutsey, J. S. Mackey, D. B. Matchar, K. Matsushita, M. E. Mussolino, K. Nasir, M. O'Flaherty, L. P. Palaniappan, A. Pandey, K. Pandey, M. J. Reeves, M. D. Ritchey, C. J. Rodriguez, G. A. Roth, W. D. Rosamond, U. K. Sampson, G. M. Satou, S. H. Shah, N. L. Spartano, D. L. Tirschwell, C. W. Tsao, J. H. Voeks, J. Z. Willey, J. T. Wilkins, J. H. Wu, H. M. Alger, S. S. Wong, and P. Muntner, "Heart Disease and Stroke Statistics-2018 Update: A Report From the American Heart Association," Circulation, vol. 137, mar 2018.

[22] L. N. Awad, S. A. Binder-Macleod, R. T. Pohlig, and D. S. Reisman, "Paretic Propulsion and Trailing Limb Angle Are Key Determinants of Long-Distance Walking Function after Stroke," Neurorehabilitation and Neural Repair, vol. 29, no. 6, pp. 499-508, 2015.

[23] K. Penke, K. Scott, Y. Sinskey, and M. D. Lewek, "Propulsive Forces Applied to the Body's Center of Mass Affect Metabolic Energetics Poststroke," Archives of Physical Medicine and Rehabilitation, vol. 100, pp. 1068-1075, June 2019.

[24] R. W. Bohannon, A. W. Andrews, and M. B. Smith, "Rehabilitation goals of patients with hemiplegia," International Journal of Rehabilitation Research, vol. 11, no. 2, 1988.

[25] G. D. Fulk, Y. He, P. Boyne, and K. Dunning, "Predicting Home and Community Walking Activity Post-stroke," Stroke, vol. 48, pp. 406-411, February 2017.

[26] F. Porciuncula, T. C. Baker, D. Arumukhom Revi, J. Bae, R. Sloutsky, T. D. Ellis, C. J. Walsh, and L. N. Awad, "Targeting Paretic Propulsion and Walking Speed With a Soft Robotic Exosuit: A Consideration-of-Concept Trial," Frontiers in Neurorobotics, vol. 15, no. 689577, pp. 1-13, 2021.

[27] A. Vistamehr, S. A. Kautz, M. G. Bowden, and R. R. Neptune, "Correlations between mea-sures of dynamic balance in individuals with post-stroke hemiparesis," Journal of Biome-chanics, vol. 49, no. 3, pp. 396-400, 2016.

[28] G. Balbinot, C. P. Schuch, H. Bianchi Oliveira, and L. A. Peyré-Tartaruga, "Mechanical and energetic determinants of impaired gait following stroke: segmental work and pendular energy transduction during treadmill walking," Biology Open, vol. 9, p. bio051581, July 2020.

[29] C. K. Balasubramanian, M. G. Bowden, R. R. Neptune, and S. A. Kautz, "Relationship Between Step Length Asymmetry and Walking Performance in Subjects With Chronic Hemi-paresis," Archives of Physical Medicine and Rehabilitation, vol. 88, no. 1, pp. 43-49, 2007.

[30] S. T. Baudendistel, A. C. Schmitt, R. T. Roemmich, I. L. Harrison, and C. J. Hass, "Levodopa facilitates improvements in gait kinetics at the hip, not the ankle, in individuals with Parkinson's disease," Journal of Biomechanics, vol. 121, p. 110366, May 2021.

[31] J. Jonsdottir, T. Lencioni, E. Gervasoni, A. Crippa, D. Anastasi, I. Carpinella, M. Rovaris, D. Cattaneo, and M. Ferrarin, "Improved Gait of Persons With Multiple Sclerosis After Rehabilitation: Effects on Lower Limb Muscle Synergies, Push-Off, and Toe-Clearance," Frontiers in Neurology, vol. 11, July 2020.

[32] L. Filli, T. Sutter, C. S. Easthope, T. Killeen, C. Meyer, K. Reuter, L. LOrincz, M. Bol-liger, M. Weller, A. Curt, D. Straumann, M. Linnebank, and B. Z¨orner, "Profiling walking dysfunction in multiple sclerosis: characterisation, classification and progression over time," Scientific Reports, vol. 8, p. 4984, December 2018.

[33] E. Tolosa, G. Wenning, and W. Poewe, "The diagnosis of Parkinson's disease," The Lancet Neurology, vol. 5, pp. 75-86, January 2006.

[34] C. Confavreux, "Defining the natural history of MS: the need for complete data and rigorous definitions," Multiple Sclerosis Journal, vol. 14, pp. 289-291, April 2008.

[35] M. Martin, M. Shinberg, M. Kuchibhatla, L. Ray, J. J. Carollo, and M. L. Schenkman, "Gait Initiation in Community-Dwelling Adults With Parkinson Disease: Comparison With Older and Younger Adults Without the Disease," Physical Therapy, vol. 82, pp. 566-577, June 2002.

[36] I. Jonkers, S. Delp, and C. Patten, "Capacity to increase walking speed is limited by impaired hip and ankle power generation in lower functioning persons post-stroke," Gait & Posture, vol. 29, pp. 129-137, January 2009.

[37] L. J. Turns, R. R. Neptune, and S. A. Kautz, "Relationships Between Muscle Activity and Anteroposterior Ground Reaction Forces in Hemiparetic Walking," Archives of Phys-ical Medicine and Rehabilitation, vol. 88, pp. 1127-1135, September 2007.

[38] D. M. Peters, Y. Thibaudier, J. E. Deffeyes, G. T. Baer, H. B. Hayes, and R. D. Trumbower, "Constraints on Stance-Phase Force Production during Overground Walking in Persons with Chronic Incomplete Spinal Cord Injury," Journal of Neurotrauma, vol. 35, pp. 467-477, February 2018.

[39] J. R. Franz, M. Maletis, and R. Kram, "Real-time feedback enhances forward propulsion during walking in old adults," Clinical Biomechanics, vol. 29, pp. 68-74, January 2014.

[40] J. R. Franz and R. Kram, "How does age affect leg muscle activity/coactivity during uphill and downhill walking?," Gait & Posture, vol. 37, pp. 378-384, mar 2013.

[41] P. DeVita and T. Hortobagyi, "Age Increases the Skeletal Versus Muscular Component of Lower Extremity Stiffness During Stepping Down," The Journals of Gerontology Series A: Biological Sciences and Medical Sciences, vol. 55, pp. B593-B600, dec 2000.

[42] Y. Laufer, "Effect of Age on Characteristics of Forward and Backward Gait at Preferred and Accelerated Walking Speed," The Journals of Gerontology Series A: Biological Sciences and Medical Sciences, vol. 60, pp. 627-632, May 2005.

[43] S. Brunnstrom, Movement Therapy in Hemiplegia: A Neurophysiological Approach. New York: Medical Dept., Harper & Row, 1970.

[44] L. N. Awad, J. Bae, K. O'Donnell, S. M. M. De Rossi, K. Hendron, L. H. Sloot, P. Kudzia, S. Allen, K. G. Holt, T. D. Ellis, and C. J. Walsh, "A soft robotic exosuit improves walking in patients after stroke," Science Translational Medicine, vol. 9, p. eaai9084, July 2017.

[45] L. N. Awad, D. S. Reisman, T. M. Kesar, and S. A. Binder-Macleod, "Targeting Paretic Propulsion to Improve Poststroke Walking Function: A Preliminary Study," Archives of Physical Medicine and Rehabilitation, vol. 95, pp. 840-848, May 2014.

[46] M. G. Browne and J. R. Franz, "Ankle power biofeedback attenuates the distal-to-proximal redistribution in older adults," Gait & Posture, vol. 71, pp. 44-49, June 2019.

[47] K. Genthe, C. Schenck, S. Eicholtz, L. Zajac-Cox, S. Wolf, and T. M. Kesar, "Effects of real-time gait biofeedback on paretic propulsion and gait biomechanics in individuals post-stroke," Topics in Stroke Rehabilitation, vol. 25, pp. 186-193, April 2018.

[48] T. M. Kesar, R. Perumal, D. S. Reisman, A. Jancosko, K. S. Rudolph, J. S. Higginson, and S. A. Binder-Macleod, "Functional Electrical Stimulation of Ankle Plantarflexor and Dorsiflexor Muscles," Stroke, vol. 40, pp. 3821-3827, December 2009.

[49] E. M. McCain, T. J. M. Dick, T. N. Giest, R. W. Nuckols, M. D. Lewek, K. R. Saul, and G. S. Sawicki, "Mechanics and energetics of post-stroke walking aided by a powered ankle exoskeleton with speed-adaptive myoelectric control," Journal of NeuroEngineering and Rehabilitation, vol. 16, p. 57, December 2019.

[50] C. P. Phadke, "Immediate Effects of a Single Inclined Treadmill Walking Session on Level Ground Walking in Individuals After Stroke," American Journal of Physical Medicine & Rehabilitation, vol. 91, pp. 337-345, April 2012.

[51] K. Z. Takahashi, M. D. Lewek, and G. S. Sawicki, "A neuromechanics-based powered ankle exoskeleton to assist walking post-stroke: a feasibility study," Journal of NeuroEngineering and Rehabilitation, vol. 12, no. 1, p. 23, 2015.

[52] G. P. Williams, A. G. Schache, and M. E. Morris, "Mobility After Traumatic Brain Injury," Journal of Head Trauma Rehabilitation, vol. 28, no. 5, pp. 371-378, 2013.

[53] B. H. Dobkin and A. K. Dorsch, "The Evolution of Personalized Behavioral Intervention Technology," Stroke, vol. 48, pp. 2329-2334, August 2017.

[54] S. R. Steinhubl, E. D. Muse, and E. J. Topol, "The emerging field of mobile health," Science Translational Medicine, vol. 7, pp. 283rv3-283rv3, April 2015.

[55] S. Fritz and M. Lusardi, "White Paper: "Walking Speed: the Sixth Vital Sign"," Journal of Geriatric Physical Therapy, vol. 32, no. 2, pp. 2-5, 2009.

[56] M. Boutaayamou, C. Schwartz, J. Stamatakis, and V. Denöel, "Development and validation of an accelerometer-based method for quantifying gait events," pp. 1-8, 2015.

[57] N. Chia Bejarano, E. Ambrosini, A. Pedrocchi, G. Ferrigno, M. Monticone, and S. Ferrante, "A Novel Adaptive, Real-Time Algorithm to Detect Gait Events From Wearable Sensors," IEEE Transactions on Neural Systems and Rehabilitation Engineering, vol. 23, pp. 413-422, May 2015.

[58] T. Miyazaki, M. Kawada, Y. Nakai, R. Kiyama, and K. Yone, "Validity of Measurement for Trailing Limb Angle and Propulsion Force during Gait Using a Magnetic Inertial Measurement Unit," BioMed Research International, vol. 2019, pp. 1-8, December 2019.

[59] A. Peruzzi, U. Della Croce, and A. Cereatti, "Estimation of stride length in level walking using an inertial measurement unit attached to the foot: A validation of the zero velocity assumption during stance," Journal of Biomechanics, vol. 44, pp. 1991-1994, July 2011.

[60] T. Seel, J. Raisch, and T. Schauer, "IMU-Based Joint Angle Measurement for Gait Analysis," Sensors, vol. 14, pp. 6891-6909, April 2014.

[61] S. Yang, J.-T. Zhang, A. C. Novak, B. Brouwer, and Q. Li, "Estimation of spatio-temporal parameters for post-stroke hemiparetic gait using inertial sensors," Gait & Posture, vol. 37, pp. 354-358, mar 2013.

[62] A. Karatsidis, M. Jung, H. M. Schepers, G. Bellusci, M. de Zee, P. H. Veltink, and M. S. Andersen, "Musculoskeletal model-based inverse dynamic analysis under ambulatory conditions using inertial motion capture," Medical Engineering & Physics, vol. 65, pp. 68-77, mar 2019.

[63] Lim, Kim, and Park, "Prediction of Lower Limb Kinetics and Kinematics during Walking by a Single IMU on the Lower Back Using Machine Learning," Sensors, vol. 20, p. 130, December 2019.

[64] H. X. Ryu and S. Park, "Estimation of unmeasured ground reaction force data based on the oscillatory characteristics of the center of mass during human walking," Journal of Biomechanics, vol. 71, pp. 135-143, April 2018.

[65] E. Shahabpoor and A. Pavic, "Estimation of vertical walking ground reaction force in real-life environments using single IMU sensor," Journal of Biomechanics, vol. 79, pp. 181-190, October 2018.

[66] S. Chen, J. Lach, B. Lo, and G. Z. Yang, "Toward Pervasive Gait Analysis With Wearable Sensors: A Systematic Review," IEEE Journal of Biomedical and Health Informatics, vol. 20, no. 6, pp. 1521-1537, 2016.

[67] P. Arens, C. Siviy, J. Bae, D. K. Choe, N. Karavas, T. C. Baker, T. D. Ellis, L. N. Awad, and C. J. Walsh, "Real-time Gait Metric Estimation for Everyday Gait Training With Wearable Devices in People Post-stroke Philipp," Wearable Technologies, pp. 1-14, 2020.

[68] A. Ancillao, S. Tedesco, J. Barton, and B. O'Flynn, "Indirect Measurement of Ground Re-action Forces and Moments by Means of Wearable Inertial Sensors: A Systematic Review," Sensors, vol. 18, p. 2564, August 2018.

[69] S. A. Moore, A. Hickey, S. Lord, S. Del Din, A. Godfrey, and L. Rochester, "Comprehensive measurement of stroke gait characteristics with a single accelerometer in the laboratory and community: a feasibility,

[70] S. L. Chiu and L. S. Chou, "Variability in inter-joint coordination during walking of elderly adults and its association with clinical balance measures," Clinical Biomechanics, vol. 28, no. 4, pp. 454-458, 2013.

[71] D. Quintero, D. J. Lambert, D. J. Villarreal, and R. D. Gregg, "Real-Time continuous gait phase and speed estimation from a single sensor," in 2017 IEEE Conference on Control Technology and Applications (CCTA), vol. 2017-Janua, pp. 847-852, IEEE, August 2017.

[72] D. Quintero, D. J. Villarreal, D. J. Lambert, S. Kapp, and R. D. Gregg, "Continuous-Phase Control of a Powered Knee-Ankle Prosthesis: Amputee Experiments Across Speeds and Inclines," IEEE Transactions on Robotics, vol. 34, pp. 686-701, June 2018.

[73] D. Arumukhom Revi, S. M. M. De Rossi, C. J. Walsh, and L. N. Awad, "Estimation of Walking Speed and Its Spatiotemporal Determinants Using a Single Inertial Sensor Worn on the Thigh: From Healthy to Hemiparetic Walking," Sensors, vol. 21, no. 21, p. 6976, 2021.

[74] L. N. Awad, M. D. Lewek, T. M. Kesar, J. R. Franz, and M. G. Bowden, "These legs were made for propulsion: advancing the diagnosis and treatment of post-stroke propulsion deficits," Journal of NeuroEngineering and Rehabilitation, vol. 17, p. 139, December 2020.

[75] K. Hutchinson, R. Sloutsky, A. Collimore, B. Adams, B. Harris, T. D. Ellis, and L. N. Awad, "A Music-Based Digital Therapeutic: Proof-of-Concept Automation of a Progressive and Individualized Rhythm-Based Walking Training Program After Stroke," Neurorehabilitation and Neural Repair, vol. 34, pp. 986-996, November 2020.

[76] J. Bae, S. M. M. De Rossi, K. O'Donnell, K. L. Hendron, L. N. Awad, T. R. T. Dos Santos, V. L. De Araujo, Y. Ding, K. G. Holt, T. D. Ellis, et al., "A soft exosuit for patients with stroke: Feasibility study with a mobile off-board actuation unit," in 2015 IEEE International Conference on Rehabilitation Robotics (ICORR), pp. 131-138, IEEE, 2015.

[77] J. Bae, C. Siviy, M. Rouleau, N. Menard, K. O. Donnell, M. Athanassiu, D. Ryan, C. Bibeau, L. Sloot, P. Kudzia, T. Ellis, L. Awad, and C. J. Walsh, "A lightweight and efficient portable soft exosuit for paretic ankle assistance in walking after stroke," pp. 2820-2827, 2018.

[78] L. N. Awad, J. Bae, P. Kudzia, A. Long, K. Hendron, K. G. Holt, K. ODonnell, T. D. Ellis, and C. J. Walsh, "Reducing Circumduction and Hip Hiking During Hemiparetic Walking Through Targeted Assistance of the Paretic Limb Using a Soft Robotic Exosuit," American journal of physical medicine rehabilitation, vol. 96, no. 10, pp. S157-S164, 2017.

[79] L. N. Awad, P. Kudzia, D. Arumukhom Revi, T. D. Ellis, and C. J. Walsh, "Walking Faster and Farther With a Soft Robotic Exosuit: Implications for Post-Stroke Gait Assistance and Rehabilitation," IEEE Open Journal of Engineering in Medicine and Biology, vol. 1, pp. 108-115, 2020.

[80] J. Bae, L. N. Awad, A. Long, K. O'Donnell, K. Hendron, K. G. Holt, T. D. Ellis, and C. J. Walsh, "Biomechanical mechanisms underlying exosuit-induced improvements in walking economy after stroke," Journal of Experimental Biology, vol. 221, no. 5, 2018.

[81] S. Rossignol and G. Jones, "Audio-spinal influence in man studied by the H-reflex and its possible role on rhythmic movements synchronized to sound," Electroencephalography and Clinical Neurophysiology, vol. 41, pp. 83-92, July 1976.

[82] J. H. Suh, S. J. Han, S. Y. Jeon, H. J. Kim, J. E. Lee, T. S. Yoon, and H. J. Chong, "Effect of rhythmic auditory stimulation on gait and balance in hemiplegic stroke patients," NeuroRehabilitation, vol. 34, pp. 193-199, February 2014.

[83] A. A. Bukowska, P. Kr‚e˙za lek, E. Mirek, P. Bujas, and A. Marchewka, "Neurologic Music Therapy Training for Mobility and Stability Rehabilitation with Parkinson's Disease—A Pilot Study," Frontiers in Human Neuroscience, vol. 9, January 2016.

[84] D. Conklyn, D. Stough, E. Novak, S. Paczak, K. Chemali, and F. Bethoux, "A Home-Based Walking Program Using Rhythmic Auditory Stimulation Improves Gait Performance in Patients With Multiple Sclerosis: A Pilot Study," Neurorehabilitation and Neural Repair, vol. 24, pp. 835-842, November 2010.

[85] S. J. Kim, E. E. Kwak, E. S. Park, and S.-R. Cho, "Differential effects of rhythmic auditory stimulation and neurodevelopmental treatment/Bobath on gait patterns in adults with cere-bral palsy: a randomized controlled trial," Clinical Rehabilitation, vol. 26, pp. 904-914, October 2012.

[86] D. A. Winter, Biomechanics and Motor control of Human Movement. 2009.

[87] Bertec Corporation, "Bertec Force plates," tech. rep., Bertec Corporation, Columbus, Ohio, USA, 2012.

[88] Q. Li, M. Young, V. Naing, and J. M. Donelan, "Walking speed estimation using a shank-mounted inertial measurement unit," Journal of Biomechanics, vol. 43, no. 8, pp. 1640-1643, 2010.

[89] D. Arumukhom Revi, A. M. Alvarez, C. J. Walsh, S. M. De Rossi, and L. N. Awad, "Indirect measurement of anterior-posterior ground reaction forces using a minimal set of wearable inertial sensors: from healthy to hemiparetic walking," Journal of NeuroEngineering and Rehabilitation, vol. 17, no. 1, p. 82, 2020.

[90] S. M. White, T. R. W'ojcicki, and E. McAuley, "Physical activity and quality of life in community dwelling older adults," Health and Quality of Life Outcomes, vol. 7, p. 10, December 2009.

[91] K. Kim, Y. M. Kim, and E. K. Kim, "Correlation between the Activities of Daily Living of Stroke Patients in a Community Setting and Their Quality of Life," Journal of Physical Therapy Science, vol. 26, no. 3, pp. 417-419, 2014.

[92] A. Schinkel-Ivy, E. L. Inness, and A. Mansfield, "Relationships between fear of falling, balance confidence, and control of balance, gait, and reactive stepping in individuals with sub-acute stroke," Gait and Posture, vol. 43, pp. 154-159, 2016.

[93] A. Schinkel-Ivy, J. S. Wong, and A. Mansfield, "Balance Confidence Is Related to Features of Balance and Gait in Individuals with Chronic Stroke," Journal of Stroke and Cerebrovascular Diseases, vol. 26, no. 2, pp. 237-245, 2017.

[94] S.-J. Lin, K. D. Winston, J. Mitchell, J. Girlinghouse, and K. Crochet, "Physical activity, functional capacity, and step variability during walking in people with lower-limb amputation," Gait Posture, vol. 40, pp. 140-144, May 2014.

[95] L. A. Zukowski, J. A. Feld, C. A. Giuliani, and P. Plummer, "Relationships between gait variability and ambulatory activity post stroke," Topics in Stroke Rehabilitation, vol. 26, pp. 255-260, May 2019.

[96] A. Mansfield, J. Wong, W. McIlroy, L. Biasin, K. Brunton, M. Bayley, and E. Inness, "Do measures of reactive balance control predict falls in people with stroke returning to the community?," Physiotherapy, vol. 101, pp. 373-380, December 2015.

[97] J. L. Moore, K. Potter, K. Blankshain, S. L. Kaplan, L. C. O'Dwyer, and J. E. Sullivan, "A Core Set of Outcome Measures for Adults With Neurologic Conditions Undergoing Rehabilitation," Journal of Neurologic Physical Therapy, vol. 42, pp. 174-220, July 2018.

[98] G. D. Fulk, C. Reynolds, S. Mondal, and J. E. Deutsch, "Predicting Home and Community Walking Activity in People With Stroke," Archives of Physical Medicine and Rehabilitation, vol. 91, pp. 1582-1586, October 2010.

[99] P. S. Pohl, P. W. Duncan, S. Perera, W. Liu, S. M. Lai, S. Studenski, and J. Long, "Influence of stroke-related impairments on performance in 6-minute walk test," Journal of Rehabilitation Research and Development, vol. 39, no. 4, pp. 439-444, 2002.

[100] M. Schenkman, T. M. Cutson, M. Kuchibhatla, J. Chandler, and C. Pieper, "Reliability of impairment and physical performance measures for persons with parkinson's disease," Physical therapy, vol. 77, no. 1, pp. 19-27, 1997.

[101] M. J. Falvo and G. M. Earhart, "Six-minute walk distance in persons with parkinson disease: A hierarchical regression model," Archives of Physical Medicine and Rehabilitation, vol. 90, no. 6, pp. 1004-1008, 2009.

[102] M. D. Goldman, R. A. Marrie, and J. A. Cohen, "Evaluation of the six-minute walk in multiple sclerosis subjects and healthy controls," Multiple Sclerosis Journal, vol. 14, pp. 383-390, April 2008.

[103] L. Awad, D. Reisman, and S. Binder-Macleod, "Distance-Induced Changes in Walking Speed after Stroke: Relationship to Community Walking Activity," Journal of Neurologic Physical Therapy, vol. 43, pp. 220-223, October 2019.

[104] H. Thieme, C. Ritschel, and C. Zange, "Reliability and Validity of the Functional Gait Assessment (German Version) in Subacute Stroke Patients," Archives of Physical Medicine and Rehabilitation, vol. 90, pp. 1565-1570, September 2009.

[105] A. L. Leddy, B. E. Crowner, and G. M. Earhart, "Functional Gait Assessment and Balance Evaluation System Test: Reliability, Validity, Sensitivity, and Specificity for Identifying Individuals With Parkinson Disease Who Fall," Physical Therapy, vol. 91, pp. 102-113, January 2011.

[106] A. Forsberg, M. Andreasson, and Y. Nilsagird, "The Functional Gait Assessment in People with Multiple Sclerosis," International Journal of MS Care, vol. 19, pp. 66-72, mar 2017.

[107] A. Andersson, K. Kamwendo, A. Seiger, and P. Appelros, "HOW TO IDENTIFY POTENTIAL FALLERS IN A STROKE UNIT: VALIDITY INDEXES OF 4 TEST METHODS," Journal of Rehabilitation Medicine, vol. 38, pp. 186-191, May 2006.

[108] J. R. Nocera, E. L. Stegemoller, I. A. Malaty, M. S. Okun, M. Marsiske, and C. J. Hass, "Using the Timed Up Go Test in a Clinical Setting to Predict Falling in Parkinson's Disease," Archives of Physical Medicine and Rehabilitation, vol. 94, pp. 1300-1305, July 2013.

[109] D. J. Gladstone, C. J. Danells, and S. E. Black, "The Fugl-Meyer Assessment of Motor Recovery after Stroke: A Critical Review of Its Measurement Properties," Neurorehabilitation and Neural Repair, vol. 16, pp. 232-240, September 2002.

[110] C. G. Goetz, B. C. Tilley, S. R. Shaftman, G. T. Stebbins, S. Fahn, P. Martinez-Martin, W. Poewe, C. Sampaio, M. B. Stern, R. Dodel, B. Dubois, R. Holloway, J. Jankovic, J. Kuli-sevsky, A. E. Lang, A. Lees, S. Leurgans, P. A. LeWitt, D. Nyenhuis, C. W. Olanow, O. Rascol, A. Schrag, J. A. Teresi, J. J. van Hilten, and N. LaPelle, "Movement Disorder Society-sponsored revision of the Unified Parkinson's Disease Rating Scale (MDS-UPDRS): Scale presentation and clinimetric testing results," Movement Disorders, vol. 23, pp. 2129-2170, November 2008.

[111] M. Godi, F. Franchignoni, M. Caligari, A. Giordano, A. M. Turcato, and A. Nardone, "Comparison of Reliability, Validity, and Responsiveness of the Mini-BESTest and Berg Balance Scale in Patients With Balance Disorders," Physical Therapy, vol. 93, pp. 158-167, feb 2013.

[112] F. Franchignoni, F. Horak, M. Godi, A. Nardone, and A. Giordano, "Using psychometric techniques to improve the Balance Evaluation Systems Test: the mini-BESTest," Journal of Rehabilitation Medicine, vol. 42, no. 4, pp. 323-331, 2010.

[113] P. J. Papagelopoulos and F. H. Sim, "Limited Range of Motion After Total Knee Arthroplasty: Etiology, Treatment, and Prognosis," Orthopedics, vol. 20, pp. 1061-1065, November 1997.

[114] H. C. Amstutz, R. M. Lodwig, D. J. Schurman, and A. G. Hodgson, "Range of motion studies for total hip replacements. A comparative study with a new experimental apparatus," Clinical Orthopaedics and Related Research, vol. No. 111, pp. 124-130, 1975.

[115] I. A. Kramert De Quervain, S. R. Simon, S. Leurgans, W. S. Pease, and D. McAllister, "Gait Pattern in the Early Recovery Period after Stroke*," The Journal of Bone Joint Surgery, vol. 78, pp. 1506-14, October 1996.

[116] F. Porciuncula, A. V. Roto, D. Kumar, I. Davis, S. Roy, C. J. Walsh, and L. N. Awad, "Wearable Movement Sensors for Rehabilitation: A Focused Review of Technological and Clinical Advances," PMR, vol. 10, pp. S220-S232, September 2018.

[117] J. Kim, G. Lee, R. Heimgartner, D. Arumukhom Revi, N. Karavas, D. Nathanson, I. Galiana, A. Eckert-Erdheim, P. Murphy, D. Perry, N. Menard, D. K. Choe, P. Malcolm, and C. J. Walsh, "Reducing the metabolic rate of walking and running with a versatile, portable exo-suit," Science, vol. 365, no. 6454, pp. 668-672, 2019.

[118] A. Laudanski, S. Yang, and Q. Li, "A concurrent comparison of inertia sensor-based walking speed estimation methods," Proceedings of the Annual International Conference of the IEEE Engineering in Medicine and Biology Society, EMBS, pp. 3484-3487, 2011.

[119] M. A. Daley, G. Felix, and A. A. Biewener, "Running stability is enhanced by a proximo-distal gradient in joint neuromechanical control," Journal of Experimental Biology, vol. 210, pp. 383-394, February 2007.

[120] D. J. Villarreal, H. A. Poonawala, and R. D. Gregg, "A Robust Parameterization of Human Gait Patterns Across Phase-Shifting Perturbations," IEEE Transactions on Neural Systems and Rehabilitation Engineering, vol. 25, pp. 265-278, mar 2017.

[121] J. M. Hausdorff, J. Balash, and N. Giladi, "Effects of Cognitive Challenge on Gait Variability in Patients with Parkinson's Disease," Journal of Geriatric Psychiatry and Neurology, vol. 16, pp. 53-58, mar 2003.

[122] C. Fricke, J. Alizadeh, N. Zakhary, T. B. Woost, M. Bogdan, and J. Classen, "Evaluation of Three Machine Learning Algorithms for the Automatic Classification of EMG Patterns in Gait Disorders," Frontiers in Neurology, vol. 12, May 2021.

[123] C. G. Goetz, W. Poewe, O. Rascol, C. Sampaio, G. T. Stebbins, C. Counsell, N. Giladi, R. G. Holloway, C. G.

Moore, G. K. Wenning, M. D. Yahr, and L. Seidl, "Movement Disorder Society Task Force report on the Hoehn and Yahr staging scale: Status and recommendations The Movement Disorder Society Task Force on rating scales for Parkinson's disease," Movement Disorders, vol. 19, pp. 1020-1028, September 2004.

[124] F. D. Lublin, S. C. Reingold, J. A. Cohen, G. R. Cutter, P. S. Sorensen, A. J. Thompson, J. S. Wolinsky, L. J. Balcer, B. Banwell, F. Barkhof, B. Bebo, P. A. Calabresi, M. Clanet, G. Comi, R. J. Fox, M. S. Freedman, A. D. Goodman, M. Inglese, L. Kappos, B. C. Kieseier, J. A. Lincoln, C. Lubetzki, A. E. Miller, X. Montalban, P. W. O'Connor, J. Petkau, C. Pozzilli, R. A. Rudick, M. P. Sormani, O. Stuve, E. Waubant, and C. H. Polman, "Defining the clinical course of multiple sclerosis: The 2013 revisions," Neurology, vol. 83, pp. 278-286, July 2014.

[125] W. I. McDonald, A. Compston, G. Edan, D. Goodkin, H.-P. Hartung, F. D. Lublin, H. F. McFarland, D. W. Paty, C. H. Polman, S. C. Reingold, M. Sandberg-Wollheim, W. Sibley, A. Thompson, S. Van Den Noort, B. Y. Weinshenker, and J. S. Wolinsky, "Recommended diagnostic criteria for multiple sclerosis: Guidelines from the international panel on the diagnosis of multiple sclerosis," Annals of Neurology, vol. 50, pp. 121-127, July 2001.

[126] B. Harris and L. Awad, "Automating a Progressive and Individualized Rhythm-based Walking Training Program After Stroke: Feasibility of a Music-based Digital Therapeutic," Archives of Physical Medicine and Rehabilitation, vol. 101, p. e30, November 2020.

[127] A. Tang, J. J. Eng, and D. Rand, "Relationship between perceived and measured changes in walking after stroke," Journal of Neurologic Physical Therapy, vol. 36, no. 3, pp. 115-121, 2012.

[128] M. A. Guadagnoli and T. D. Lee, "Challenge Point: A Framework for Conceptualizing the Effects of Various Practice Conditions in Motor Learning," Journal of Motor Behavior, vol. 36, pp. 212-224, July 2004.

[129] J. A. Kleim and T. A. Jones, "Principles of Experience-Dependent Neural Plasticity: Implications for Rehabilitation After Brain Damage," Journal of Speech, Language, and Hearing Research, vol. 51, February 2008.

[130] G. Morone, S. Paolucci, A. Cherubini, D. De Angelis, V. Venturiero, P. Coiro, and M. Iosa, "Robot-assisted gait training for stroke patients: current state of the art and perspectives of robotics," Neuropsychiatric Disease and Treatment, vol. Volume 13, pp. 1303-1311, May 2017.

[131] W. H. Organization, "World Health Organization, Geneva," tech. rep., World Health Organization, Geneva, 2001.

[132] N. Kaushal and R. E. Rhodes, "Exercise habit formation in new gym members: a longitudinal study," Journal of Behavioral Medicine, vol. 38, pp. 652-663, August 2015.

[133] P. E. Shrout and N. Bolger, "Mediation in experimental and nonexperimental studies: new procedures and recommendations.," Psychological methods, vol. 7, pp. 422-445, December 2002.

[134] M. H. Thaut, G. C. McIntosh, and V. Hoemberg, "Neurobiological foundations of neurologic music therapy: rhythmic entrainment and the motor system," Front. Psychol., vol. 5, February 2015.

[135], T. M. Kesar, R. Perumal, D. S. Reisman, A. Jancosko, K. S. Rudolph, J. S. Higginson, & S. A. Binder-Macleod. "Functional Electrical Stimulation of Ankle Plantarflexor and Dorsiflexor Muscles". Stroke, 40(12), 3821-3827 (2009).

[136] F. Porciuncula, D. Arumukhom Revi, T. C. Baker, et al. "Effects of high-intensity gait training with and without soft robotic exosuits in people post-stroke: a development-of-concept pilot crossover trial." J NeuroEngineering Rehabil 20, 148 (2023).

[137] A. N. Collimore et al., "Autonomous Control of Music to Retrain Walking After Stroke," Neurorehabil. Neural Repair, vol. 37, no. 5, pp. 255-265, May 2023.

[138] B. T. Quinlivan et al., "Assistance magnitude versus metabolic cost reductions for a tethered multiarticular soft exosuit," Sci. Robot., vol. 2, no. 2, January 2017.

[139] J. Zhang et al., "Human-in-the-loop optimization of exoskeleton assistance during walking," Science (80)., vol. 356, no. 6344, pp. 1280-1284, June 2017.

[140] G. S. Sawicki, C. L. Lewis, and D. P. Ferris, "It Pays to Have a Spring in Your Step," Exerc. Sport Sci. Rev., vol. 37, no. 3, pp. 130-138, July 2009.

[141] L. N. Awad et al., "Efficacy and safety of using auditory-motor entrainment to improve walking after stroke: a multi-site randomized controlled trial of InTandem™," Nat. Commun., vol. 15, no. 1, p. 1081, February 2024.

[142] J. A. Zajac et al., "Feasibility and Proof-of-Concept of Delivering an Autonomous Music-Based Digital Walking Intervention to Persons with Parkinson's Disease in a Naturalistic Setting," J. Parkinsons. Dis., vol. 13, no. 7, pp. 1253-1265, November 2023.

[143] B. Francois, et al. "Safety and acceptability of closed-loop rhythmic cueing for gait training in persons with multiple sclerosis: a pilot single-blind randomized controlled trial." MULTIPLE SCLEROSIS JOURNAL. Vol. 29. SAGE PUBLICATIONS LTD, 2023.

A1. Tsao, C. W. et al. Heart Disease and Stroke Statistics—2022 Update: A Report From the American Heart Association. Circulation 145, DOI: 10.1161/CIR.0000000000001052 (2022).

A2. Dorsey, E. R. et al. Global, regional, and national burden of Parkinson's disease, 1990-2016: a systematic analysis for the Global Burden of Disease Study 2016. The Lancet Neurol. 17, 939-953, DOI: 10.1016/S1474-4422(18) 30295-3 (2018).

A3. Chen, S., Lach, J., Lo, B. & Yang, G. Z. Toward Pervasive Gait Analysis With Wearable Sensors: A Systematic Review. IEEE J. Biomed. Heal. Informatics 20, 1521-1537, DOI: 10.1109/JBHI.2016.2608720 (2016).

A4. Barker, S., Craik, R., Freedman, W., Herrmann, N. & Hillstrom, H. Accuracy, reliability, and validity of a spatiotemporal gait analysis system. Med. Eng. Phys. 28, 460-467, DOI: 10.1016/j.medengphy.2005.07.017 (2006).

A5. Middleton, A., Fritz, S. L. & Lusardi, M. Walking speed: The functional vital sign. J. Aging Phys. Activity 23, 314-322, DOI: 10.1123/japa.2013-0236 (2015).

A6. Simon, S. R. Quantification of human motion: gait analysis—benefits and limitations to its application to clinical problems. J. Biomech. 37, 1869-1880, DOI: 10.1016/j.jbiomech.2004.02.047 (2004).

A7. Saleh, M. & Murdoch, G. In defence of gait analysis. Observation and measurement in gait assessment. The J. Bone Jt. Surgery. Br. volume 67-B, 237-241, DOI: 10.1302/0301-620X.67B2.3980533 (1985).

A8. Vilas-Boas, M. d. C. & Cunha, J. P. S. Movement Quantification in Neurological Diseases: Methods and Applications. *IEEE Rev. Biomed. Eng.* 9, 15-31, DOI: 10.1109/RBME.2016.2543683 (2016).

A9. Toro, B., Nester, C. J. & Farren, P. C. The status of gait assessment among physiotherapists in the United Kingdom. *Arch. Phys. Medicine Rehabil.* 84, 1878-1884, DOI: 10.1016/S0003-9993(03)00482-9 (2003).

A10. Porciuncula, F. et al. Wearable Movement Sensors for Rehabilitation: A Focused Review of Technological and Clinical Advances. *PMR* 10, DOI: 10.1016/j.pmrj.2018.06.013 (2018).

A11. Yang, S. & Li, Q. Inertial sensor-based methods in walking speed estimation: A systematic review. *Sensors (Switzerland)* 12, 6102-6116, DOI: 10.3390/s120506102 (2012).

A12. Kirk, C. et al. Mobilise-D insights to estimate real-world walking speed in multiple conditions with a wearable device. *Sci. Reports* 14, 1754, DOI: 10.1038/s41598-024-51766-5 (2024).

A13. Griffiths, I. Principles of Biomechanics & Motion Analysis (Lippincott Williams & Wilkins, 2006).

A14. Winter, D. A. Biomechanics and Motor control of Human Movement (2009).

A15. Romijnders, R. et al. Validation of IMU-based gait event detection during curved walking and turning in older adults and Parkinson's Disease patients. *J. NeuroEngineering Rehabil.* 18, 28, DOI: 10.1186/s12984-021-00828-0 (2021).

A16. Li, Q., Young, M., Naing, V. & Donelan, J. M. Walking speed estimation using a shank-mounted inertial measurement unit. *J. Biomech.* 43, 1640-1643, DOI: 10.1016/j.jbiomech.2010.01.031 (2010).

A17. Miyazaki, S. Long-term unrestrained measurement of stride length and walking velocity utilizing a piezoelectric gyroscope. *IEEE Transactions on Biomed. Eng.* 44, 753-759, DOI: 10.1109/10.605434 (1997).

A18. Soltani, A., Dejnabadi, H., Savary, M. & Aminian, K. Real-World Gait Speed Estimation Using Wrist Sensor: A Personalized Approach. *IEEE J. Biomed. Heal. Informatics* 24, 658-668, DOI: 10.1109/JBHI.2019.2914940 (2020).

A19. Chen, S. et al. Aiding diagnosis of normal pressure hydrocephalus with enhanced gait feature separability. In *Proceedings of the conference on Wireless Health,* 1-8, DOI: 10.1145/2448096.2448099 (ACM, New York, NY, USA, 2012).

A20. Arens, P. et al. Real-time Gait Metric Estimation for Everyday Gait Training With Wearable Devices in People Poststroke *Wearable Technol.* 1-14, DOI: 10.1017/wtc.2020.11 (2020).

A21. MejiaCruz, Y. et al. Walking Speed Measurement Technology: a Review. *Curr. Geriatr. Reports* 10, 32-41, DOI:10.1007/s13670-020-00349-z (2021).

A22. Laudanski, A., Yang, S. & Li, Q. A concurrent comparison of inertia sensor-based walking speed estimation methods. *Proc. Annu. Int. Conf. IEEE Eng. Medicine Biol. Soc.* EMBS 3484-3487, DOI: 10.1109/IEMBS.2011.6090941 (2011).

A23. Arumukhom Revi, D., De Rossi, S. M. M., Walsh, C. J. & Awad, L. N. Estimation of Walking Speed and Its Spatiotemporal Determinants Using a Single Inertial Sensor Worn on the Thigh: From Healthy to Hemiparetic Walking. *Sensors* 21, 6976, DOI: 10.3390/s21216976 (2021).

A24. Williams, A. J., Peterson, D. S. & Earhart, G. M. Gait coordination in Parkinson disease: Effects of step length and cadence manipulations. *Gait Posture* 38, 340-344, DOI: 10.1016/j.gaitpost.2012.12.009 (2013).

A25. Von Schroeder, H. P., Coutts, R. D., Lyden, P. D., Billings, E. & Nickel, V. L. Gait parameters following stroke: a practical assessment. *J. rehabilitation research development* 32, 25-25 (1995).

A26. Awad, L., Reisman, D. & Binder-Macleod, S. Distance-Induced Changes in Walking Speed after Stroke: Relationship to Community Walking Activity. *J. Neurol. Phys. Ther.* 43, 220-223, DOI: 10.1097/NPT.0000000000000293 (2019).

A27. Engelhard, M. M., Dandu, S. R., Patek, S. D., Lach, J. C. & Goldman, M. D. Quantifying six-minute walk induced gait deterioration with inertial sensors in multiple sclerosis subjects. *Gait Posture* 49, 340-345, DOI: 10.1016/j.gaitpost.2016.07.184 (2016).

A28. Sibley, K. M., Tang, A., Patterson, K. K., Brooks, D. & McIlroy, W. E. Changes in spatiotemporal gait variables over time during a test of functional capacity after stroke. *J. NeuroEngineering Rehabil.* 6, 27, DOI: 10.1186/1743-0003-6-27 (2009).

A29. Escudero-Uribe, S., Hochsprung, A. & Izquierdo-Ayuso, G. Gait pattern changes after six-minute walk test in persons with multiple sclerosis. *Physiother. Res. Int.* 24, DOI: 10.1002/pri.1741 (2019).

A30. Lexell, J., Flansbjer, U.-B., Holmback, A. M., Downham, D. & Patten, C. reliability of gait performance tests in men and women with hemiparesis after stroke. *J. Rehabil. Medicine* 37, 75-82, DOI:10.1080/16501970410017215 (2005).

A31. Fulk, G. D., Reynolds, C., Mondal, S. & Deutsch, J. E. Predicting Home and Community Walking Activity in People With Stroke. *Arch. Phys. Medicine Rehabil.* 91, 1582-1586, DOI: 10.1016/j.apmr.2010.07.005 (2010).

A32. Middleton, A., Braun, C. H., Lewek, M. D. & Fritz, S. L. Balance impairment limits ability to increase walking speed in individuals with chronic stroke. *Disabil. Rehabil.* 39, 497-502, DOI: 10.3109/09638288.2016.1152603 (2017).

A33. Farris, D., Hampton, A., Lewek, M. D. & Sawicki, G. S. Revisiting the mechanics and energetics of walking in individuals with chronic hemiparesis following stroke: from individual limbs to lower limb joints. *J. NeuroEngineering Rehabil.* 12,24, DOI: 10.1186/s12984-015-0012-x (2015).

A34. Soumard, A., Tavernier, B., Alpdrovitch, A., Tzourio, C. & Elbaz, A. A cross-sectional and longitudinal study of the relationship between walking speed and cognitive function in community-dwelling elderly people. *Journals Gerontol. —Ser. A Biol. Sci. Med. Sci.* 64, 1058-1065, DOI: 10.1093/gerona/glp077 (2009).

A35. Skillbäck, T. et al. Slowing gait speed precedes cognitive decline by several years. *Alzheimer's Dementia* 18, 1667-1676, DOI: 10.1002/alz.12537 (2022).

A36. Grau-Pellicer, M., Chamarro-Lusar, A., Medina-Casanovas, J. & Serdà Ferrer, B.-C. Walking speed as a predictor of community mobility and quality of life after stroke. *Top. Stroke Rehabil.* 26, 349-358, DOI: 10.1080/10749357.2019. U.S. Pat. No. 1,605,751 (2019).

A37. Scalzo, P. L., Flores, C. R., Marques, J. R., Robini, S. C. d. O. & Teixeira, A. L. Impact of changes in balance and walking capacity on the quality of life in patients with Parkinson's disease. *Arquivos de Neuro-Psiquiatria* 70, 119-124, DOI:10.1590/50004-282X2012000200009 (2012).

A38. Nanhoe-Mahabier, W. et al. Walking patterns in Parkinson's disease with and without freezing of gait. *Neuroscience* 182, 217-224, DOI: 10.1016/j.neuroscience.2011.02.061 (2011).

A39. Morris, M., Iansek, R., Matyas, T. & Summers, J. Abnormalities in the stride length-cadence relation in parkinsonian gait. *Mov. Disord.* 13, 61-69, DOI: 10.1002/mds.870130115 (1998).

A40. Leone, C. et al. Prevalence of Walking-Related Motor Fatigue in Persons With Multiple Sclerosis. *Neurorehabilitation Neural Repair* 30, 373-383, DOI: 10.1177/1545968315597070 (2016).

A41. Crapo, R. O. et al. ATS statement: Guidelines for the six-minute walk test. *J. Respir. Critical Care Medicine* 166, 111-117, DOI: 10.1164/ajrccm.166.1.at1102 (2002).

A42. Koo, T. K. & Li, M. Y. A Guideline of Selecting and Reporting Intraclass Correlation Coefficients for Reliability Research. *J. Chiropr. Medicine* 15, 155-163, DOI: 10.1016/j.jcm.2016.02.012 (2016).

A43. McGraw, K. O. & Wong, S. P. "Forming inferences about some intraclass correlations coefficients" *Psychol. Methods* 1, 390-390, DOI: 10.1037/1082-989X.1.4.390 (1996).

What is claimed is:

1. A method of phenotype-guided movement assessment, comprising:
    receiving movement data associated with a subject, the movement data collected during repetitive movement of the subject, the repetitive movement comprising ambulation including at least one stride;
    generating a phase portrait defining a substantially circular orbit based on the movement data associated with the at least one stride;
    calculating a phase portrait metric of a characteristic of the phase portrait, wherein calculating the phase portrait metric comprises calculating an amplitude for each stride of the repetitive movement based on an average polar radius of the substantially circular orbit of the phase portrait for each stride, and calculating an average amplitude for the repetitive movement based on the amplitude of each stride;
    assigning the subject to a movement phenotype based on the phase portrait metric;
    guiding application of a treatment to the subject based on the assigned movement phenotype, wherein the treatment comprises applying gait training to the subject with an assigned movement phenotype based on the average amplitude for the repetitive movement; and
    applying the treatment to the subject based on the assigned movement phenotype, the treatment comprising applying the gait training using at least one of a robotic exosuit, a neuroprosthesis, or a Rhythmic Auditory Stimulation (RAS) device.

2. The method of claim 1, wherein the movement data is received from an inertial measurement unit.

3. The method of claim 2, wherein the inertial measurement unit is positioned at a thigh of the subject.

4. The method of claim 1, wherein calculating the phase portrait metric comprises:
    calculating a minimum polar radius of the phase portrait for each stride of the at least one stride;
    calculating a maximum polar radius of the phase portrait metric for each stride; and
    calculating a roundness for each stride based on a ratio of the minimum polar radius of each respective stride to the maximum polar radius of each respective stride.

5. The method of claim 4, wherein calculating the phase portrait metric comprises calculating an average roundness for the repetitive movement based on the roundness of each stride of the at least one stride.

6. The method of claim 1, wherein calculating the phase portrait metric comprises calculating a smoothness for each stride of the at least one stride based on a measure of a variability of the phase portrait for each stride.

7. The method of claim 6, wherein calculating the phase portrait metric comprises calculating an average smoothness for the repetitive movement based on the smoothness of each stride of the at least one stride.

8. The method of claim 1, wherein each phase portrait comprises four quadrants or a stance and a swing phase, each quadrant or phase corresponding to a portion of a stride of the repetitive movement comprising at least one stride, and wherein applying the treatment comprises applying the treatment based on a phase portrait metric associated with at least one quadrant or phase of the phase portrait.

9. The method of claim 1, wherein calculating the phase portrait metric comprises calculating, with respect to the substantially circular orbit of the phase portrait for each stride, at least one of a maximum amplitude, a minimum amplitude, a maximum roundness, a minimum roundness, a maximum smoothness, or a minimum smoothness.

10. The method of claim 8, wherein calculating the phase portrait metric comprises:
    calculating a minimum polar radius of the phase portrait for each stride of the at least one stride;
    calculating a maximum polar radius of the phase portrait for each stride;
    calculating a roundness for each stride based on a ratio of the minimum polar radius of each respective stride to the maximum polar radius of each respective stride;
    calculating an average roundness for the repetitive movement based on the roundness of each stride of the at least one stride,
    wherein the assignment of the subject to the movement phenotype is further based on the average roundness for the repetitive movement;
    wherein the treatment comprises applying exosuit augmented gait training to the subject with an assigned movement phenotype based on the average roundness for the repetitive movement.

11. The method of claim 1, wherein the movement phenotype is established based on at least one phase portrait metric cutoff associated with a biomechanical or a motor control impairment.

12. The method of claim 1, further comprising:
    associating the phase portrait metric with a biomechanical metric; and
    establishing the phenotype based on the phase portrait metric.

13. The method of claim 12, further comprising determining a cutoff metric to establish one or more phenotypes.

14. The method of claim 12, wherein the phase portrait metric comprises the average amplitude for the repetitive movement and the biomechanical metric comprises a walking speed.

15. The method of claim 12, wherein the phase portrait metric comprises an average roundness and the biomechanical metric comprises a propulsion.

16. A system of phenotype-guided movement assessment, comprising:
    an assistive device;
    a sensor configured to collect movement data associated with a subject during repetitive movement of the subject, the repetitive movement comprising ambulation including at least one stride; and a processor operationally coupled to the sensor, the processor configured to:
  receive movement data associated with the subject from the sensor, the movement data collected during the repetitive movement of the subject;
  generate a phase portrait defining a substantially circular orbit based on the movement data associated with the at least one stride;
  calculate a phase portrait metric of a characteristic of the phase portrait, wherein calculating the phase portrait metric comprises calculating an amplitude for each stride of the repetitive movement based on an average polar radius of the substantially circular orbit of the phase portrait for each stride, and calculating an average amplitude for the repetitive movement based on the amplitude of each stride;
  assign the subject to a movement phenotype based on the phase portrait metric,
  wherein the processor is configured to instruct the assistive device to apply a treatment to the subject based on the assigned movement phenotype, wherein the treatment comprises applying gait training to the subject with an assigned movement phenotype based on the average amplitude for the repetitive movement.

17. The system of claim 16, wherein the phase portrait metric comprises:
  a minimum polar radius of the phase portrait for each stride of the at least one stride;
  a maximum polar radius of the phase portrait for each stride;
  a roundness for each stride based on a ratio of the minimum polar radius of the respective stride to the maximum polar radius of the respective stride.

18. The system of claim 17, wherein the phase portrait metric comprises an average roundness for the repetitive movement based on the roundness of each stride of the at least one stride.

19. The system of claim 16, wherein the phase portrait metric comprises a smoothness for each stride of the at least one stride based on a measure of a variability of the phase portrait for each stride.

20. The system of claim 19, wherein the phase portrait metric comprises an average smoothness for the repetitive movement based on a smoothness of each stride of the at least one stride.

21. The system of claim 16, wherein the assistive device comprises at least one of a robotic exosuit, a neuroprosthesis, or a Rhythmic Auditory Stimulation (RAS) device.

* * * * *